US006095611A

United States Patent [19]

Bar et al.

[11] Patent Number: 6,095,611

[45] Date of Patent: Aug. 1, 2000

[54] MODULAR BACKREST SYSTEM FOR A WHEELCHAIR

[75] Inventors: Christopher A. Bar, Belleville; Dennis L. Clapper, Swansea, both of Ill.

[73] Assignee: Roho, Inc., Belleville, Ill.

[21] Appl. No.: 09/118,675

[22] Filed: Jul. 17, 1998

Related U.S. Application Data

[63] Continuation-in-part of application No. 08/946,208, Oct. 7, 1997, abandoned.

[51] Int. Cl.[7] .............................. A47C 7/00; F16C 11/00

[52] U.S. Cl. .............................. 297/440.21; 297/284.3; 297/284.4; 297/228.13; 297/383; 297/354.12; 297/405; 297/397; 403/90; 403/130; 403/131

[58] Field of Search .............................. 297/284.1, 284.3, 297/284.4, 284.8, 284.9, 224, 228.13, DIG. 4, DIG. 6, DIG. 8, 352, 353, 354.12, 383, 361.1, 440.2, 440.1, 405, 406, 408, 391, 440.21, 440.24, 284.7; 403/90, 56, 122, 128, 130, 131, 57; 248/481

[56] References Cited

U.S. PATENT DOCUMENTS

| | | |
|---|---|---|
| 134,424 | 12/1872 | Evans . |
| D. 368,399 | 4/1996 | Buffon . |
| D. 383,929 | 9/1997 | Ring et al. . |
| 2,928,686 | 3/1960 | Newkirk . |
| 3,293,671 | 12/1966 | Griffin . |
| 4,565,345 | 1/1986 | Templeman . |
| 4,636,000 | 1/1987 | Nishino . |
| 4,647,066 | 3/1987 | Walton . |
| 4,655,471 | 4/1987 | Peek . |
| 4,732,423 | 3/1988 | Condon . |
| 4,753,482 | 6/1988 | Warren . |
| 5,007,676 | 4/1991 | Lien . |
| 5,035,467 | 7/1991 | Axelson et al. . |
| 5,062,677 | 11/1991 | Jay et al. . |
| 5,102,195 | 4/1992 | Axelson et al. . |
| 5,127,709 | 7/1992 | Rubinstein et al. . |
| 5,149,173 | 9/1992 | Jay et al. . |

(List continued on next page.)

OTHER PUBLICATIONS

"Designing the Future of Rehab Seating" © Pin Dot Products, Inc. 1989.

*Primary Examiner*—Milton Nelson, Jr.
*Attorney, Agent, or Firm*—Polster, Lieder Woodruff & Lucchesi, L.C.

[57] ABSTRACT

A modular backrest system for a wheelchair is removably attached to backrest posts of the wheelchair. The backrest system includes a back support that provides a surface against which the back of a wheelchair user rests, and a support chassis mounted to the back support for supporting the back support at a desired incline with respect to the posts, and at a desired seat depth with respect to the seat. An attachment assembly is further included that is operably connected to the support chassis at two locations and to the posts to allow the support chassis and back support to be readily removed from or attached to the chair. The particular back support employed in conjunction with the support chassis is based upon the support needs of the wheelchair user. One embodiment of the back support includes a backing plate, and a cushion or insert attached to a forwardly presented face of the backing plate against which the back of the individual rests when sitting on the seat. Another embodiment of the back support includes a plurality of pads adjustably attached to support tubes extending upwardly from the support chassis. Each pad is attached to at least one of the support tubes at a desired location by an elbow joint that permits forward and rearward movement and side-to-side movement of the pad. Each pad is attached to the elbow joint by a ball and socket joint that permits rotational movement of the pad with respect to the second member.

93 Claims, 38 Drawing Sheets

U.S. PATENT DOCUMENTS

| | | |
|---|---|---|
| 5,211,446 | 5/1993 | Jay et al. . |
| 5,228,747 | 7/1993 | Greene . |
| 5,352,023 | 10/1994 | Jay et al. . |
| 5,364,162 | 11/1994 | Bar et al. . |
| 5,407,248 | 4/1995 | Jay et al. . |
| 5,447,356 | 9/1995 | Snijders . |
| 5,503,459 | 4/1996 | White . |
| 5,518,294 | 5/1996 | Ligon, Sr. et al. . |
| 5,524,969 | 6/1996 | Harrison et al. . |
| 5,524,971 | 6/1996 | Jay et al. . |
| 5,544,378 | 8/1996 | Chow . |
| 5,547,251 | 8/1996 | Axelson . |
| 5,549,357 | 8/1996 | Counts et al. . |
| 5,556,168 | 9/1996 | Dinsmoor, III et al. . |
| 5,564,788 | 10/1996 | Warhaftig . |
| 5,573,302 | 11/1996 | Harrison et al. . |
| 5,593,211 | 1/1997 | Jay et al. . |
| 5,630,651 | 5/1997 | Fishbane . |
| 5,642,956 | 7/1997 | Hale . |
| 5,647,637 | 7/1997 | Jay et al. . |
| 5,671,977 | 9/1997 | Jay et al. . |
| 5,678,891 | 10/1997 | O'Neill et al. . |
| 5,681,092 | 10/1997 | Hanson . |
| 5,695,245 | 12/1997 | Carlson et al. . |
| 5,722,725 | 3/1998 | McNaughton . |
| 5,791,733 | 8/1998 | van Hekken et al. . |
| 5,791,735 | 8/1998 | Helman . |

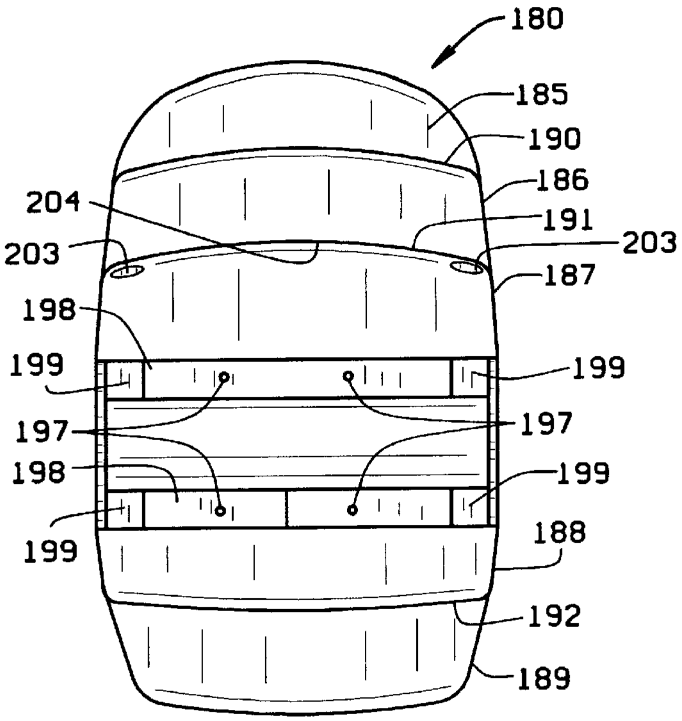
FIG. 15
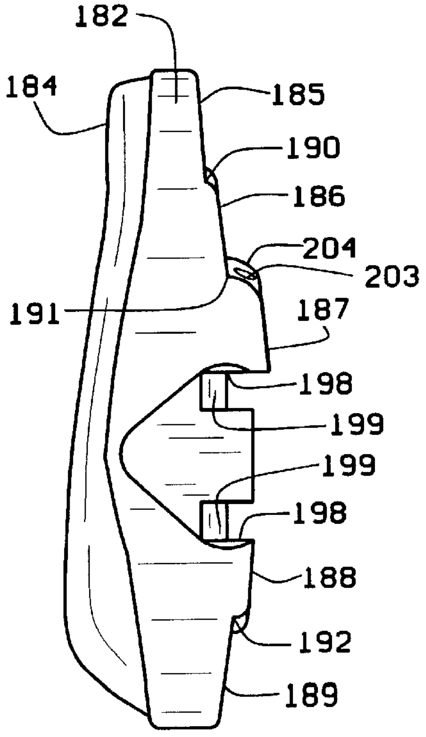
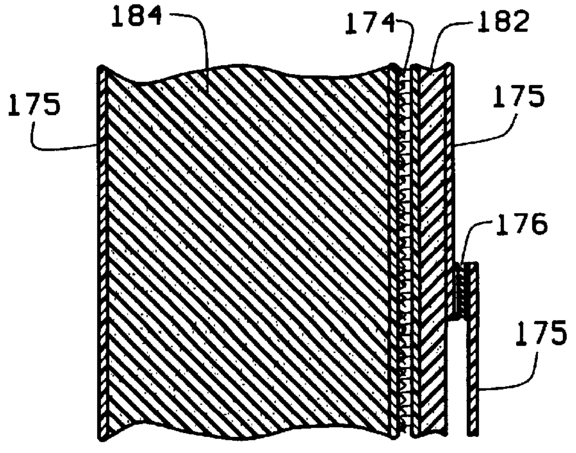
FIG. 15A
FIG. 14

MODULAR BACKREST SYSTEM FOR A WHEELCHAIR

CROSS-REFERENCE TO RELATED APPLICATIONS

This application is a continuation-in-part of U.S. patent application 08/946,208, filed Oct. 7, 1997 and now abandoned, the disclosure of which is incorporated herein by reference.

STATEMENT REGARDING FEDERALLY SPONSORED RESEARCH OR DEVELOPMENT

Not Applicable.

BACKGROUND OF THE INVENTION

This invention relates to seating, and in particular to a modular backrest system for wheelchairs.

In general, a wheelchair includes a seat and backrest that are supported by and extend between a pair of side frames, and a pair of wheels attached to the side frames. Backrest posts extend upwardly from the rear end of each frame, and turn rearwardly way from the backrest to form handles that allow a third party to push or move the wheelchair. Collapsible struts are positioned between the frames to maintain the frames in a parallel, spaced apart orientation when the chair is occupied by a user. When the struts are collapsed, the frames move inwardly together to allow for easy transportation or storage of the wheelchair. Typically, the seat and backrest are constructed from flexible material that easily folds when the wheelchair is collapsed.

However, the flexible material of the seat and backrest does not provide optimum support or comfort for the occupant. Contoured universal backrests have been developed to provide improved support for individuals requiring special support, such as those having spinal deformities or muscular atrophy, but these backrests are difficult to adjust to accommodate specific needs and proportions of individual users. Furthermore, the universal backrests are not adjustable for wheelchairs having various widths, and are not readily removable from the wheelchair frame. Special contoured backrests also exist to provide tailored support for a particular user, but such backrests are expensive and cannot be easily adjusted after they are manufactured. For example, molded backrests generally requires at least three stages of fitting: first, the shape and dimensions of the user are obtained; second, a mold is produced based on these dimension; and third, the mold is fit and refined for the particular user. Such custom mold techniques are expensive, labor intensive and time consuming, often taking from two to four months for delivery. Furthermore, the molds must be remade or replaced if the initial fit is incorrect, or if the person's condition or dimensions (height or width) change, or if the backrest no longer properly supports the user. Additionally, such backrests can be heavy and difficult to transport, with full molded systems often weighing up to 25 lbs.

Therefore, it is desirable to develop a backrest system that provides improved support and comfort for wheelchair users. Such a system should be adjustable and expandable to accommodate the unique posture, proportions and support requirements of each individual user. Furthermore, this system should be easy to assemble by a trained technician, and be movable into a multitude of positions, if desired. The system should be adjustable in width to accommodate any of various widths of the wheelchair, and should be able to accommodate wheelchair backrest posts having different diameters. Moreover, the system should be lightweight and easily mounted to and disengaged from the wheelchair to allow for transportation and storage of the chair.

BRIEF SUMMARY OF THE INVENTION

Accordingly, one object of the present invention is to provide a new and improved backrest system that is detachably mounted to backrest posts extending upwardly from the side frames of a wheelchair.

Another object of this invention is to provide an improved wheelchair backrest system that enhances the support and posture of a user by providing adjustable support that is specifically tailored to the needs of the user.

Still another object of this invention is to provide an improved wheelchair backrest system that is easily mounted to and removed from the wheelchair, so that the wheelchair can be collapsed into a compact configuration for transportation or storage.

Another object of this invention is to provide an improved wheelchair backrest system that is adjustable in width so that the backrest can be attached to wheelchairs having differing distances between the backrest posts.

Another object of this invention is to provide an improved wheelchair backrest system that can be mounted to backrest posts having different diameters or peripheries.

Yet another object of this invention is to provide an improved wheelchair backrest system that is lightweight, waterproof, durable, and easily adjusted to accommodate a particular disabled individual based upon his or her size and support needs.

Another object of this invention is to provide an improved wheelchair backrest system that includes a support chassis that is adapted to accommodate one or more back supports.

Another object of this invention is to provide an improved wheelchair backrest system having a back support that includes a preshaped shell with a support cushion or insert secured thereto that allows for height adjustments to the back support based upon the size of the user.

Another object of this invention is to provide an improved wheelchair backrest system having a back support that includes a set of adjustable pads that provide a low resolution displaceable surface to support the user, where the number of pads employed is based upon the degree of support required for the particular user.

Another object of this invention is to provide an improved ball and socket joint and an improved elbow joint that allow for precise positioning of the adjustable pads.

Another object of this invention is to provide an improved backrest system with adjustable pads that are designed to provide a high degree of postural support and stability, and can accommodate a wide range of spinal curvatures, including upright, kyphotic and scoliotic curvatures of the spine.

Another object of this invention is to provide an improved backrest system with adjustable pads that enhance management of muscle "tone" in back through intimate contact surface.

Another object of this invention is to provide an improved backrest system that can accommodate both changes in growth and condition of an individual.

Another object of this invention is to provide an improved backrest system that is reusable for multiple patient applications.

Yet another object of this invention is to provide an improved backrest system that can be easily and rapidly fitted for an individual.

Another object of this invention is to provide an improved backrest system that is cost-effective based on its ability to readjust and grow to meet changing needs of a patient.

Still another object of this invention is to provide an improved wheelchair backrest system that includes a detachable headrest.

Another object of this invention is to provide an improved wheelchair backrest system that can be expanded to include detachable lateral pads and hip pads.

These and other objects will become apparent to those skilled in the art in light of the following disclosure and accompanying drawings.

In accordance with the invention, generally stated, a backrest system for a chair for seating an individual is provided. The chair has a seat and upright posts extending upwardly from the rear of the seat in a spaced apart, substantially parallel manner. The backrest system includes a back support adapted to be positioned generally between the posts to provide a surface against which the back of an individual rests when the individual sits on the chair seat. The system also includes a support chassis mounted to the back support for supporting the back support at a desired incline with respect to the posts, and at a desired seat depth with respect to the seat. An attachment assembly is further included that is operably connected to the support chassis at two locations and to the posts to allow the support chassis and back support to be readily removed from or attached to the chair. More specifically, the backrest system is designed to fit a broad range of wheelchair models, and utilizes quick release assemblies that allow for the backrest system to be easily attached to or removed from a wheelchair with only two points of fixation.

The backrest system can be designed so that the support chassis further includes a pair of side plates with one side plate being disposed between each post and the back support. The support chassis also includes a pair of mounting posts extending inwardly from each side plate, and a pair of horizontal tubes that are removably secured to the mounting posts such that the tubes extend transversely across the back support. Use of the mounting posts and horizontal tubes allow for the support chassis to be adjusted in width to accommodate individuals having a wide range of trunk girths. In the preferred embodiment, the support chassis width is adjustable from 12 to 20 inches. This allows the backrest system to be easily adjusted as the individuals dimensions and support needs change over time, without enormous costs, time and effort associated with refitting conventional backrest.

Each side plate also has a substantially horizontal slot formed therein which permits forward and rearward movement of the back support with respect to the posts to allow for said back support to be positioned at the desired seat depth. In the preferred embodiment, the slot allows for up to 10 inches of seat depth adjustment.

At least one opening is formed in each side plate to reduce the weight of the back rest system. One such opening on each side plate also is adapted to accommodate an attachment assembly for a lateral pad.

The support chassis further includes a pair of swivel clamps with each swivel clamp having a pair of slots formed therein that permit angular movement of the back support with respect to the posts to allow said back support to be positioned at the desired incline. In the preferred embodiment, the swivel clamps allow for up to 60 degrees of angular movement of the backrest.

The particular back support employed in conjunction with the support chassis is based upon the support needs of the wheelchair user. One embodiment of the back support includes a backing plate, and a cushion or insert attached to a forwardly presented face of the backing plate against which the back of the individual rests when sitting on the seat. In this configuration, the backing plate is mounted to the tubes by inserting a plurality of threaded bolts through a plurality of openings formed in the tubes and through a plurality of openings formed in the backing plate at a location corresponding to the openings in said tubes. The bolts then are secured in place by a plurality of nuts.

Another embodiment of the back support includes a plurality of pads adjustably attached to a pair of spaced apart vertical support tubes extending upwardly from the support chassis at desired locations along the support tubes. Each pad is attached to at least one of the support tubes by an elbow joint that permits forward and rearward movement and side-to-side movement of the pad. The elbow joint includes a first member having one end securely clamped to the support tube, and a second member attached at one end to the pad and at an opposite end to the first member so that the first member rotates freely with respect to the second member. Each pad is attached to the second member of the elbow joint by a ball and socket joint that permits angular movement of the pad with respect to the second member. It will be appreciated that the elbow joint and ball and socket joint of the present invention each can be used in other devices and applications.

The backrest system also can be expanded to include a headrest assembly, lateral pad assemblies and hip pad assemblies, if desired, depending upon the support needs of the user.

The backrest system of the present invention is designed in view of the underlying biomechanical nature of the spine to achieve postural stability for individuals having varying degrees of support needs. The system easily can be modified and expanded as the individual's support needs change over time. The provision of independent support pads at each crucial level of the spine ensures maximum support at each level. The pad assembly provides a displaceable surface that fits and contours the body in both passive and dynamic modes. The pads follow the contours of the spine and distribute pressure to produce a stable and balanced posture by direct support to key areas of the spinal column, and provide significantly greater support and stability than conventional planar back systems that are currently available. The adjustability and expandability of the backrest system and pad assembly allows the system to be used over extended periods of time, or even the life of a person, and to be upgraded, maintained or changed as the person's dimensions and support needs change.

Other objects and features will be apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

In the drawings,

FIG. 14 is a side elevational view of the backing plate associated with the back support shown in FIG. 13;

FIG. 15 is a rear elevational view of the back support shown in FIG. 13;

FIG. 15A is a cross sectional view of the first embodiment of the back support showing a removable cover wrapped around the back support;

Corresponding reference characters indicate corresponding parts throughout the several views of the drawings.

DETAILED DESCRIPTION OF THE INVENTION

The following detailed description illustrates the invention by way of example and not by way of limitation. The heading contained herein are solely for convenience when reading the detailed description of the invention, and do not constitute a part hereof. This description will clearly enable one skilled in the art to make and use the invention, and describes several embodiments, adaptations, variations, alternatives and uses of the invention, including what we presently believe is the best mode of carrying out the invention.

Figure 1:
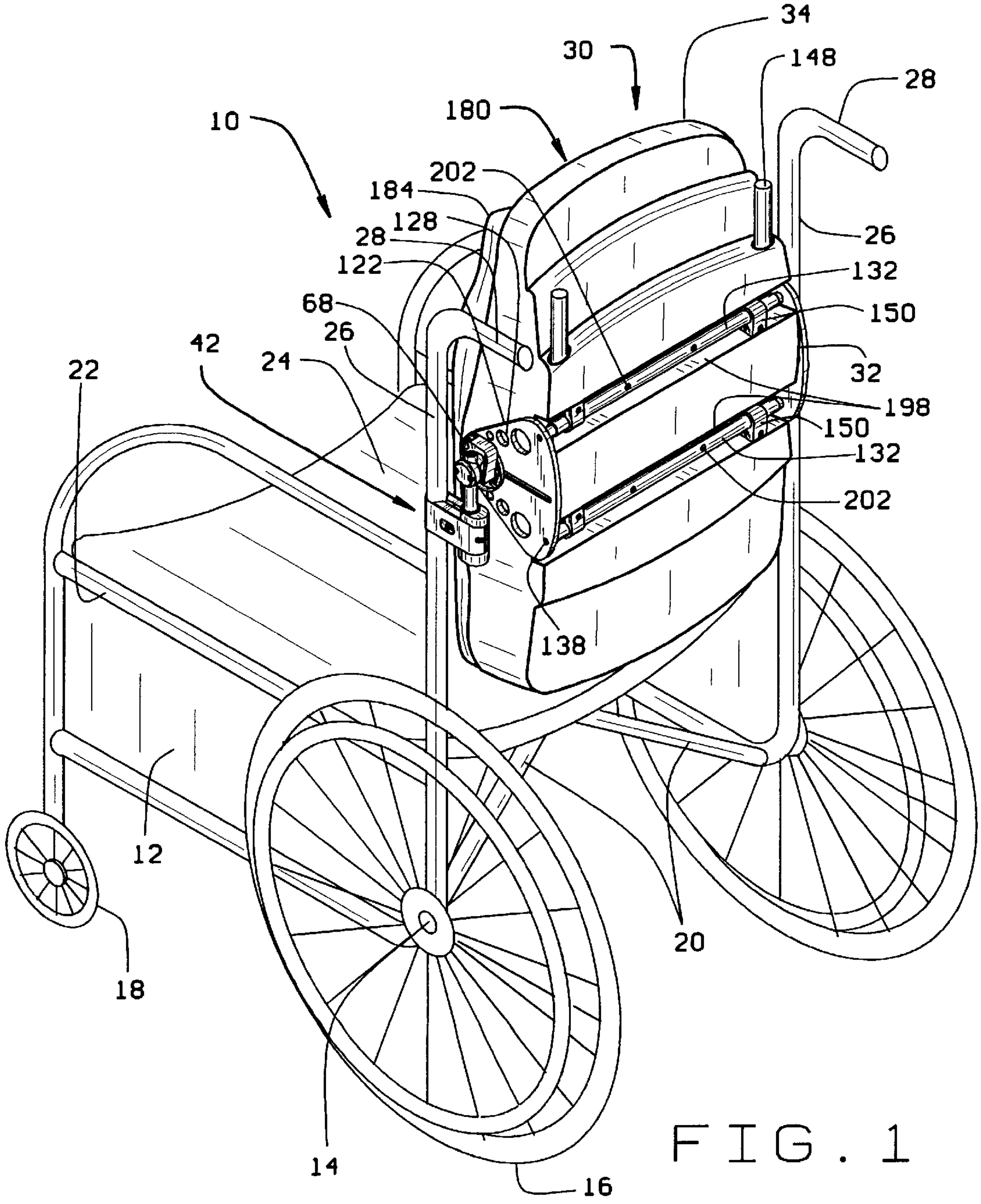
FIG. 1 is a rear perspective view of a wheelchair, having the backrest system of the present invention attached to conventional backrest posts of the wheelchair.

Referring now to the drawings, and in particular FIG. 1, a wheelchair is shown, referred to generally by reference number 10, that includes a pair of side frames 12, each having a spindle 14 on which a large wheel 16 rotates. Fitted to the front of each side frame 12 is a smaller caster-type wheel 18. The side frames 12 are maintained in a substantially parallel relationship at a fixed distance apart by a pair of collapsible struts 20. The struts 20 fold so that the sides of the frames can be moved together to allow the wheelchair to assume a more compact configuration for transport or storage. The side frames 12 include horizontal members 22 that support a seat 24 extending between them. A backrest post 26 extends upwardly from the rear of each side frame 12. The upper ends of the backrest posts 26 extend rearwardly to form a pair of handles 28 that are used to push or maneuver the wheelchair.

Modular Backrest System

The wheelchair 10 further includes a modular backrest system 30 that is attached to the backrest posts 26 as shown in FIGS. 1–3, 6 and 7. While the posts 26 shown in these drawings have a substantially round circumference, it will appreciated that the present invention can be easily adapted for use in conjunction with posts 26 having other peripheries such as, for example, an elliptical, rectangular or D-shaped perimeter. The backrest system 30 includes a support chassis 32 to which a back support assembly 34 is attached. As set forth in greater detail below, the back support assembly 34 preferably is either a single pad 180 (e.g., FIGS. 1 and 16), or a set of pads 298 (e.g., FIG. 17). The back support assembly 34 supports and positions a user's back when sitting in the wheelchair 10. As will be discussed below, the support chassis 32 can be attached to a broad range of wheelchairs with different configurations. The backrest system preferably is assembled and fitted for a particular patient by an orthotist, therapist, seating technician (RTS) or other similarly qualified prescriber. As will be appreciated, the above description of the wheelchair 10 sets forth a conventional configuration for wheelchair side frames, wheels, struts, seat and backrest posts 26, and is provided for illustrative purposes only. The present invention resides in the modular backrest system 30.

I. Frame Clamp Attachment Assembly

The support chassis 32 is attached to the backrest posts 26 via a frame clamp attachment assembly 42 (FIGS. 2 and 3) that includes two points of attachment to the wheelchair 10, as opposed to the customary four point attachment scheme employed by other backrests such as that set forth in U.S. Pat. No. 5,364,162, issued Nov. 15, 1994 to Bar et al. and assigned to the same assignee of the present invention.

A. Bands and Adapters

Figure 4:
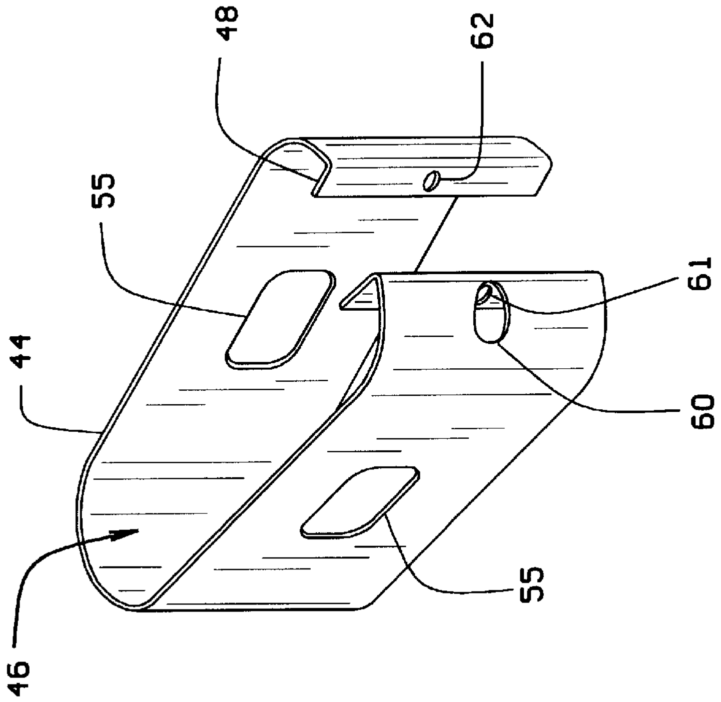
FIG. 4 is a perspective view of a band associated with the attachment assembly.

More specifically, the attachment assembly 42 includes a pair of adjustable bands 44 that are positioned around the backrest posts 26 at a desired location. By moving the bands 44 upwardly or downwardly along the wheelchair backrest posts 26, the height of the back support assembly 34 can be varied. The band 44 (FIGS. 4 and 6) has a substantially elliptical shape with a center opening 46 that permits insertion of the wheelchair backrest post 26 therethrough and a pair of inwardly extending flanges 48. As will be appreciated, the bands 44 are adapted to be used in conjunction with a wide variety of wheelchair designs, and are designed to accommodate a variety of features, such as removable arm rest supports, and hinged back siding seat braces. In the preferred embodiment shown in FIG. 4, the band 44 is sized to receive wheelchair backrest posts 26 having diameters ranging from 0.75 to 1.2 inches.

Figure 2:
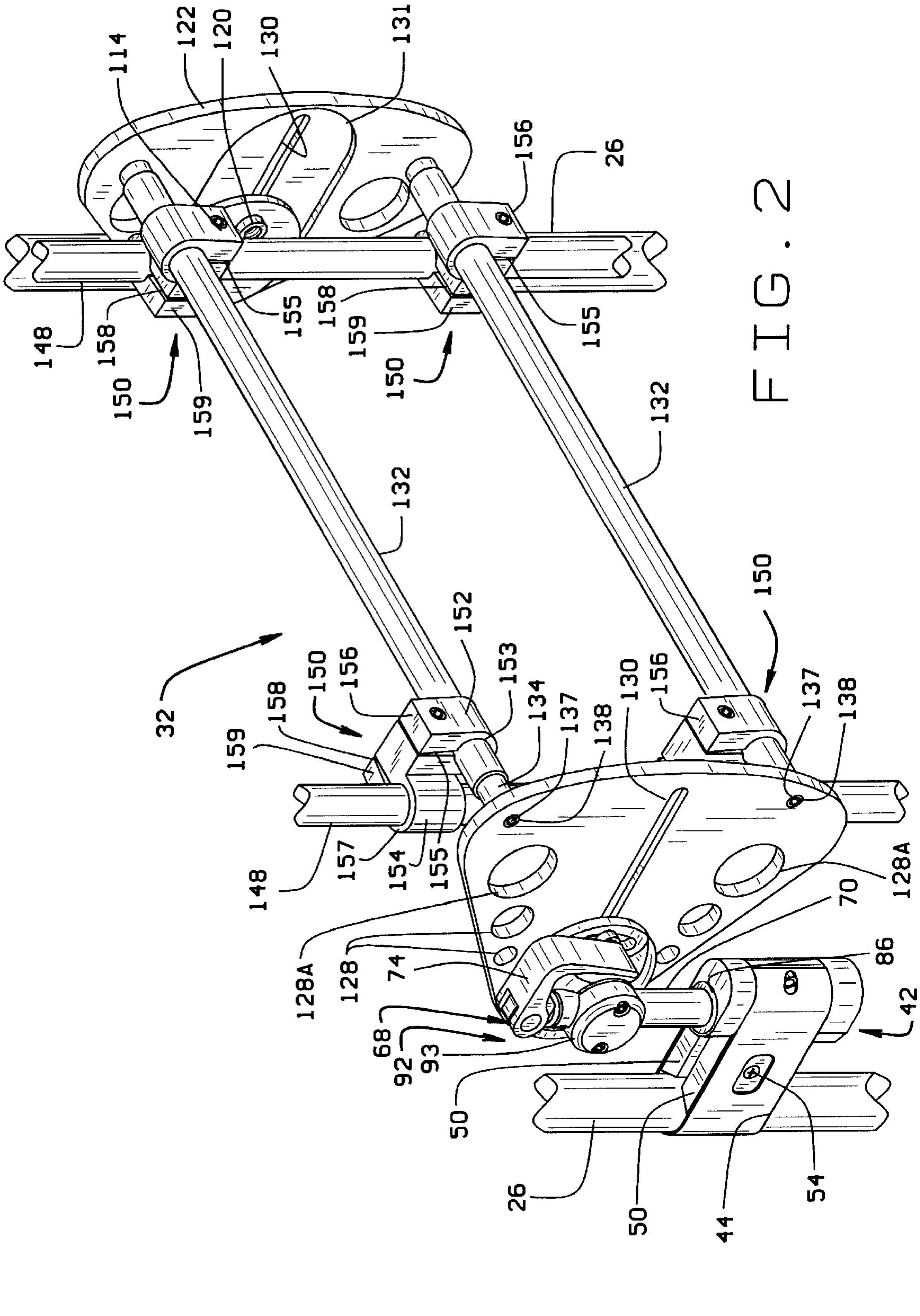
FIG. 2 is a rear perspective view of the attachment assembly of the present invention mounted to wheelchair backrest posts and the support chassis and support tubes of the present invention that are used to support a back support (not shown)
Figure 3:
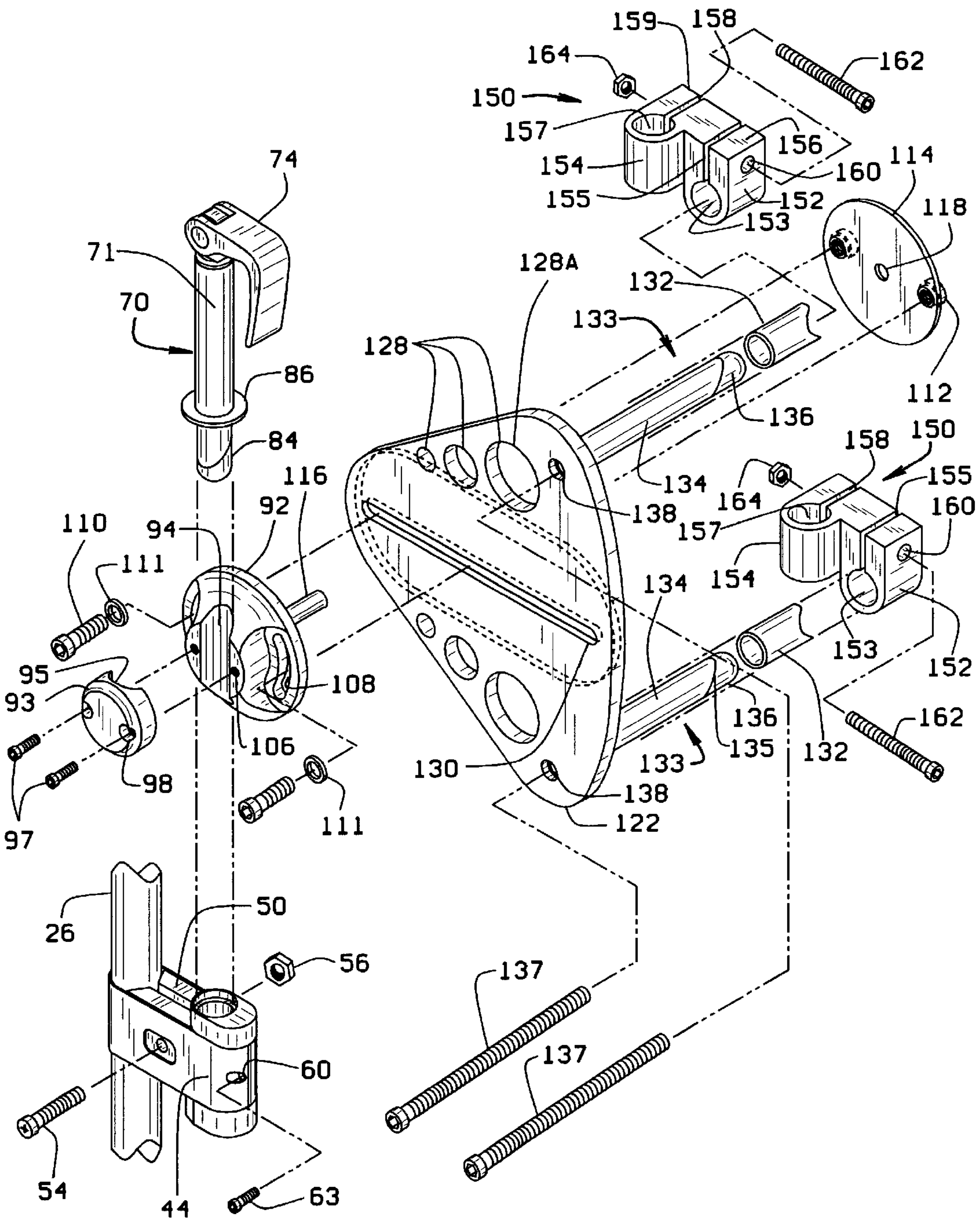
FIG. 3 is an exploded perspective view of the attachment assembly and a portion of the support chassis shown in FIG. 2.
Figure 5:
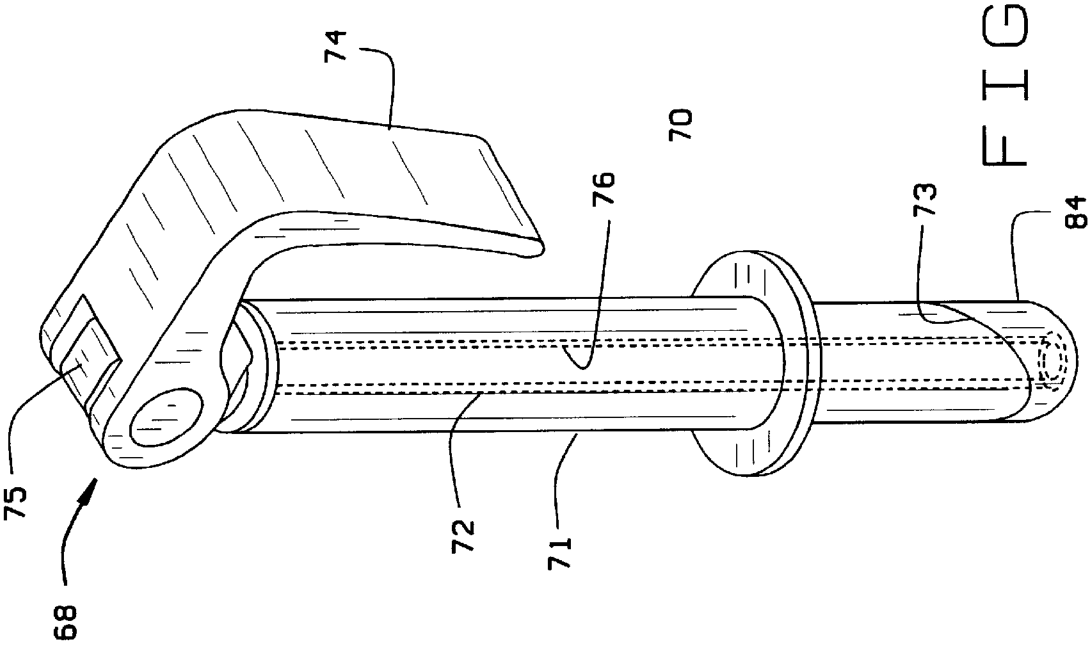
FIG. 5 is a perspective view of the quick release device associated with the attachment assembly, including a lever, mounting post and barrel.
Figure 6:
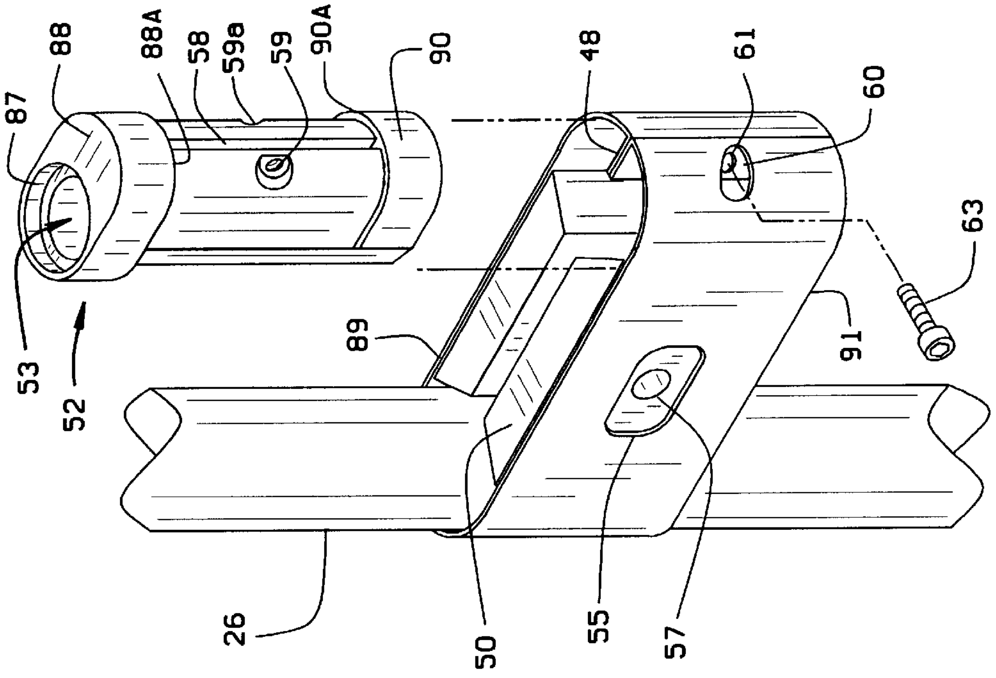
FIG. 6 is a partially exploded view of attachment assembly, showing the adapter that is positioned inside the band between flanges and a pair of wedges.
Figure 7:
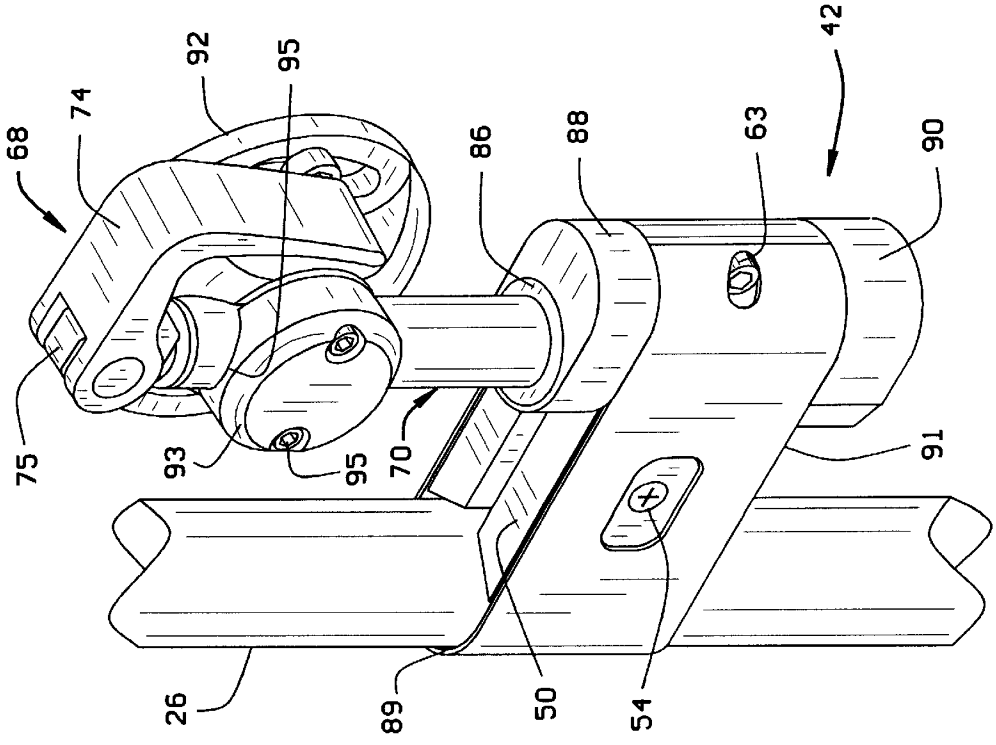
FIG. 7 is a perspective view of the attachment assembly, showing the quick release device securely locked inside the adapter, and the mounting post positioned between the retaining clamp and the swivel clamp.

The band 44 is secured to the backrest post 26 as shown in FIGS. 2, 3, 6 and 7. The attachment assembly 42 also includes a pair of wedges 50 inserted inside the band 44 to assist in positioning the band 44 on the backrest post 26. The dimensions of the wedges 50 are based upon the diameter of the backrest post 26. An adapter 52 having an opening 53 extending axially therethrough also is disposed inside the band 44 as shown in FIGS. 6 and 7. The adapter 52 has a longitudinal slot opening 58 (FIG. 6) formed therein that is aligned with the opening 53 and is adapted to receive the flanges 48 of the band 44. As discussed below in greater detail, the adapter 52 is used to support a quick release mounting post 70 (FIGS. 7–9) that secures the support chassis 32 to the attachment assembly 42. The band 44, wedges 50 and adapter 52 are held in position along the backrest post 26 by a fastening device such as a threaded bolt 54 as shown in FIGS. 2 and 3 that is inserted through openings 55 formed in the band and openings 57 formed in the wedges 50 and locked in place by a nut 56.

To further assist in securing the adapter 52 to the band 44, aligned openings 59 and 59*a* are formed in the adapter 52 adjacent to the slot 58. Openings 60, 61, and 62 are formed in the band 44 and its flanges 48, respectively, to permit insertion of a fastening device such as a threaded bolt 63 through the opening 60 in the band 44, into and through the opening 59 in the adapter 52, through flange 48 openings 61 and 62, and then into the remaining portion of the opening 59*a* in the adapter 52, which opening 59*a* is threaded. This configuration of the adapter 52 and band 44 prevents accidental movement or dislocation of the adapter 52 with respect to the band 44 (see, FIGS. 4, 6 and 7).

B. Quick Release Assemblies

Figure 8:
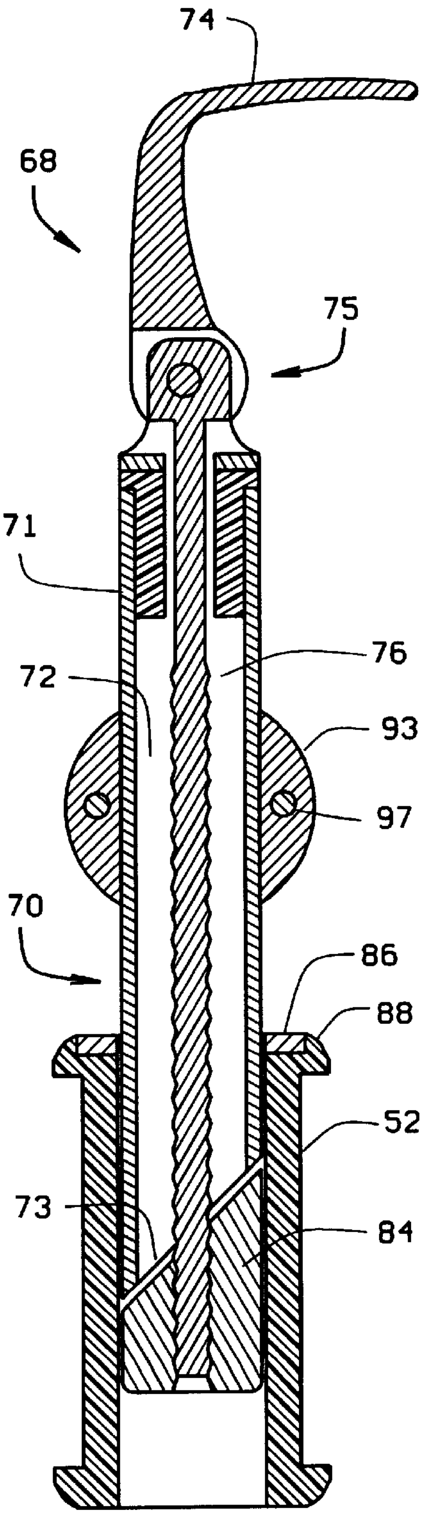
FIG. 8 is a cross sectional view of the quick release device inside the adapter, showing the lever in its unlocked position.
Figure 9:
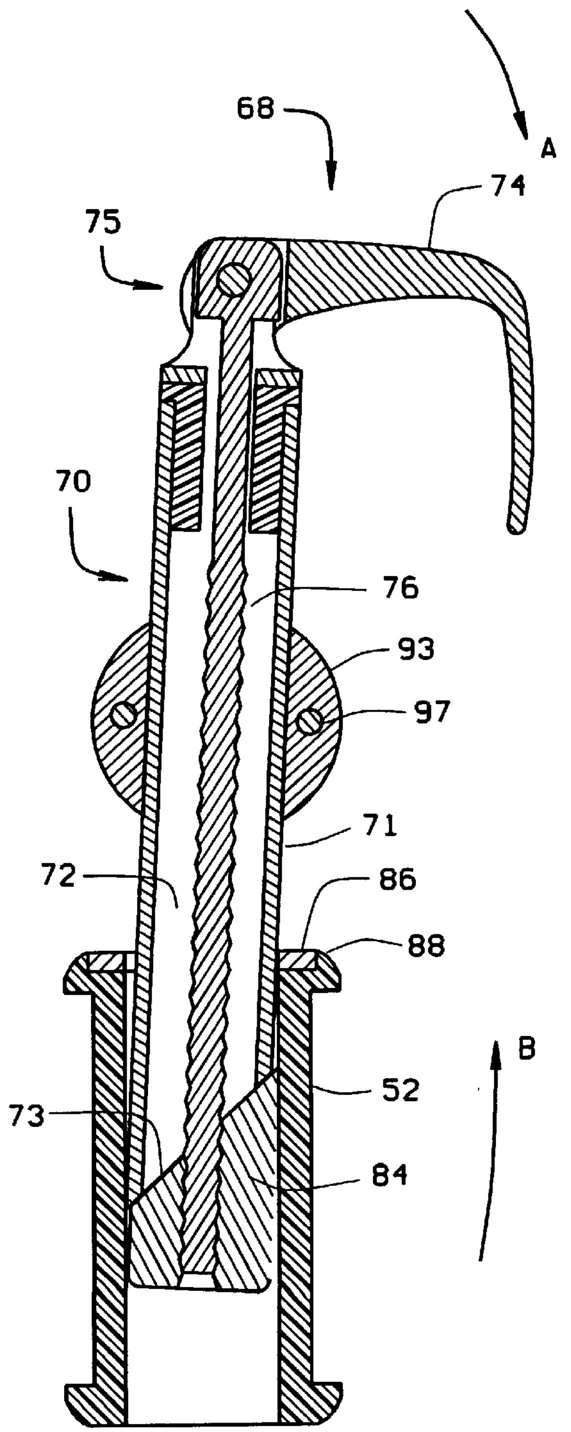
FIG. 9 is a cross sectional view of the quick release device shown in FIG. 8, showing the lever in its locked position.

The attachment assembly 42 also includes a pair of quick release assemblies 68 that releasably secure the support chassis 32 to the attachment assembly 42. As will be discussed in detail hereinafter, the quick release assemblies are attached on each side of the support assembly 42. FIGS. 7, 8 and 9 show the connection between the quick release assemblies 68 and the attachment assembly 42.

Each quick release device 68 includes a mounting post 70 having a body portion 71 with an opening 72 extending axially therethrough and a tapered or angled lower end 73. A lever 74 is secured to the upper end of the body portion 71 via a cam mechanism 75 and a threaded stud 76 or pin that extends downwardly from the cam mechanism 75 into the opening 72 in the mounting post 70. For example, in one embodiment of the present invention, the quick release device 68 is a quick release bicycle seat post binder sold by Kalloy, a Chinese company, as model number ST5221, where the Kalloy binder is modified for the present invention to provide the lever 74, cam mechanism 75 and stud 76 by bending the lever of the Kalloy binder at an angle of approximately 90°, and extending the length of the stud 76 as shown in FIGS. 8 and 9. As shown in FIGS. 2 and 3 and discussed below, the mounting posts 70 are removably secured inside openings 96 (FIG. 10) associated with the support chassis 32. The mounting post 70 also includes a small tapered barrel 84 that is secured to the lower end 73 of the body portion 71 by the stud 76. The barrel 84 and body portion 71 are sized to be slidably received in the opening 53 extending axially through the adapter 52. In the preferred embodiment, a washer 86 is attached at a desired location along the body portion 71 of the mounting post 70 to provide a visual indication as to when the mounting post 70 and barrel 84 are properly positioned inside the adapter 52. When the mounting post 70 and barrel 84 are properly inserted, the washer 86 is disposed inside a recess 87 formed in an upper end 88 of the adapter 52. As shown in FIGS. 6 and 7, the upper end 88 of the adapter 52 preferably includes a shoulder 88A that is adapted to rest on an upper edge 89 of the band 44 upon assembly to prevent downward movement of the upper end 88 of the adapter 52 into the passage 46 of the band 44. Similarly, a lower end 90 of the adapter 52 preferably includes a shoulder 90A adapted to rest against a lower edge 91 of the band 44 upon assembly to prevent upward movement of the lower end of the adapter 52 into the passage 46 of the band 44.

The barrel 84 is moved axially upwardly (or inwardly) and downwardly (or outwardly) by the stud 76 and cam mechanism 75 based upon the position of the lever 74. When the lever is raised into a unlocked position (FIG. 8), the body portion 71 and barrel 84 move freely inside the opening 53 of the adapter 52. When the lever 74 is pressed downwardly into a locked position as indicated by the arrow "A" in FIG. 9, the barrel 84 is moved upwardly by the stud 76 and slides radially outwardly against the tapered surface 73 of the body portion 71 (arrow "B") so that the tapered ends of the body portion 71 and barrel 84 are wedged inside the opening 53 into engagement with the inner surface of the adapter 52. In this locked position, the mounting post 70 and barrel 84 are securely retained inside the adapter 52 so as to prevent lateral or axial movement of the mounting post 70 (FIG. 9).

Thus, the quick release devices 68 allow for the chassis 32 and associated back support 34 to be easily removed from and assembled to the wheelchair 10. More specifically, to attach the backrest 30 to the attachment assembly 42, the levers 74 are moved into the unlocked position, and the mounting posts 70 are inserted into the openings 53 of the adapters 52. When the mounting posts 70 are properly positioned in the adapters 52 (e.g., the washer 86 is disposed inside the recess 87 of the adapter 52), the levers 74 are moved into the locked position so that the support chassis 32 is anchored to the wheelchair 10. To remove the backrest 30 from the wheelchair 10, the levers 74 are moved into the unlocked position, and the mounting posts 70 and barrels 84 of the two quick release devices 68 are removed from the adapters 52.

II. Swivel Clamps

Figure 10:
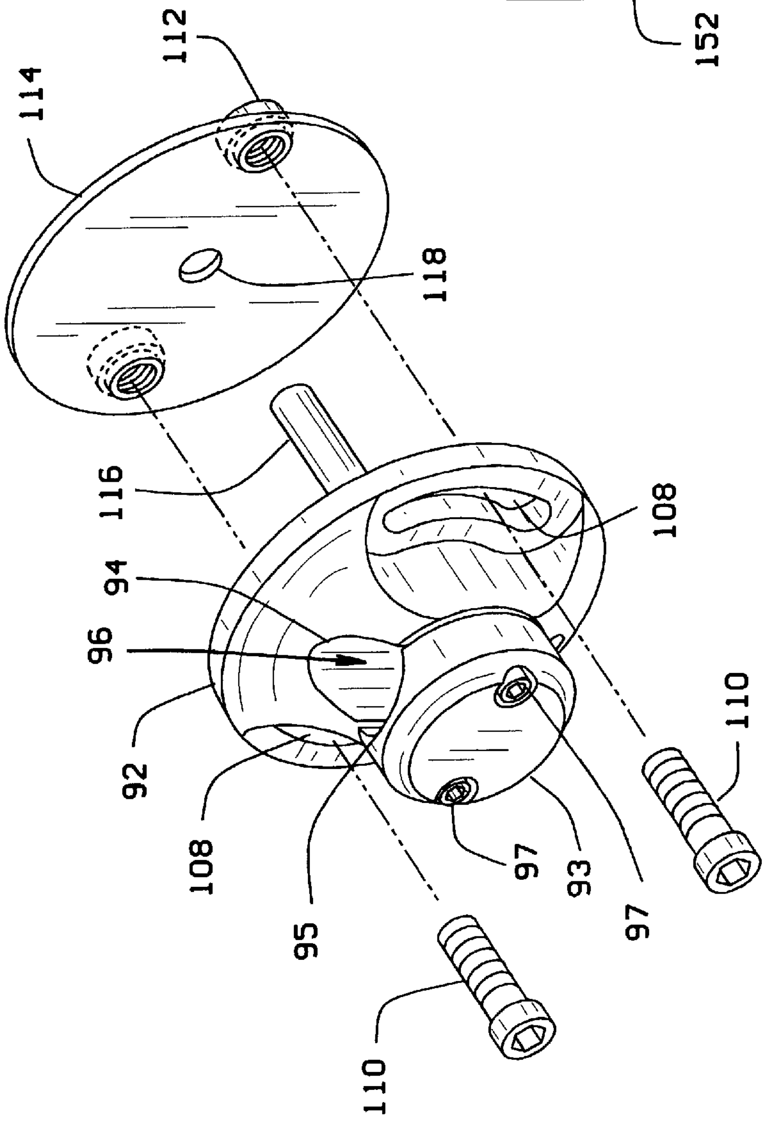
FIG. 10 is a partially exploded view of the swivel clamp and swivel mounting plate, with the retaining clamp attached to the swivel clamp to illustrate the opening in which the mounting post is disposed.

As shown in FIGS. 2 and 3, the body portion 71 of each mounting post 70 associated with the quick release devices 68 is secured to a swivel clamp 92 associated with the support chassis 32 by a retaining clamp 93. The swivel clamp 92 and retaining clamp 93 have corresponding concave notches 94, 95, respectively, formed therein that combine to define an opening 96 sized to receive the mounting post 70 therein (FIG. 10). A pair of screws 97 are inserted into openings 98 in the retaining clamp 93 and corresponding openings 106 in each swivel clamp 92 to hold the mounting post 70 in position at a desired location or height. Each swivel clamp 92 has a pair of slots 108 (FIG. 10) formed therein that allow for rotational or angular movement of the support chassis 32 and back support 34 with respect to the wheelchair 10. In the preferred embodiment, the slots 108 allow for 30° of rearward recline and 30° of forward tilt (for a 60° total angular displacement) of the backrest 30 relative to a vertical line of the wheelchair backrest posts 26. The swivel clamp 92 is secured in a desired position by screws 110 that are inserted through washers 111 and the slots 108, and then tightened against the outwardly presented face of the swivel clamp 92 to prevent rotational movement of the swivel clamp 92. As discussed below, the screws 110 are tightened into threaded bushings 112 associated with a swivel mounting plate 114.

III. Support Chassis

A. Side Plates

Figure 35:
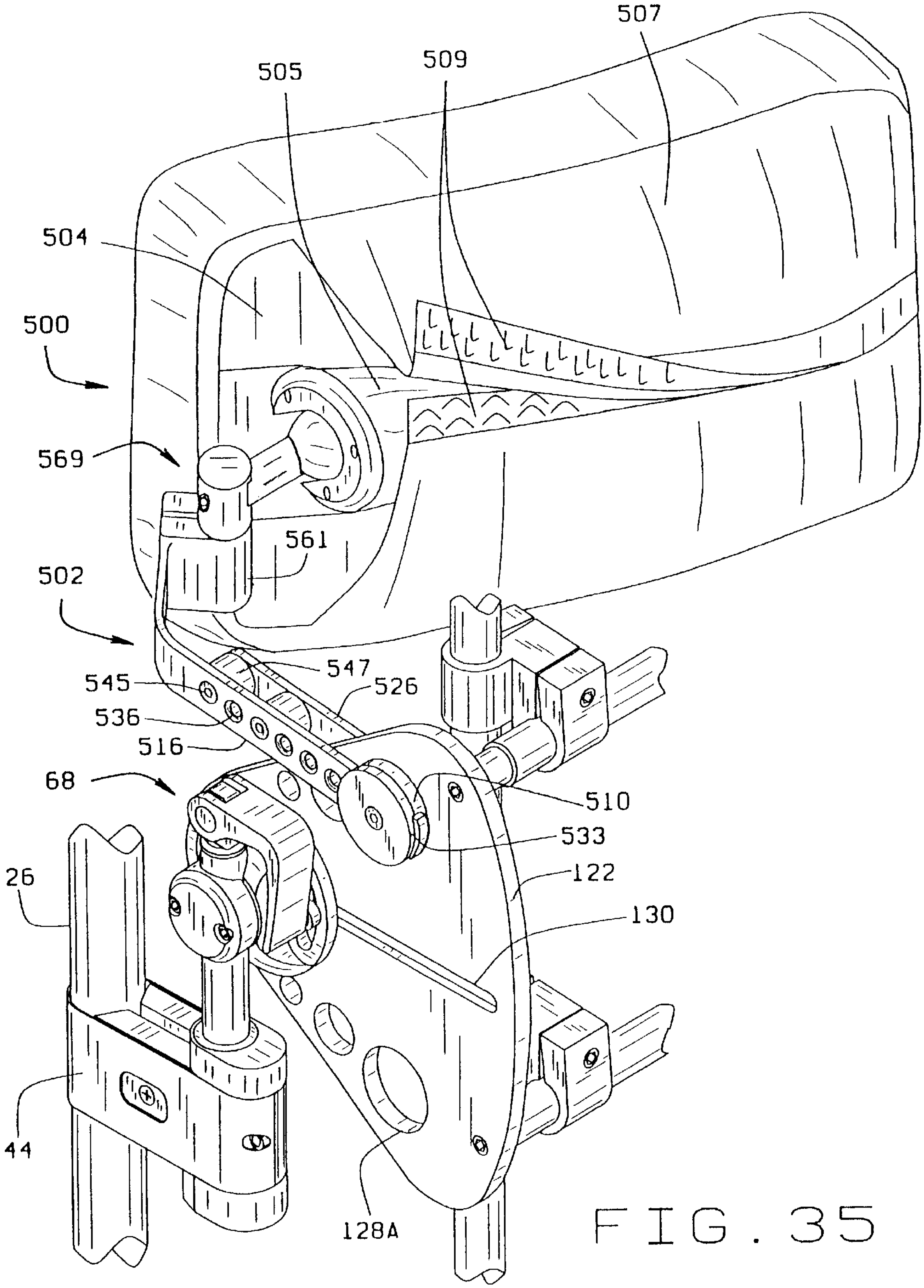
FIG. 35 is a perspective view of another embodiment of a lateral pad attached to the side plate.

Each swivel clamp 92 is secured to a side plate 122 associated with the support chassis 32 by the swivel mounting plate 114 ant the two bushings 112 formed therein. Each side plate 122 has formed therein at least one opening 128 to provide necessary weight reducing functions for the backrest system 30. As discussed below, at least one such opening 128A on each side plate is adapted to accommodate a mounting assembly 502 for a lateral pad 500 (FIG. 35).

Figure 11:
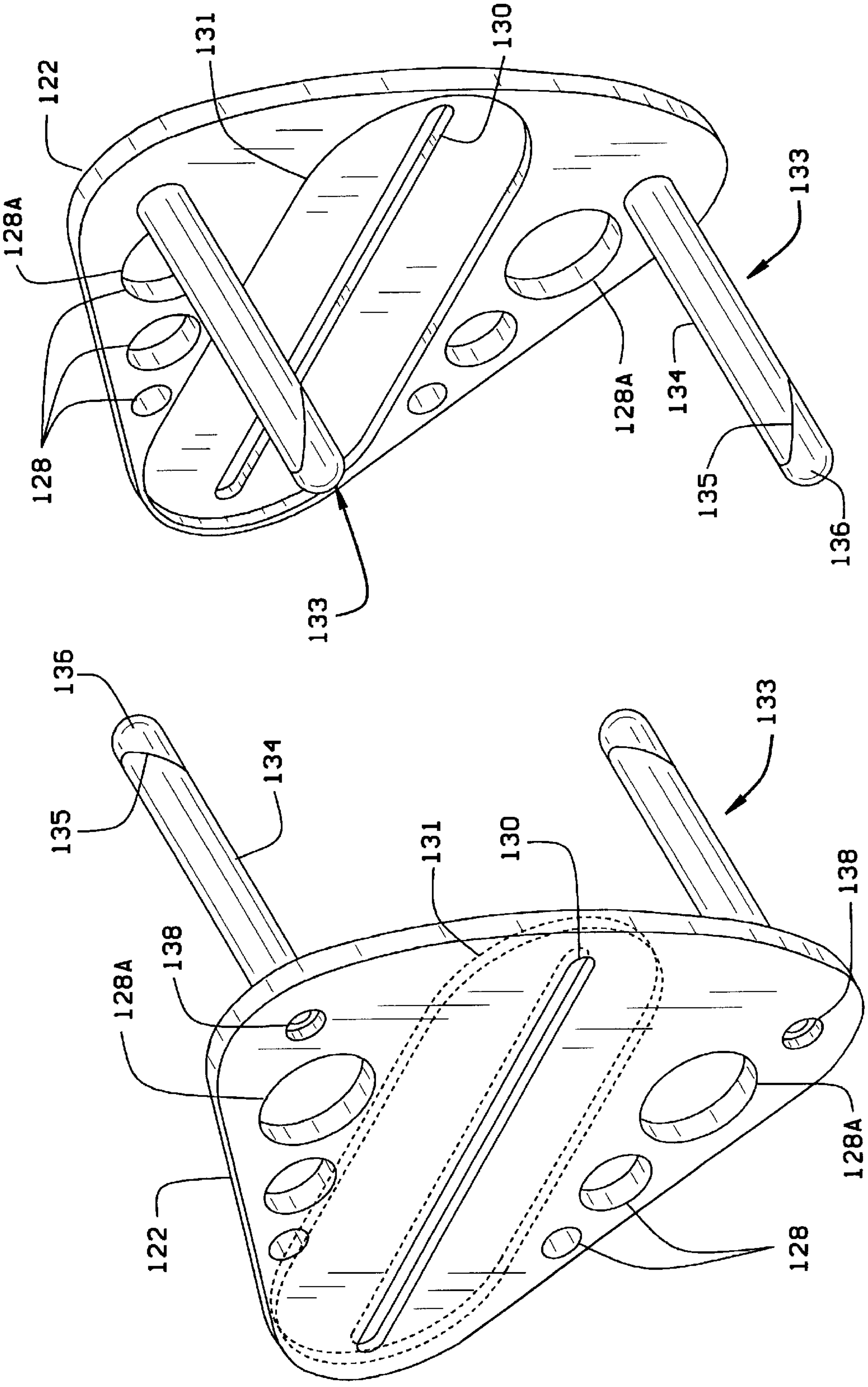
FIG. 11 is a perspective view of the side plates of the support chassis, showing the mounting posts extending inwardly therefrom.
Figure 11A:
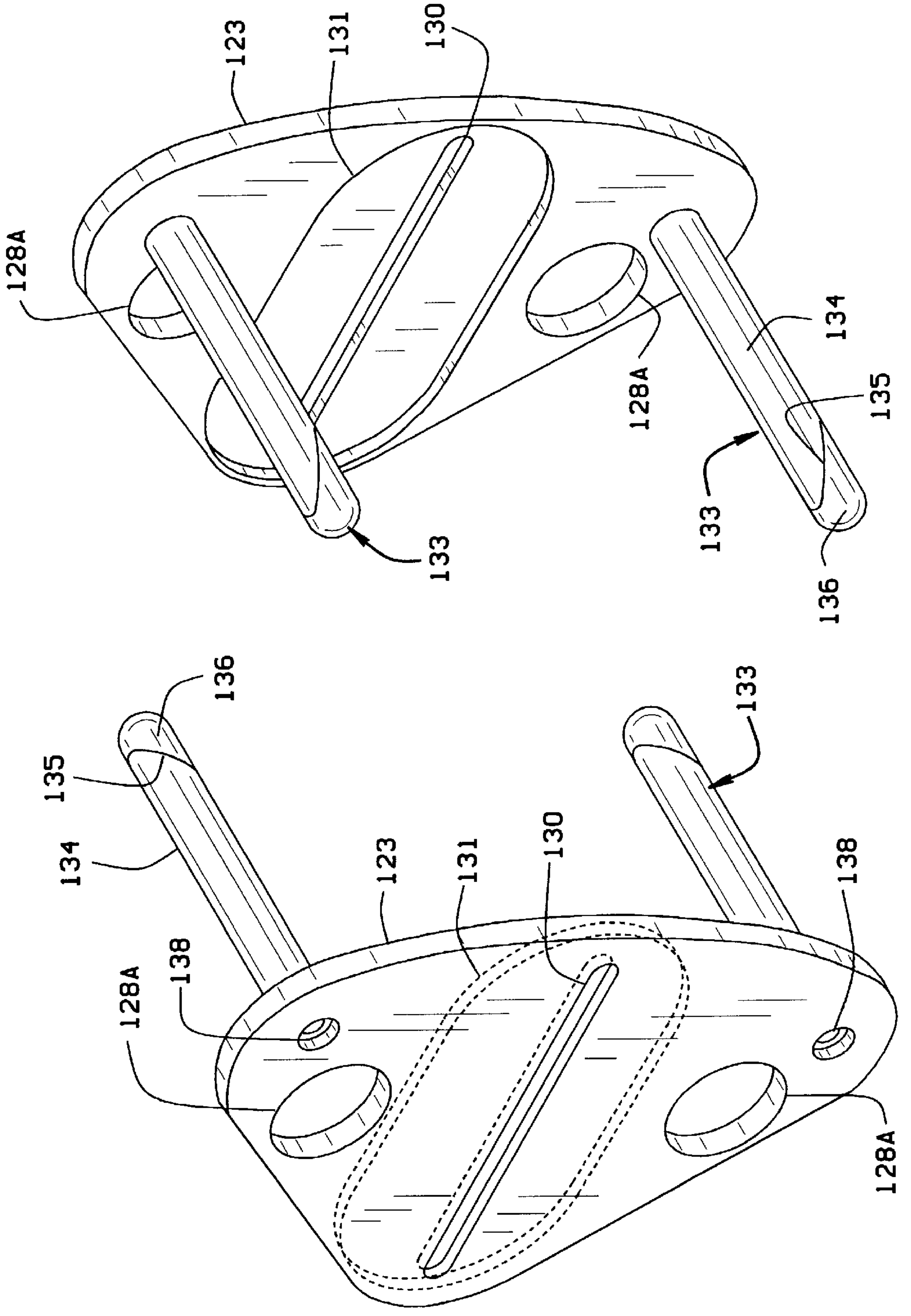
FIG. 11A is a perspective view of the side plates of the support chassis that can be used for a child or active wheelchair user.

The side plate 122 shown in FIGS. 1–3 and 11 preferably is employed for wheelchair users requiring more extensive back support, and preferably has six openings 128, including openings 128A for the lateral pad assemblies. FIG. 11A illustrates an alternative configuration for the side plates, showing a smaller side plate 123 that includes two opening 128A to provide weight reducing functions and allow for mounting of the mounting assembly 502 associated with the lateral pads 500. This smaller version of the side plates shown in FIG. 11A is used, for example, in back support systems 34 for children or "active" wheelchair users who do not require extensive back support. However, it will be appreciated that the larger side plates 122 shown in FIG. 11 permit sufficient adjustment of the backrest system 30 to accommodate a child or "active" wheel user, if desired.

Each side plate 122 includes a horizontal slot 130 extending substantially the entire width of the side plate 122. A stud 116 extends outwardly from the swivel clamp 92 as shown in FIGS. 3 and 10, and is sized to be slidably received within the slot 130 of the side plate 122. To adjust the seat depth of the wheelchair 10, the swivel clamp 92 and stud 116 are slidably moved forwardly and rearwardly within the slot 130 of the side plate 122 to a desired position. The stud 116 also is inserted through an opening 118 formed in the swivel mounting plate 114. In the preferred embodiment of side plate 122, the slot 130 is approximately 4.5 inches in length to allow for up to 2.5 inches of depth adjustment of the seat 24. After the swivel clamp 92 is rotated to the desired angle with respect to the backrest posts 26, the screws 110 are inserted through the swivel clamp slots 108 and the side plate slot 130 into the aligned threaded mounting plate bushings 112, and tightened to thereby clamp the side plate 122 between the mounting plate 114 and the swivel clamp 42 and secure the swivel clamp 92 to the support chassis 32. As shown in FIGS. 2 and 3, each side plate 122 has a cavity 131 formed in its inwardly presented face that is sized to accommodate the swivel mounting plate when it is attached to the swivel clamp 92 at any location within the slot 130. Thus, the swivel clamp 92 and mounting plate 114 allow for forward and rearward angular movement of the backrest 30 by rotating the backrest 30 in the slots 108, as well as adjustment of seat 24 depth by moving the swivel clamp 92 to a desired position in the side plate slot 130. This adjustability of the backrest system 30 allows for the wheelchair 10 to be sized to accommodate dimensions ranging from a small child to a large adult.

B. Horizontal Tubes and Mounting Posts

In the preferred embodiment shown in FIGS. 2 and 3, the support chassis 32 further includes two hollow cylindrical horizontal tubes 132 extending transversely across the rear of the back support assembly 34. A pair of mounting posts 133 extend inwardly from each side plate 122, and are adapted for engagement within the horizontal tubes 132. The mounting posts 132 are similar to the quick release mounting posts 70 in that each mounting post 132 has a body portion 134 with a tapered or angled end 135 (FIG. 11) and a tapered barrel 136 that is secured to the body portion 134 at the tapered end 135. The barrel 136 is secured to the body portion 134 by a threaded bolt or screw 137 that extends through an axially extending opening (not shown) formed in the body portion 134 into the barrel 136. A seat (not shown) is formed inside the opening of the body portion 134 against which a head of the bolt 137 rests when the barrel 136 is in an unlocked position (discussed below). The seat extends radially inwardly from an inner surface of the body portion 134, and includes an opening extending axially therethrough that is sized to accommodate the screw 137 therein. The barrel 136 is moved axially inwardly and outwardly with respect to the body portion 134 by the screw 137.

More specifically, a hex ball driver (not shown) is inserted through an opening 138 (FIG. 11) formed in the side plate 122, and into the opening formed in the body portion 134 into engagement with the head of the screw 137. As discussed above with respect to mounting post 70 (FIGS. 8 and 9), when the screw 137 is tightened by a technician operating the hex ball driver, the barrel 136 is moved inwardly into abutment with the tapered surface 135 of the body portion 134 and displaced radially outwardly so that edges of the tapered end 135 of the body portion 134 and the tapered barrel 136 are wedged against the inner surface of the tube. In this locked position, the posts 133 are securely retained inside the tubes 132 to prevent lateral movement of the tube 132 with respect to the posts 133. To disassemble or adjust the width of the support chassis, the screws are loosened so that the barrel 136 moves axially outwardly away from the tapered surface 135 of the body portion 134 so that the edges of the body portion 134 and barrel 136 no longer engage the inner surface of the tube 132. In this unlocked position, the mounting posts 133 move freely inside the tubes 132.

In the preferred embodiment, a technician or therapist that is fitting the backrest assembly for a particular user can increase the width of the support chassis 32 by approximately two inches beyond the length of the horizontal tubes 132 by varying the extent to which the posts 133 are inserted into the tubes 132. In the preferred embodiment, the width of the support chassis 32 can be varied from 12 to 20 inches depending upon the length of the particular horizontal tubes 132 employed and the extent to which the mounting posts 133 are inserted into the tubes 132. The bands 44 can be rotated about the backrest posts 26 so that the adapters 52 are moved toward or away from the support chassis 32.

To accommodate support chassis 32 of differing widths, in the preferred embodiment, the band 44 can be rotated about the wheelchair post 26 to accommodate variations in width of the support chassis 32 of up to approximately two inches.

IV. Vertical Back Support Tubes and Tube Clamp Assemblies

The backrest system 30 also includes a pair of vertically extending hollow, cylindrical back support tubes 148 which each have an opening 149 that extends axially therethrough. The vertical tubes 148 are attached to the horizontal tubes 132 by tube clamp assemblies 150.

Each tube clamp assembly 150 includes a first clamp 152 and a second clamp 154 (FIGS. 2, 3 and 12) that is integrally formed with the first clamp 152. The first clamp 152 has a first opening 153 extending therethrough that is sized to accommodate either a horizontal tubes 132 or a vertical back support tube 148, and a slot 155 extending radially outwardly from the opening 153 to an outer surface 156 of the first clamp 152. Similarly, the second clamp 154 has a second opening 157 extending therethrough that is sized to accommodate either a horizontal tube 132 or a vertical back support tube 148, and a slot 158 extending radially outwardly from the opening 157 to an outer surface 159 of the second clamp 154. When the first clamp 152 is secured to a vertical tube 148, the second clamp 154 is secured to a horizontal tube 132. When the first clamp 152 is secured to a horizontal tube 132, the second clamp 154 is secured to a vertical tube 148. The center axis of the first opening 153 is offset by approximately 90° with respect to the center axis of the second opening 157, so that the vertical support tubes 148 are oriented in a substantially perpendicular relationship with respect to the horizontal tubes 132.

Figure 12:
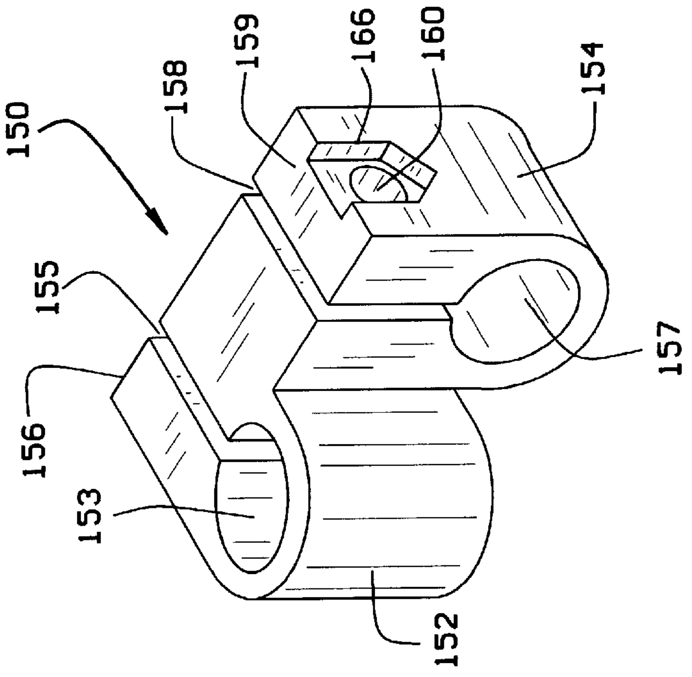
FIG. 12 is a perspective view of a tube clamp.

The tube clamp 150 also includes a third opening 160 that extends through the first and second clamps 152, 154 and through the slots 155, 158 as shown in FIGS. 3 and 12. A screw 162 is inserted through the third opening 160 and a nut 164 is attached to the screw 162 to retain the screw 162 in the opening 160. A counterbore 166 is formed in the tube clamp 150 to accommodate the nut 164 during tightening of the screw 162. When the support chassis 32 is positioned at a desired height on the back support tubes 148, the screws 162 are tightened, forcing slots 155, 158 to close. This forces the first clamp 152 to securely engage the horizontal support chassis tube 132 and the second clamp 154 to securely engage the vertical back support tube 148. The clamps 152, 154 prevent rotational and longitudinal displacement of the tubes 132, 148 when the clamps 152, 154 are locked in place by the screw 162 and nut 164.

Figure 19:
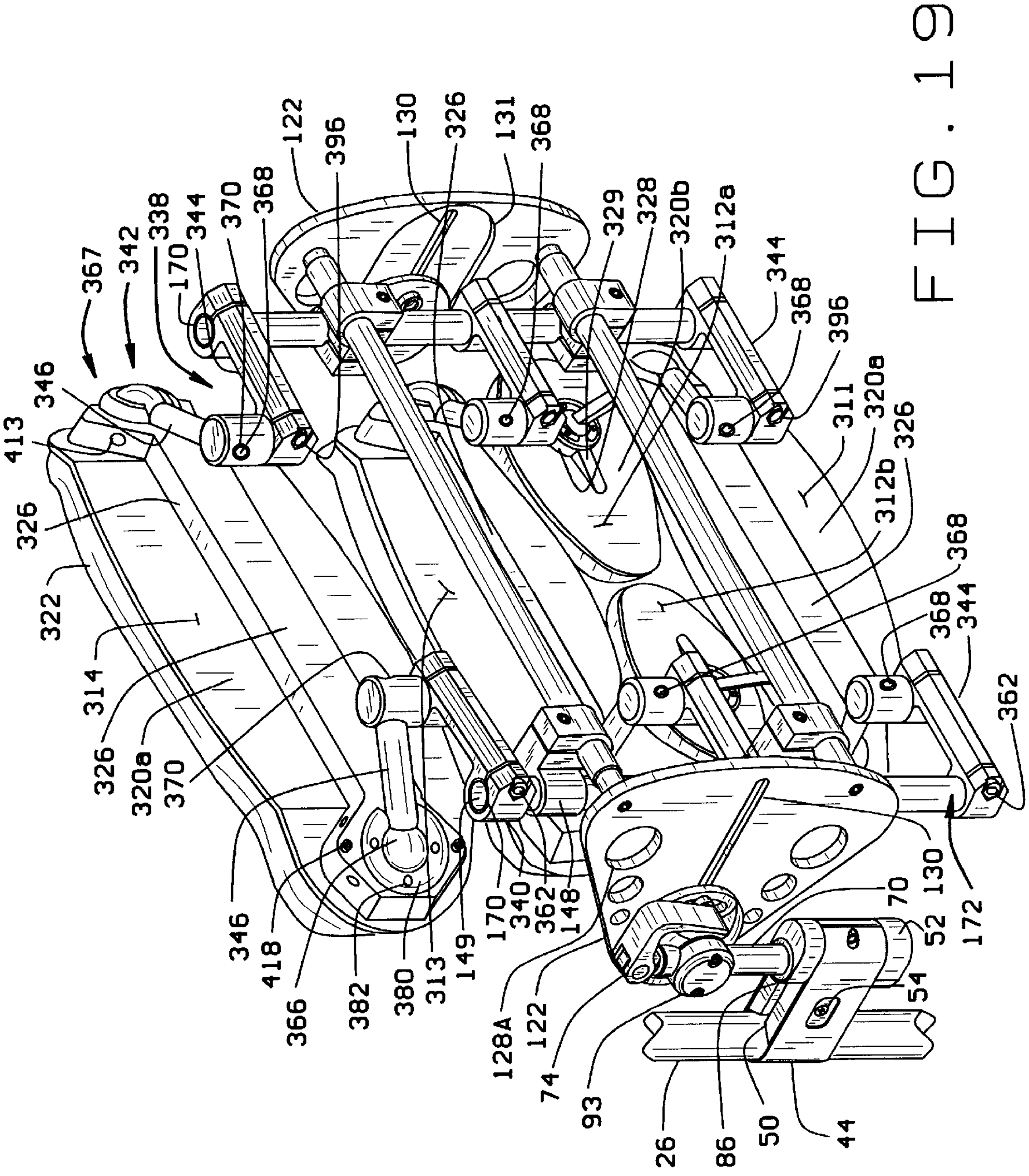
FIG. 19 is a rear perspective view of pads associated with three tiers of support that are attached to the support tubes via elbow joints and ball and socket joints.

Thus, the vertical back support tubes 148 are secured at a desired location or height inside the openings 157 of the tube clamp assemblies 150 as shown in FIG. 2 upon assembly of the backrest system 30. The tube clamps 150 provide sufficient clamping force to securely hold the support tubes 148 in position. Furthermore, the fastening screws 162 can be loosened to allow the height or positioning of the tubes 148 to be adjusted with respect to the horizontal tubes 132, if required. The position of the vertical support tubes 148 also can be adjusted inwardly or outwardly along the horizontal tubes 132 by mounting the tube clamps 150 at any location along the horizontal tubes 132. Thus, the height and width of the backrest 30 can be varied in these manners as well to accommodate different types of back supports 34 and different sizes of users. Moreover, as discussed below and shown in FIG. 34, if the vertical tubes 148 are not of a sufficient length for a particular application, an extension tube assembly 463 can be mounted to either an upper end 170 or a lower end 172 of the vertical tubes 148, or both ends 170 and 172, if desired (FIG. 19).

V. Back Supports

As will be apparent to those skilled in the art, numerous types of back supports 34 can be secured to the vertical support tubes 148 of the present invention. The modular backrest system 30 of the present invention is designed to be highly adaptable, and satisfies users having a broad range of disabilities. In the preferred embodiment, one of two types of back supports 34 is employed, depending upon the support needs of the particular wheelchair user. As discussed hereinafter, wheelchairs 10 used to transport individuals who do not require extensive positioning and back support (e.g., the elderly) are provided with a back support 180 (FIGS. 13–16) having a rigid backing plate or shell 182, and an insert 184 attached to the backing plate 182. In this configuration, the height of the back support 180 can be varied, based upon the support needs of the user (see FIGS. 13 and 16, and discussion hereinafter). When more extensive support and positioning are required (e.g., for paraplegics or quadriplegics), an adjustable pad assembly 300 (FIGS. 17–33) set forth hereinafter is attached to the support tubes 148 (instead of the backing plate 182 and insert 184) to provide a low resolution displaceable back support surface 298. The number of pads 300 used in this configuration is based upon the degree of support required for the particular user.

A. Single Pad

Figure 13:
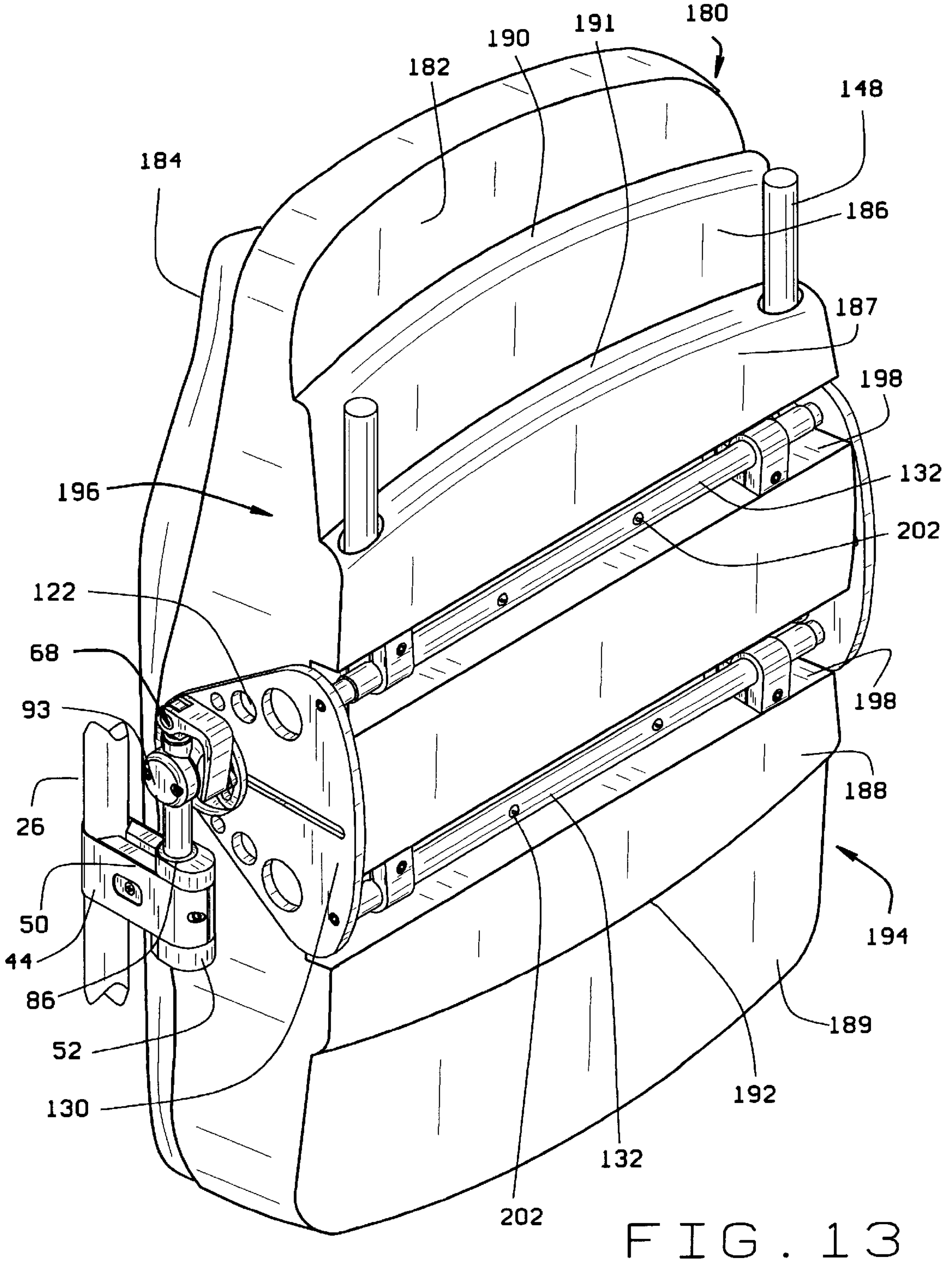
FIG. 13 is a rear perspective view of a first embodiment of the back support mounted to the support chassis.

Turning now to the first embodiment of the back support 180 shown in FIGS. 1, and 13–16, the backing plate 182 and insert 184 configuration is a simpler system for a prescriber or technician to fit to the particular user than the pad assembly 300. The backing plate 182 is constructed from a generally rigid polymer material such as ABS plastic, and is molded to include a plurality of predefined surface levels or tiers that allow for varying the height of the back support by manually trimming or cutting the shell to a desired size. Alternatively, multiple backing plates of varying sizes can be constructed and fitted with inserts, and an appropriate back support is selected from this group based upon the support needs of a particular wheelchair user. In the preferred embodiment of FIGS. 14 and 15, five predefined tiers 185, 186, 187, 188, 189 are shown, with a plurality of "cut lines" 190, 191, 192 indicating the locations where the prescriber or technician can cut the shell 182 to fit to adjust the height for the particular end user. Thus, the cut lines 190, 191, 192 provide a cutting guide to reduce the shell 182 size to appropriate dimensions while ensuring that correct proportions are maintained for the back support 180. As shown in FIG. 13, the shell 182 has a short member 194 and a tall member 196 located on either side of a pair of notches 198 that extend inwardly and transversely across the shell 182. The tall member includes tiers 185, 186 and 187, and has a greater overall height or length than the short member which includes tiers 188 and 189. The notches 198 are sized to receive the tubes 132 when the shell 182 is attached to the support chassis 32 so that the rearwardly presented surfaces of the tubes 132 are flush with the rearwardly presented face of the shell 182. The shell 182 also includes a four recesses 199 extending inwardly from notches 198 that are adapted to accommodate the tube clamps 150 when the shell is attached to the support chassis 32 (FIGS. 13 and 15). In the embodiment of the shell 182 shown in FIG. 15, openings 197 can be formed in the notches of the shell 182 that are sized to accommodate screws or bolts 202 to fasten the shell 182 to the horizontal tubes 132. Based upon the height and support needs of the user, the orientation of the back support 180 can be varied such that either the short member 194 (tiers 188 and 189) or the tall member 196 (tiers 185, 186, 187) of the backing plate 182 extends upwardly from the support chassis 32.

FIG. 13 shows the backing plate 182 mounted to the support chassis 32, with the tubes 132 positioned inside the notches 198. The support chassis 32 provides structural integrity and incorporates additional adjustable features as discussed above. The backing plate 182 is attached to the tubes 132 of the support chassis 32 by a fastening mechanism such as, for example, nuts (not shown) and bolts 202, or the backing plate 182 can be molded to fasten or snap around at least a portion of the tubes 132. The support tubes 148 of the backrest 30 are positioned between the backing plate 182 and insert 184, and extend outwardly through openings 203 formed in a surface 204 extending between tiers 186 and 187 of the back support 180. As discussed hereinafter, the back support 180 also can be expanded to include a headrest assembly 315 (FIG. 33) that is mounted to the support tubes 148 and lateral pads 500 that are mounted to the side plates 122 to provide additional support for the user.

The insert 184 against which the user rests his or her back is secured to the forwardly presented face of the backing plate 182. In the preferred embodiment, a fastening mechanism 174 such as VELCRO® hook and loop fasteners is used to removably secure the insert 184 to the backing plate 182. The insert 184 can be constructed from a single piece of foam, a plurality of air cells or can be a composite of a cellular cushion including a plurality of air cells disposed in a center portion of the cushion with foam provided on either side of the air cells. A suitable air cell cushion is the type manufactured and sold by ROHO, Inc. of Belleville, Ill., and set forth in U.S. Pat. Nos. 4,541,136, issued Sep. 17, 1985 and 5,369,828 issued Dec. 6, 1994. When a foam cushion is employed, the insert preferably has a self-skinned foam barrier as the forwardly presented surface of the insert that prevents moisture or fluids from entering the cushion. A removable, washable fabric cover 175 (FIG. 15A) preferably is positioned over the insert 184 and at least a portion of the associated backing plate 182. In FIG. 15A, the cover 175 wraps around the entire back support 180, and is held in position by a fastening mechanism 176 such as VELCRO® hook and loop fasteners. Alternatively, an elastic band can be attached to the outer edge of the cover so that the cover can be slipped over the insert 184 and a portion of the shell 182, and held in place by the elastic band.

Figure 16:
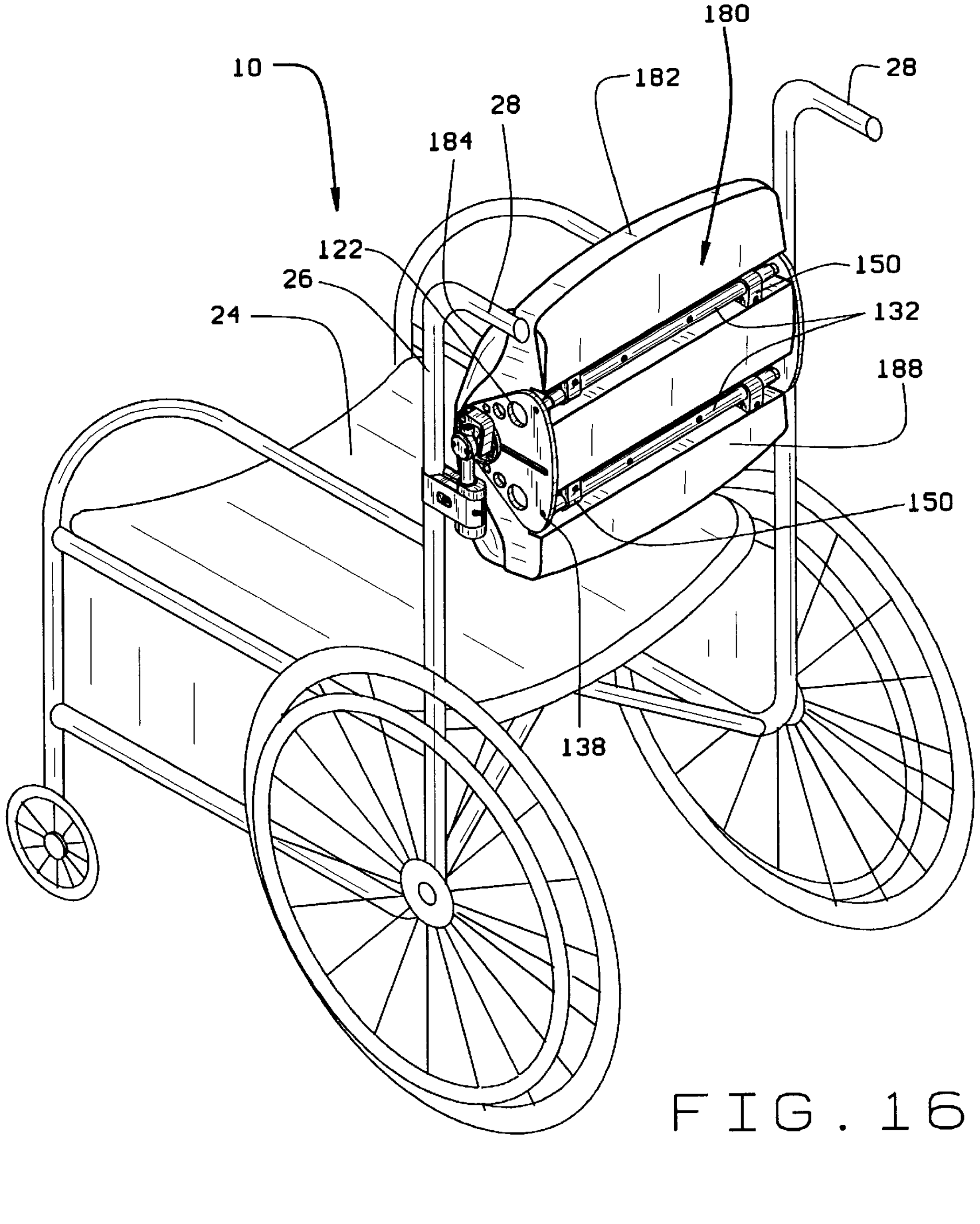
FIG. 16 is a rear perspective view of the back support employed for a wheelchair user requiring minimal support, showing the wheelchair, support chassis, and attachment assembly in phantom.

FIG. 16 illustrates the form of the back support 180 that can be used when the minimal amount of support is required for an "active" wheelchair user. In this configuration, the backing plate 182 is cut along cut lines 191 and 192 so that only tiers 187 and 188 are employed. The insert 184 is adapted to fit within this reduced shell size. Alternatively, instead of cutting down the shell shown in FIGS. 13–15, this "active user" form of the back support 180 can be constructed as a solid molded shell 182 that includes only tiers 187 and 188. Support tubes 148 are not provided in this configuration since the active user requiring this minimal back support should not require a headrest assembly 315, hip pads 672 or lateral pads 500, 800.

Figure 16A:
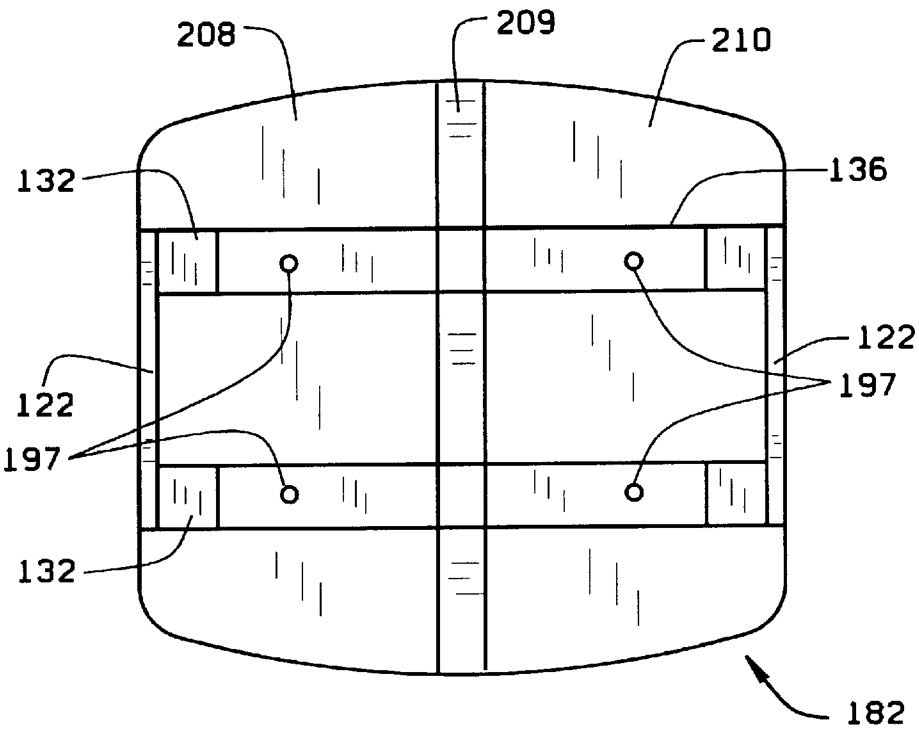
FIG. 16A is a fragmentary back view showing a modification of the back support of FIG. 16.

In the preferred embodiment of back support 180, the backing plate is constructed from a single sheet of a substantially rigid polymer material, such as ABS plastic, and attached to the chassis 32 after the chassis width is established. However, in an alternative construction shown in FIG. 16A, the backing plate 182 is divided into two parts 208, 210 along its vertical center line to allow for limited width adjustment of the shell 182 to accommodate different trunk girths associated with various end users. In this configuration, the width of the shell 182 can be increased up to a maximum width (e.g., four inches), if desired, by providing horizontal tubes 132 of a desired length and properly positioning the tubes in the mounting posts to widen the support chassis 32 to the desired width. A middle section 209, preferably between 4 to 5 inches in width, is disposed between the two parts 208, 210, and extends between upper and lower ends of the backing plate 182. The middle section 209 acts as a filler to occupy the space between the first and second parts 208, 210 when the shell is expanded in width by moving each part 208, 210 outwardly. The shell 182 can be preformed for various heights, with the width of the shell 182 preferably being adjustable up to two inches for each height.

B. Adjustable Pad Assembly

FIGS. 17 to 33 show a second embodiment of the back support for the backrest system 30, referred to generally by reference numeral 298. In this configuration, the back support 298 includes a plurality of pads 300 that are adjustably mounted to the vertical support tubes 148 (or to separate mounting assemblies as discussed hereinafter) to provide a low resolution displaceable surface against which the user rests his or her back. As discussed hereinafter, the pads 300 can be manipulated inwardly and outwardly, tilted downwardly and upwardly, rotated and selectively positioned at desired heights along the support tubes 148 to conform the back support surface to the user's back and provide improved support. The number of pads 300 employed in the back support 298 is dependent upon the degree of support required for a particular wheelchair user, and the size of the user. As discussed below, pads 300 easily can be added to or removed from the support tubes 148 by the prescriber so that the backrest system 30 can be assembled to satisfy individual needs of the user. Pads 300 can be attached to the support tubes 148 symmetrically or asymmetrically based upon the individual needs (e.g., when the user has scoliosis).

Figure 18A:
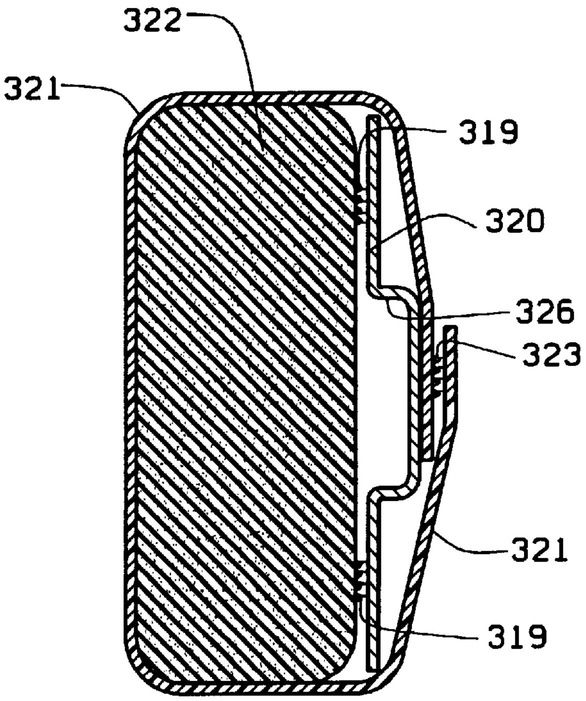
FIG. 18A is a cross sectional view of a pad showing a removable cover wrapped around the pad.
Figure 18:
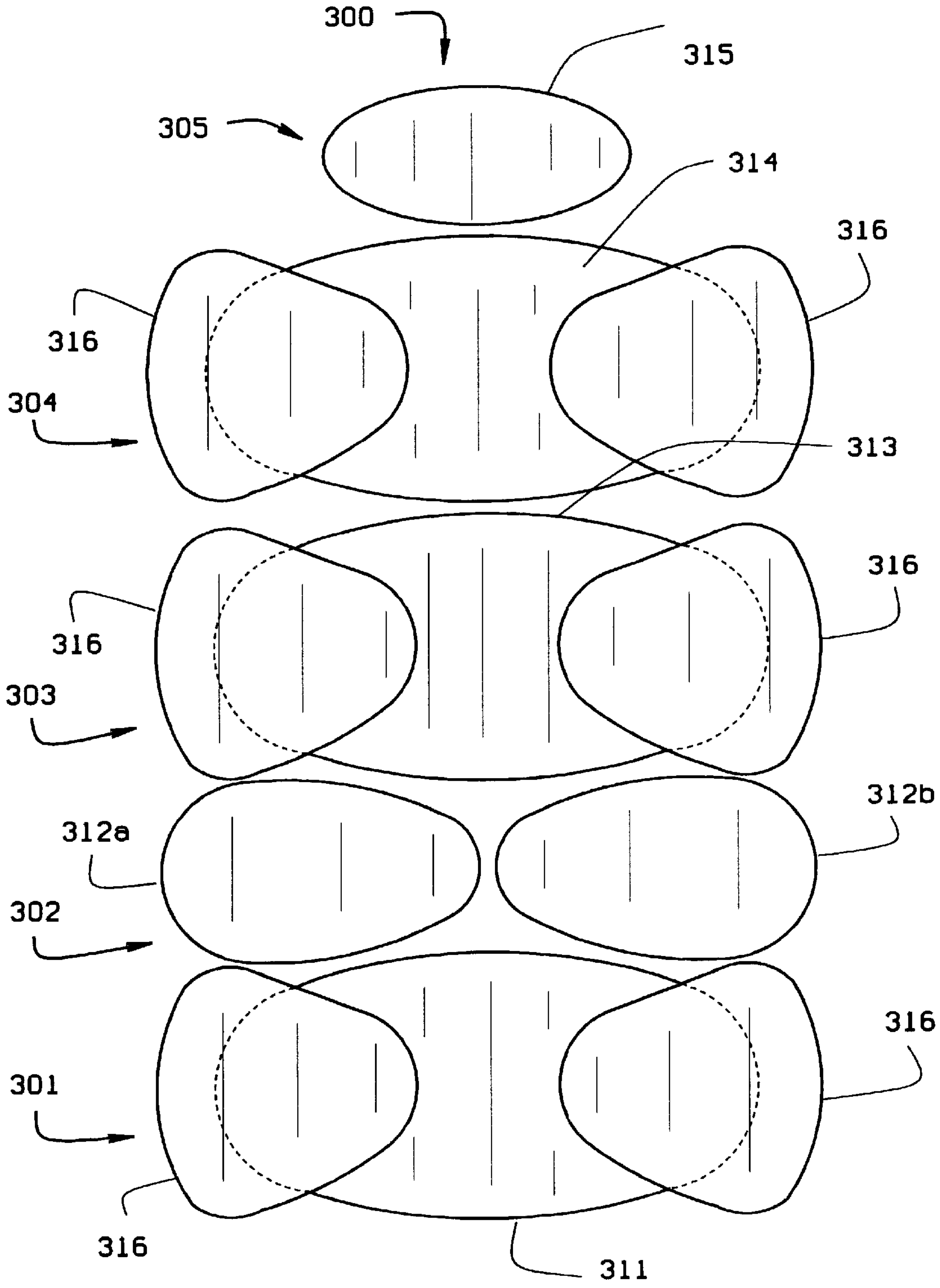
FIG. 18 is a front elevational view schematically illustrating the preferred arrangement of pads associated with the second embodiment of the back support.

In one embodiment of the present invention that is shown schematically in FIG. 18, the pad assembly 300 is designed to provide adjustable support for up to five regions of the user's spinal column, if necessary. These five regions or tiers of support include: (1) the sacral region, (2) the lower thoracic/lumbar region, (3) mid-thoracic region, (4) the upper-thoracic region, and (5) the head. The back support 298 can be assembled to provide one or more pads 300 to support the user's spinal column in each of these five regions.

Figure 40A:
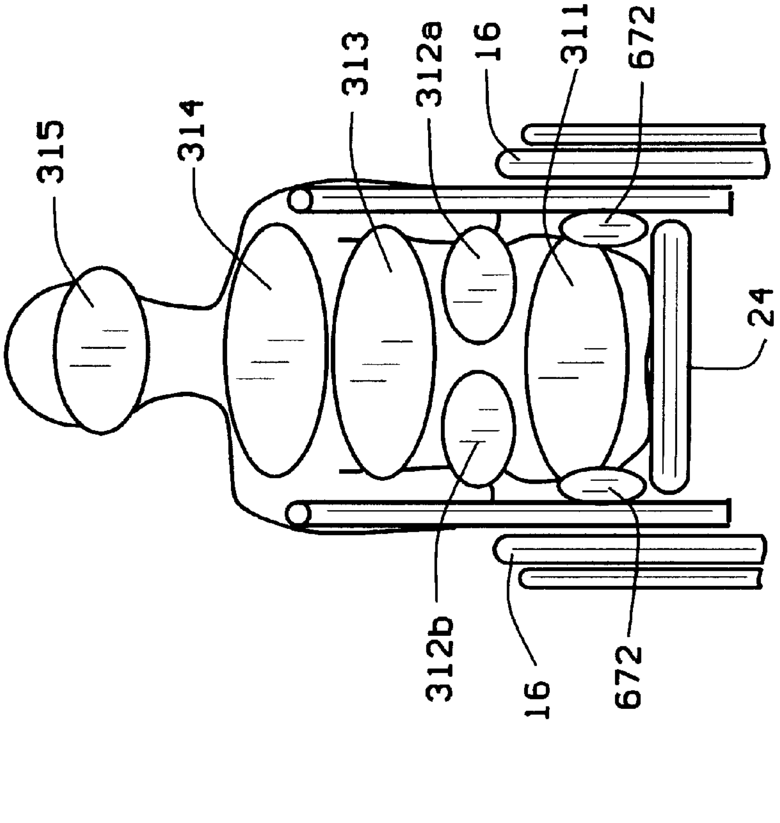
FIG. 40A is a rear schematic view illustrating one arrangement of the pads associated with the backrest system.
Figure 40B:
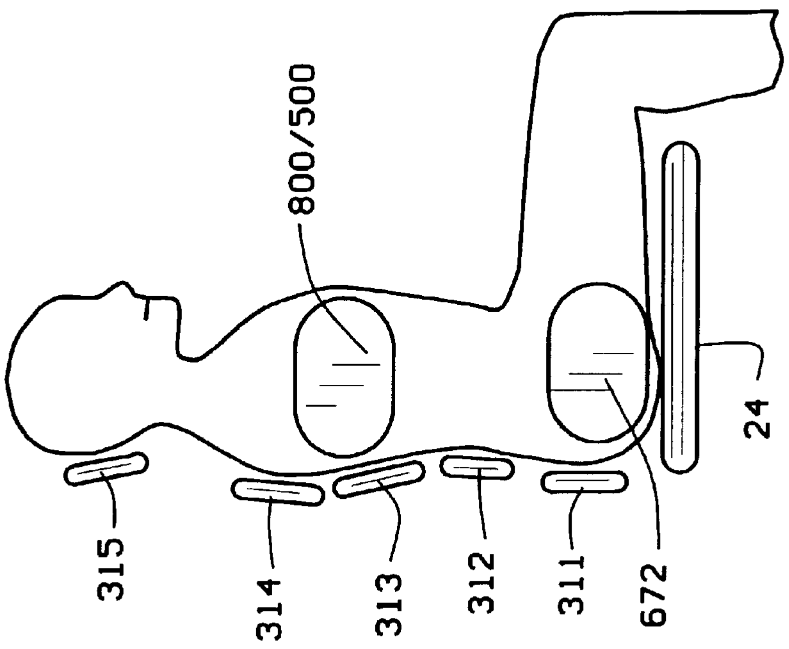
FIG. 40B is a side view schematically illustrating the pad arrangement of FIG. 40A.

The pad assembly 300 generally is referred to as including up to five tiers of support for the above regions of the user's spinal column. These tiers include a first tier 301 for supporting the sacral region and stabilizing the pelvis, a second tier 302 for supporting the lumbar region, a third tier 303 for supporting the mid-thoracic region, a fourth tier 304 for supporting the upper-thoracic region, and a fifth tier 305 for supporting the head. As shown in FIG. 18, each of the first, third and fourth tiers 301, 303, 304 preferably includes a substantially oval-shaped single trunk pad, 311, 313, 314, respectively. Up to two wing pads 316 can be added to any of these oval pads 311, 313, 314, if desired to provide additional support. The second tier 302 includes two thoracic pads or dual trunk pads 312*a*, 312*b*, and the fifth tier 305 includes a substantially oval shaped headrest pad 315 that has different dimensions than those of pads 311, 313, 314 to provide improved support for the head as discussed hereinafter. Wing pads 316 preferably are not employed in conjunction with the dual trunk pads 312*a*, 312*b* or headrest pad 315. However, wing pads or similarly configured temporal lobe pads (not shown) can be attached to the headrest pad 315, if desired. As previously noted, FIG. 18 schematically illustrates the layout of the pads 311, 312*a*, 312*b*, 313, 314, and 315, and the wing pads 316 associated with each tier 301, 302, 303, 304 and 305 of support. FIGS. 40A and 40B further illustrate this orientation of the pads 300 with respect to a wheelchair occupant. It will be appreciated that the foregoing arrangement of dual trunk pads and single trunk pads that is set forth as the preferred embodiment is only one of numerous possible pad 300 arrangements. At any tier of support, either a single trunk pad or dual trunk pads can be employed, if desired, to provide optimum support for the particular wheelchair user. The dual trunk pads allow for more precise pad placement because they are moveable within six degrees or planes of freedom and allow for greater contouring and support for individuals having severe curvature of the spine. Wing pads 316 can be added to any single trunk pad to provide additional support.

For illustrative purposes only, the following description assumes that the "typical" user requiring improved support associated with the pad assembly 300 requires a "standard" configuration of the back support 298 that includes the pads 311, 312*a*, 312*b*, 313 associated with the first, second and third tiers 301, 302, 303 (see FIGS. 22A–D). However, it will be appreciated that the number of pads 300 can be varied to provide additional support based upon the individual needs of the user. The back support 298 can be assembled with one or more tiers of pads 300, each of which is specifically tailored to provide a desired degree of support for the user's spinal column. Pads 314, 315 associated with the fourth and/or fifth tier 304, 305 can be added, if necessary. Furthermore, pads can be removed from the standard configuration, if such pads are not necessary to provide support to the user. For example, an "active" wheelchair user, such as a paraplegic, may require only minimal trunk support. In this situation, the back support for an active user may employ the first and second tiers 301, 302 of pads 311, 312*a*, 312*b*, or may use the first and third tiers 301, 303 of pads 311, 313. In contrast, a high level lesion (e.g., quadriplegic) may require first, second, third and fourth tiers 301, 302, 303, 304 of pads 311, 312*a*, 312*b*, 313, 314. In another example, some disabilities are progressive, such as Duchenne Muscular Dystrophies, and require progressive support from the age of eight years on as the user's ability to maintain an upright posture diminishes to a point of complete collapse by late teenage years. This backrest system 30 allows the degree of support to be uniquely tailored to present needs of the user, and expanded at a later time by adding additional pads 300 if additional support is needed. Moreover, as stated above, single trunk pads or dual trunk pads can be used to provide support for any region of the user's spinal column. Thus, the pad assembly 300 allows for the backrest system 30 to be uniquely tailored for each individual's support needs by providing the ability to accommodate anyone from an active user who requires only minimal trunk support to a severely disabled person who requires a fully supportive system that is capable of addressing complex seating requirements.

1. Pad Construction

Figure 20:
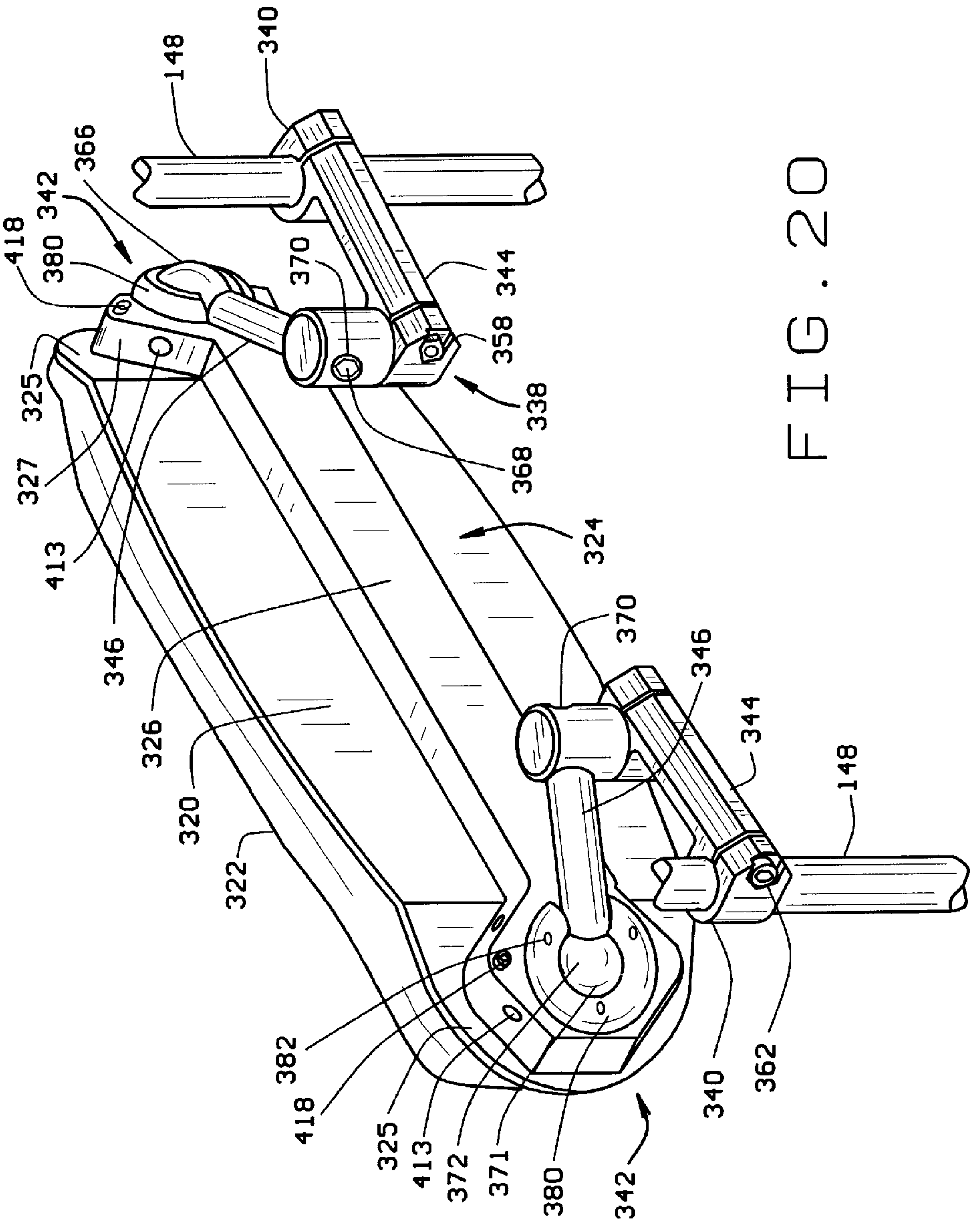
FIG. 20 is a rear perspective view of a single trunk pad, showing the elbow joints and ball and socket joints that permit adjustment within five degrees of freedom.

As shown in FIG. 20, each pad of the pad assembly 300 includes a backing plate or shell 320*a*, 320*b* or 320*c* (referred to collectively as backing plate 320) and a cushion or insert 322 that is attached to the backing plate 320 and against which the user rests his or her back. The backing plate for the single trunk pads is referred to by reference number 320*a*. The backing plate for the dual trunk pads is referred to by reference number 320*b*, and reference number 320*c* refers to the backing plate for the headrest pad. The cushion 322 attached to each backing plate 320 may be a simple foam located over the forwardly presented face of the backing plate 320 (FIG. 18A). Alternatively, the cushion can be glued to the backing plate 320. The foam cushion preferably has a self-skinned foam barrier as the forwardly presented surface of the cushion to prevent moisture or fluids from entering the cushion 322. In the preferred embodiment, a fastening mechanism 319 such as VELCRO® hook and loop fasteners is used to removably secure the cushion to the backing plate 320 (FIG. 18A). Alternatively, the insert 322 can be glued to the backing plate 320. A removable, washable fabric cover 321 (FIG. 18A) preferably is positioned over each cushion and at least a portion of the associated backing plate. In FIG. 18A, the cover 321 wraps around the entire pad, and is held in position by a fastening mechanism 323 such as VELCRO® hook and loop fasteners.

Figure 24B:
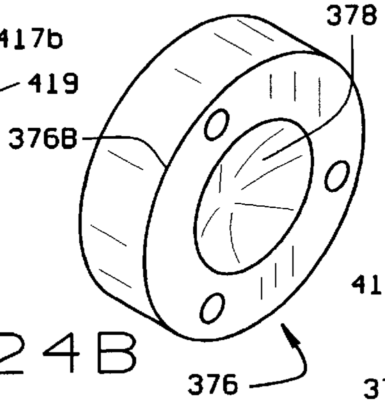
FIG. 24B is a perspective view of a round base of the socket associated with the ball and socket joint for dual trunk pads.
Figure 24A:
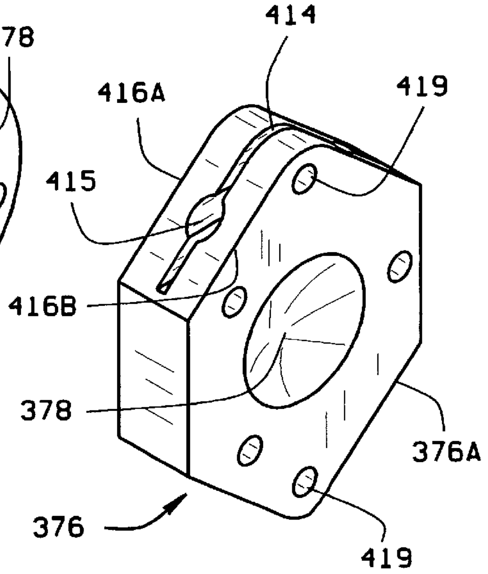
FIG. 24A is a perspective view of a hexagon-shaped base of the socket associated with the ball and socket joint for single trunk pads and the headrest pad.
Figure 26:
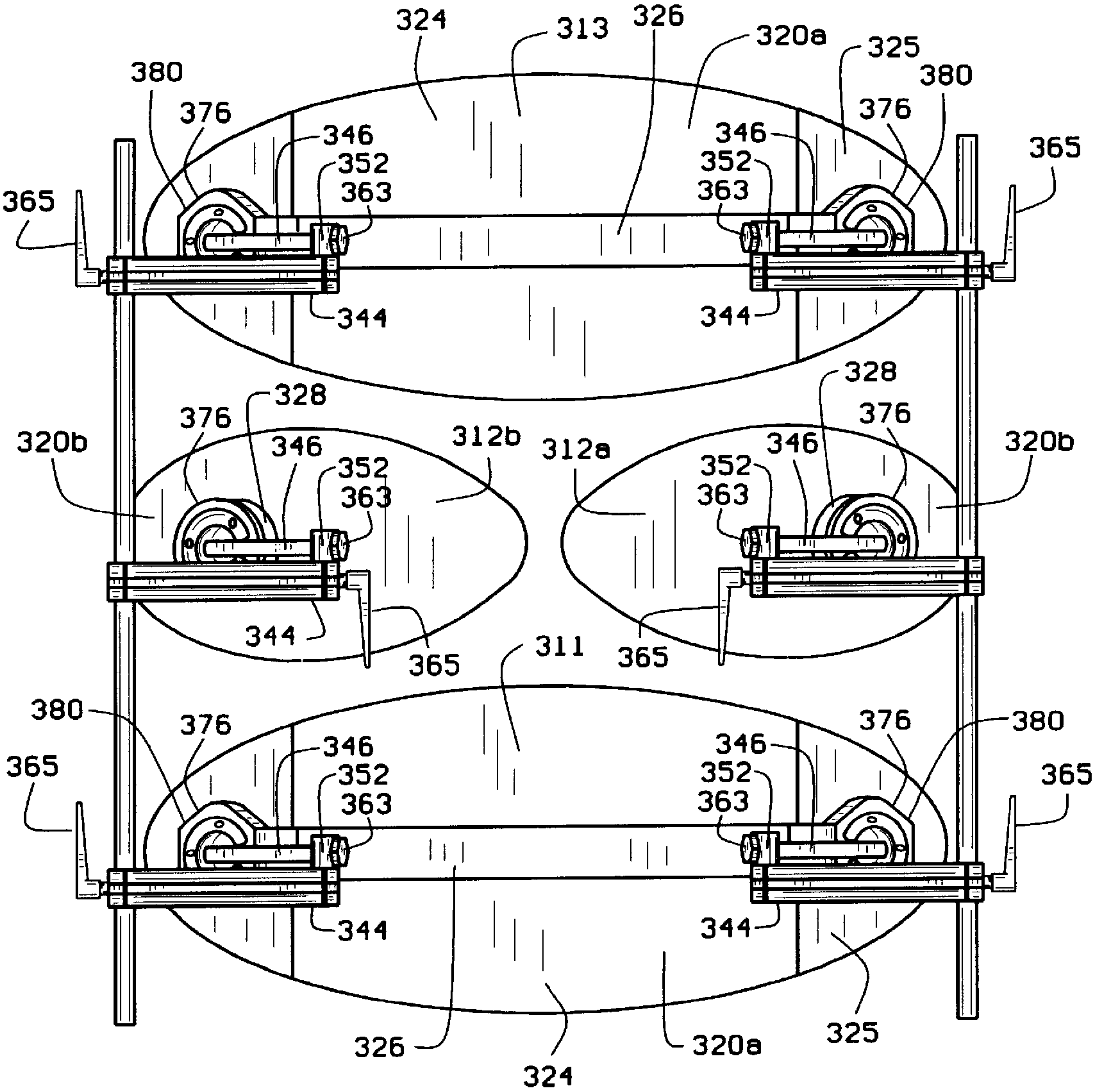
FIG. 26 is a rear elevational view of the back support assembly, showing one illustrative arrangement of knobs and handles that allow a prescriber to easily manipulate and position the pads via the elbow joints and ball and socket joints.

The backing plate 320 preferably is formed from a sheet of generally rigid polymer material such as ABS plastic. The back plate 320*a* of the single trunk pads 311, 313, 314 associated with the first, third and fourth tiers generally includes a substantially flat member 324 and two forwardly angled flanges 325 extending from opposite sides of the flat member 324 at an obtuse angle, as shown in FIGS. 19, 20, 21A–21C and 27. The flat member 324 has a rearwardly extending rib 326 formed therein that improves the structural integrity of the backing plate 320*a* to prevent flexing and bending of the flat member 324 (FIG. 26). Each flange 325 has a rearwardly extending housing 327 formed therein that is adapted to receive a socket base 376 (FIGS. 24A or 24B) associated with a ball and socket joint 342 (discussed hereinafter). As discussed more fully below, a socket base 376A is shown in FIG. 24A for the single trunk pad that has a hexagon shape and allows for attachment of wing pads 316 thereto.

The backing plates 320*b* for the dual trunk pads 312*a*, 312*b* associated with the second region have substantially elliptical shapes as shown in FIG. 19. As shown in FIG. 19, each of the backing plates 320*b* for pads 312*a* and 312*b* also has a rearwardly extending housing 328 formed therein that is adapted to receive a socket base 376B associated with the ball and socket joint 342 (discussed hereinafter), and a rib 329 extending rearwardly from the housing 328 to improve structural integrity of the backing plate 320*b*. The socket base 376B has a round configuration for the dual trunk pad assemblies (see FIG. 24B). As will be appreciated in view of the discussion below, the hexagon-shaped socket bases 376A are not needed on the dual trunk pads because wing pads 316 preferably are not attached to the dual trunk pads. The hexagon socket base 376A of the single trunk pads and the round socket base 376B of the dual trunk pads are referred to collectively as socket base 376. As set forth below and shown in the drawings, the ball and socket joints 342, along with elbow joints 338, allow for precise positioning of each pad of the pad assembly 300 based upon the support needs of the particular user.

The headrest pad 315 (FIG. 28) includes a backing plate 320*c* that has a flat member 330 that is sized to accommodate the user's head, and a pair of flanges 332 extending forwardly from opposite ends of the flat member 330 at a lesser obtuse angle than that of flanges 325. The flat member 330 has a rearwardly extending rib 334 formed therein that improves the structural integrity of the backing plate 320*c* to prevent flexing and bending of the flat member 330. Each flange 332 has a rearwardly extending housing 336 formed therein that is adapted to receive a triangular socket base 376A associated with a ball and socket joint 342 (discussed hereinafter). As discussed above and below, the triangular socket base 376A allows for attachment of wing pads 316 thereto.

The backrest system that employs the pad assembly 300 also is designed to be lightweight to allow for easy disassembly and transportation of the wheelchair. In the preferred embodiment, the backrest system weighs approximately three pounds (3 lbs.) when two single trunk pads are employed at the first and third tiers for active wheelchair users. The "standard" three tier 301, 302, 303 assembly employing pads 311, 312*a*, 312*b* and 313 weighs approximately five and a half pounds (5.5 lbs.). When pads are used at all five tiers to provide support, the backrest assembly weighs approximately ten pounds (10 lbs.). If hip pads and lateral pads are attached to the backrest assembly, the entire assembly weighs approximately twelve pounds (12 lbs.). It will be appreciated that the weight of such an assembly is considerably less than fully supportive molded systems currently available to the public.

2. Elbow Joints and Ball and Socket Joints

Each single trunk pad such as those pads 311, 313, 314 associated with the first, third and fourth tiers 301, 303, 304, and the headrest pad 315 of the fifth tier 305 preferably are mounted to the support tubes 148 (or separate mounting assemblies as discussed below for pads 314 and 315) by two elbow joints 338 (see FIGS. 20 and 23A–B). More specifically, one end of the elbow joint 338 is securely clamped around the support tube 148 (FIG. 20) at a desired height by a first clamp 340 that has an opening 360 formed therein which is adapted to receive the support tube 148. Another end of the elbow joint 338 is attached to the rearwardly presented face of the flanges 325 of the backing plate 320 by a ball and socket joint 342. Pads 312*a*, 312*b* of the second tier 302 are similarly attached to the support tubes 148 by one elbow joint 338, with one end of the elbow joint 338 being clamped around the support tube by clamp 340 and another end of the elbow joint 338 being attached to the rearwardly presented face of the backing plate 320 by the ball and socket joint 342 as shown in FIG. 20.

The elbow joint 338 and ball and socket joint 342 allow each pad to be independently adjustable with at least five degrees of freedom, thereby providing a highly displaceable back support surface. The six planes of movement in which the pads can move relate to the three body planes of an individual in which body movement occurs, namely, the sagittal plane, the frontal (coronal) plane and the transverse (horizontal) plane. These planes are perpendicularly oriented with respect to each other, in a similar fashion as the conventional three dimensional x, y and z planes, and intersect at the center of gravity of the body. As will be appreciated by those skilled in the art, the sagittal plane refers to any vertical plan that passes through the body parallel to the sagittal suture (median plane) which passes through the midline of the body so as to divide the body into equal right and left portions along the Sagittal Sinus. The frontal (coronal) plane refers to a vertical plane passing through the hip joints and the erect trunk dividing the body into anterior and posterior halves, and is parallel to the Coronal Suture of the skull. The transverse (horizontal) plane divides the body into superior and inferior portions, and extends horizontally from one side of the body to the other. Within these planes, the six degrees of movement include up and down in the frontal plane; side to side in the transverse plane; forward and back in the sagittal plane; tilt in the transverse plane; tilt in the frontal plane; and tilt in the sagittal plane.

The six degrees of freedom also can be illustrated in terms of the conventional three dimensional x, y and z planes. With respect to a horizontal x-axis, side-to-side movement along the x axis and rotational movement about the x-axis are permitted. With respect to the vertical y-axis that is perpendicular to the x axis, up and down movement along the y axis and rotational movement about the y axis are permitted. With respect to the z axis that intersects the x and y axes at right angles, forward and rearward movement along the z axis and rotational movement about the z axis are permitted.

More specifically, when one elbow joint 338 and one ball and socket joint 342 are used to attach a dual trunk pad to one support tube 148 (e.g., for pad 312*a* or 312*b*), the dual trunk pad can be adjusted in every direction, or within six degrees or planes of freedom (FIGS. 19 and 26). When two elbow joints 338 and two ball and socket joints 342 are used to attached the single trunk pads and headrest pad 315 to the support tubes 148, these pads can be adjusted within five degrees or planes of freedom (i.e., side to side in the transverse plane; forward and back in the sagittal plane; tilt in the transverse plane; tilt in the frontal plane; and tilt in the sagittal plane). To obtain the sixth degree of movement for the single trunk pads (i.e., limited rotational or up/down movement in the frontal plane), first members 344 of the elbow joints 338 can be displaced with respect to each other on the support tubes. In this configuration, the first member 344 of one elbow joint 338 is clamped to one vertical tube 148 at a higher location than the other first member 344 of the second elbow joint 338 associated with the single trunk pad. Since the dual trunk pads employ only one elbow joint, these pads have a larger range of movement than the single trunk pads with respect to the ball and socket joint 342.

With respect to the single trunk pads and dual trunk pads, each first member can be moved upwardly and downwardly along the vertical tube to a desired height, and can be rotated forwardly or rearwardly about the vertical tube to move the pad toward or away from the user. The first member and second member also can be rotated with respect to each other at the elbow joint. For the single trunk pads, the first member can be displaced with respect to each other at different heights along the vertical tubes, if desired, to obtain limited rotational movement in the frontal plane. The single trunk pad can be rotated within five degrees of freedom around the ball and socket joint. If the elbow joint is locked so that the second member does not rotate with respect to the first member and the ball remains unlocked in the socket, the single trunk pad can tilt within limited degrees of movement in the sagittal plane.

FIGS. 22A to 22D show possible pad arrangements and orientations that can be employed to support the back of individuals having varying degrees of spinal curvature (e.g., natural lordosis, kyphosis or scoliosis). The pad 311 associated with the first tier helps stabilize and support the sacrum by controlling pelvic tilt in an anterior-posterior direction. As discussed below, hip pads 672 can be added in this region to provide lateral stability as well. The orientation of pad 311 is easily adjusted to meet different needs such as the kyphotic position or rotation (scoliosis). Pad 311 can be moved within six degrees of freedom so that it is able to be properly positioned for any individual, regardless of the extent of asymmetry present for a particular person.

The third tier pad 313 is positioned over the lower ribs and thoracic spine to assist in stabilizing the trunk. Pad 313 sets the angle of the spine with respect to the pelvis. If the spine is flexible, it also affects the lumbar curve because the relationship between the anterior pelvic tilt (set by pad 311) and the lower thoracic spine initiates lordosis of the lumbar spine (see FIGS. 22A–D). It is possible to sit in a stable posture with only pads 311 and 313 attached to the vertical support tubes 148 provided the lower trunk of the individual has sufficient muscle tone to prevent it from collapsing. The curvature of the backing plate and insert for pad 313 provide sufficient lateral support to help stabilize this area. Without any lateral support in this area, the spine otherwise would have a tendency to rotate and shift laterally, thus initiating spinal curves and an unstable posture.

The dual trunk pads 312*a* and 312*b* are used for the second tier to provide lumbar trunk support. The dual trunk pads are preferred in this region to provide improved lumbar support and lateral stability to the spine in this very flexible area of the spine. Thus, these pads 312*a* and 312*b* can be used to add lumbar support, or lateral support, or both. The pads 312*a* and 312*b* can be rotated around the trunk to provide some uplift for the rib cage. In this manner, the pads 312*a*, 312*b* help support the rib box and prevent it from collapsing forward onto the pelvis. This can help the respiratory function of the seated individual as well as that person's posture.

Thus, the pads 311, 312*a*, 312*b*, 313 associated with the first, second and third tiers are used to stabilize the lower trunk. For individuals who have tone in their upper trunks and tolerate a relatively upright posture, these pads 311, 312*a*, 312*b*, 313 generally provide sufficient trunk support for complete stability. If deformities exist, the pads 311, 312*a*, 312*b*, 313 can be positioned to help stabilize the deformity, as illustrated in FIGS. 22A–D.

More specifically, for the kyphotic sitter (FIG. 22C), the dual pads 312*a*, 312*b* can be used to accommodate the hump and apply lateral stability to the trunk. The split or opening between the pads 312*a*, 312*b* also is useful for relieving pressure over the apex of the curve which can be particularly prominent over the spinous processes with this type of deformity.

When scoliosis exists (FIG. 22D), the dual pad assembly 312*a*, 312*b* at the second tier can be rotated so that the pads provide asymmetric support and fit around the hump of the rib cage on the convex side of the curve and under the concavity of the lower rib cage on the other side to provide essential support around this region. This helps to prevent the collapse of the lower ribs on the concave side of the curve onto the top of the iliac crest on the same side.

In either case of kyphosis or scoliosis, the dual trunk pads can be used at any tier and positioned at any location along the vertical support tubes 148, instead of using a single trunk pad. If severe spinal curvature is present, the use of dual pads at other regions or tiers further increases the ability to contour the backrest system to asymmetric curves of the body so that severe deformities can be accommodated and supported.

a. Elbow Joints

Figures 21A, 21B, 21C:
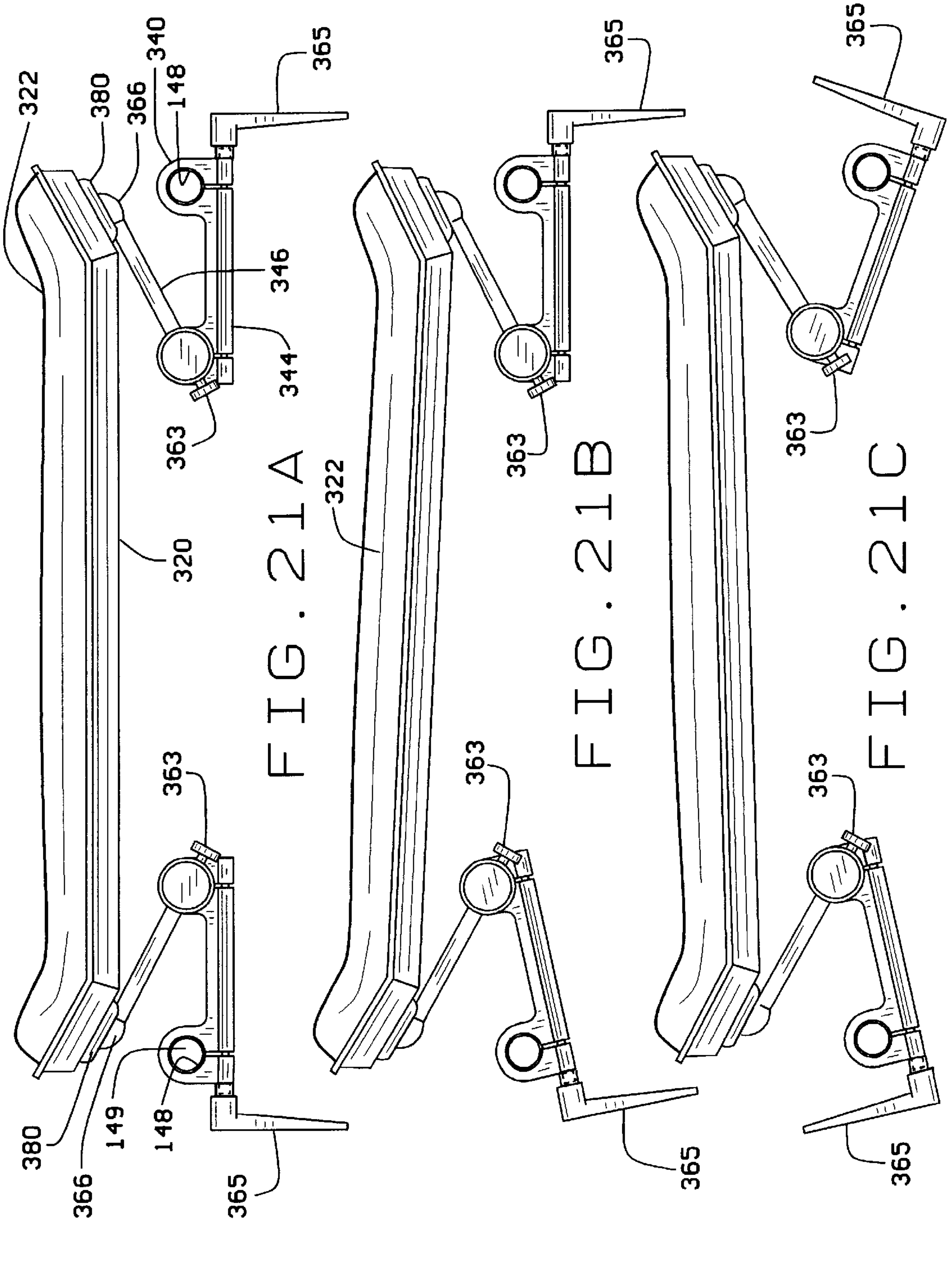
FIGS. 21A, 21B and 21C shown top sectional views of a single trunk support pad mounted to the vertical support tubes via the elbow joints and ball and socket joints, illustrating three of the numerous positions into which the back support pad can be moved by a prescriber.
Figures 22A, 22B, 22C, 22D:
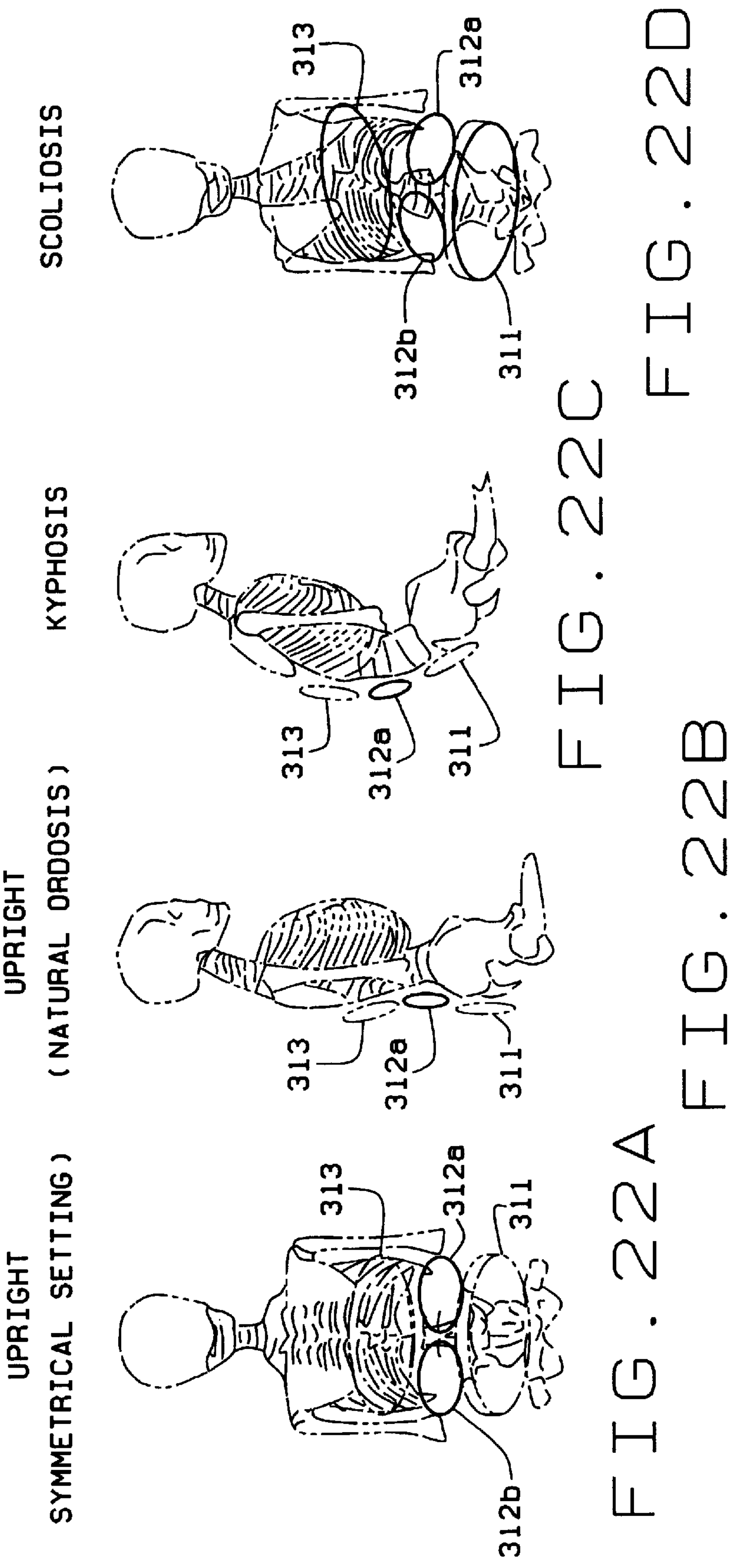
FIG. 22A shows a rear elevational view schematically illustrating an orientation of single trunk and dual trunk pads that are oriented to conform to the contours of an individual sitting upright in a wheelchair who has substantially symmetrical spinal curvature.
FIG. 22B shows a rear elevational view schematically illustrating an orientation of single trunk and dual trunk pads that are oriented to conform to the contours of an individual sitting upright in a wheelchair who has natural lordosis of the spinal column.
FIG. 22C shows a rear elevational view schematically illustrating an orientation of single trunk and dual trunk pads that are oriented to conform to the contours of an individual sitting upright in a wheelchair who has kyphosis of the spinal column.
FIG. 22D shows a rear elevational view schematically illustrating an orientation of single trunk and dual trunk pads that are oriented to conform to the contours of an individual sitting upright in a wheelchair who has scoliosis of the spinal column.

Each elbow joint 338 includes a first member 344 that is operably attached to a second member 346 by a swivel attachment device 348 so that the first member 344 rotates freely with respect to the second member 346 around the swivel attachment device 348. In one embodiment of the present invention, the attachment device 348 includes a swivel 350 having an opening 351 formed therein that is adapted to accommodate one end 352 of the second member that is opposite the ball and socket joint 342, as shown in FIGS. 20, 23A and 23B. As discussed below, in this configuration, the swivel 350, first member 344 and second member 346 of the elbow joint 338 preferably are constructed from a strong engineering plastic material or a polycarbonate material. The swivel 350 includes a post 353 that extends downwardly through an opening 354 formed in a second clamp 355 associated with the first member 344. As shown in FIG. 23A and 23B, the first and second clamps 340, 355 are disposed at opposite ends of the first member 344. The post 353 is held in the opening 354 in the second clamp 355 by a retaining ring 356 that is securely retained inside a radially inwardly extending notch 349 formed around the periphery of the lower end of the post 350. The retaining ring 356 allows the first member 344 to rotate freely around the post 350. The elbow joints 338 permit side-to-side movement and forward and rearward movement of each flange of the pads 311, 313, 314, and 315 and of pads 312*a* and 312*b*. Thus, the elbow joints 338 allow for adjustability of the back support 298 in depth, width and height. By adjusting the pads 300 via the elbow joints 338, the back support 298 can be adjusted to asymmetrical positions if required so that scoliotic and kyphotic spinal curves can be accommodated by the backrest system 30. Various orientations of the pads 300 with respect to the support chassis 32 and tubes 148 are shown in FIGS. 21A, 21B and 21C.

Figure 27:
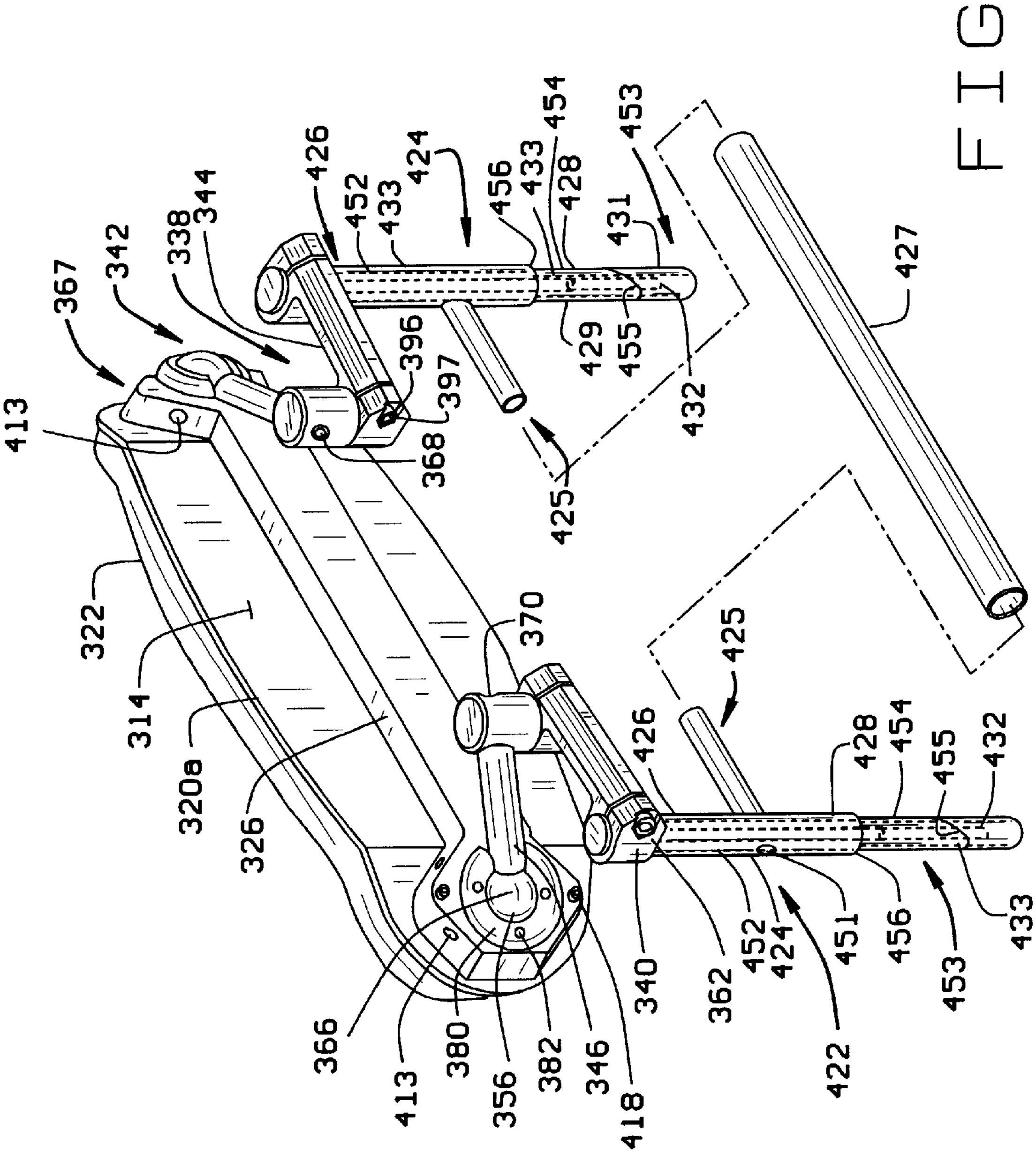
FIG. 27 is a rear perspective view of the back support pad associated with the fourth tier of support, showing the mounting assembly that can be used to attach the fourth tier pad to the support tubes.

The first member 344 preferably has a cylindrical opening 358 extending axially therethrough that is sized to receive a threaded bolt 362 that is used as a locking mechanism to prevent movement of the first member with respect to the support tube 148 and the post 350 of the second member 346. The bolt 362 preferably is held in place by a lock nut 396 as shown in FIGS. 23B, 19 and 27. The opening 358 extends between two recesses 397 formed in the clamps. The recesses 397 are adapted to accommodate the lock nut, and to prevent rotation of the lock nut as the bolt 362 is tightened. For example, when the periphery of the lock nut is a hex nut having a hexagonal periphery, the recess is sized as shown in FIGS. 23B, 19 and 27 to accommodate the nut therein and prevent rotation of the nut as the bolt is tightened.

Figure 23A:
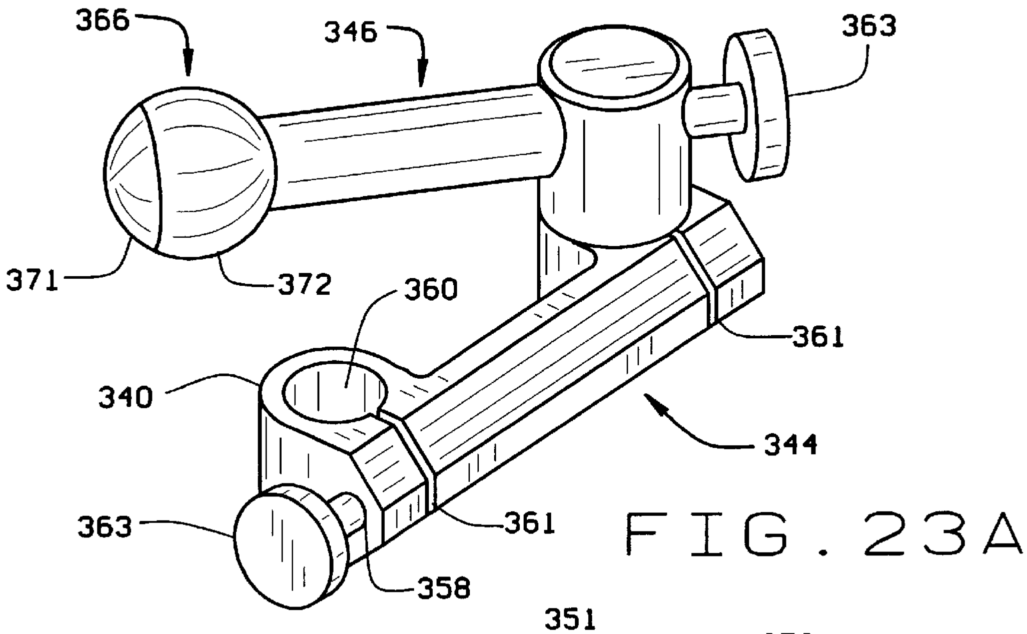
FIG. 23A is a perspective view of the elbow joint and the ball associated with the ball and socket joint.
Figure 23B:
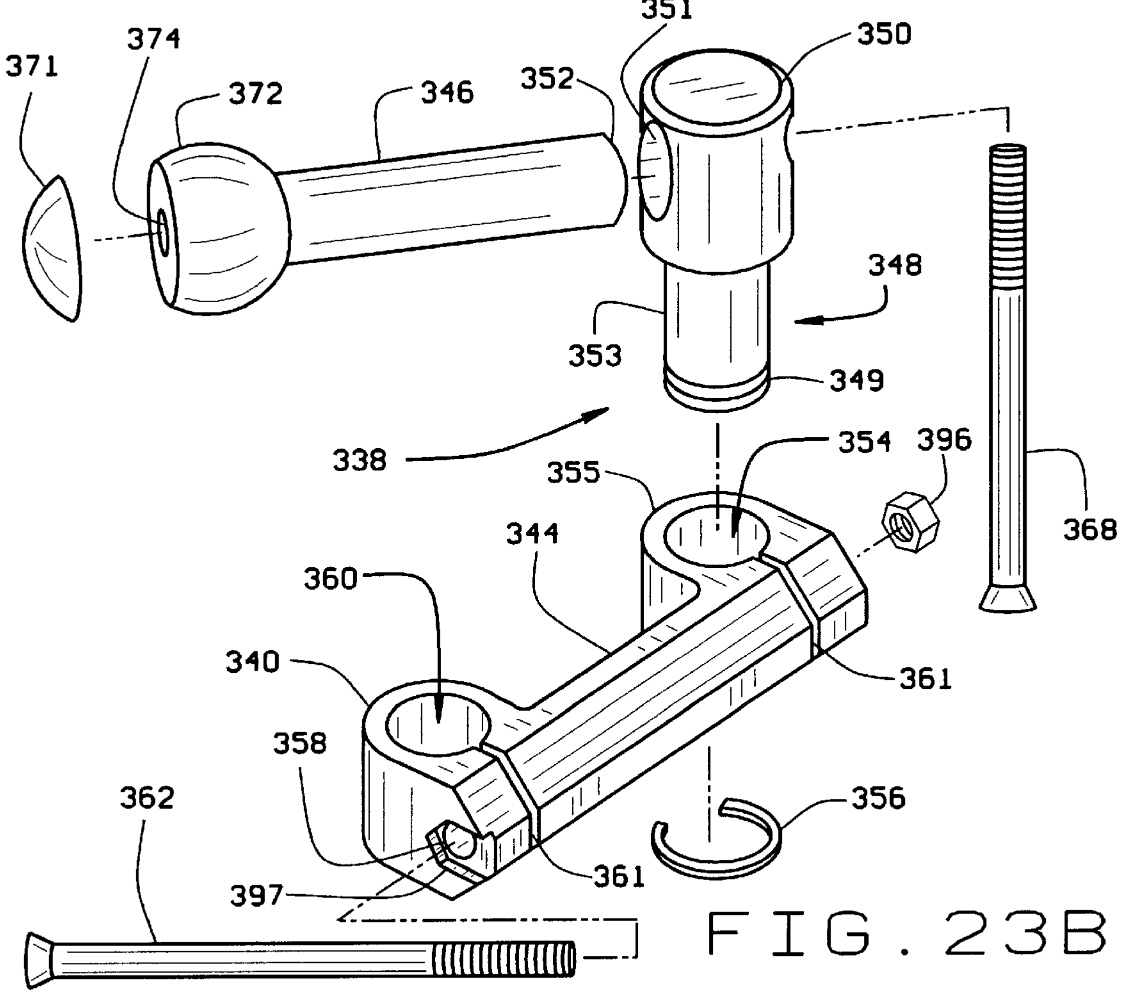
FIG. 23B is an exploded view of the elbow joint and the ball associated with the ball and socket joint.

As shown in FIGS. 23A and 23B, a slot 361 extends outwardly through the first member 344 from the openings 360 and 354 in the clamps 340 and 355. As hereinbefore discussed, the support tube 148 is inserted through the opening 360 in the clamp 340 and moved upwardly or downwardly along the tubes 148 to a desired location.

In the preferred embodiment, the first and second members 344, 346 are constructed from a lightweight and durable plastic material, and the horizontal tubes 132 and vertical tubes 148 are constructed from a metal material. The horizontal tubes 148 preferably have a glass bead blast finish on their outer surfaces. This rough finish has microscopic perturbations on the surface topology of the tube 148 so that the clamp 340 fits snugly around the tube 148, and the rough surface opposes vertical movement of the clamp 340 after the therapist positions the first member 344 at the desired height along the tube 148. Therefore, the therapist does not have to worry about the first member 344 sliding downwardly along the tube 148 when he or she releases the first member.

Figure 23C:
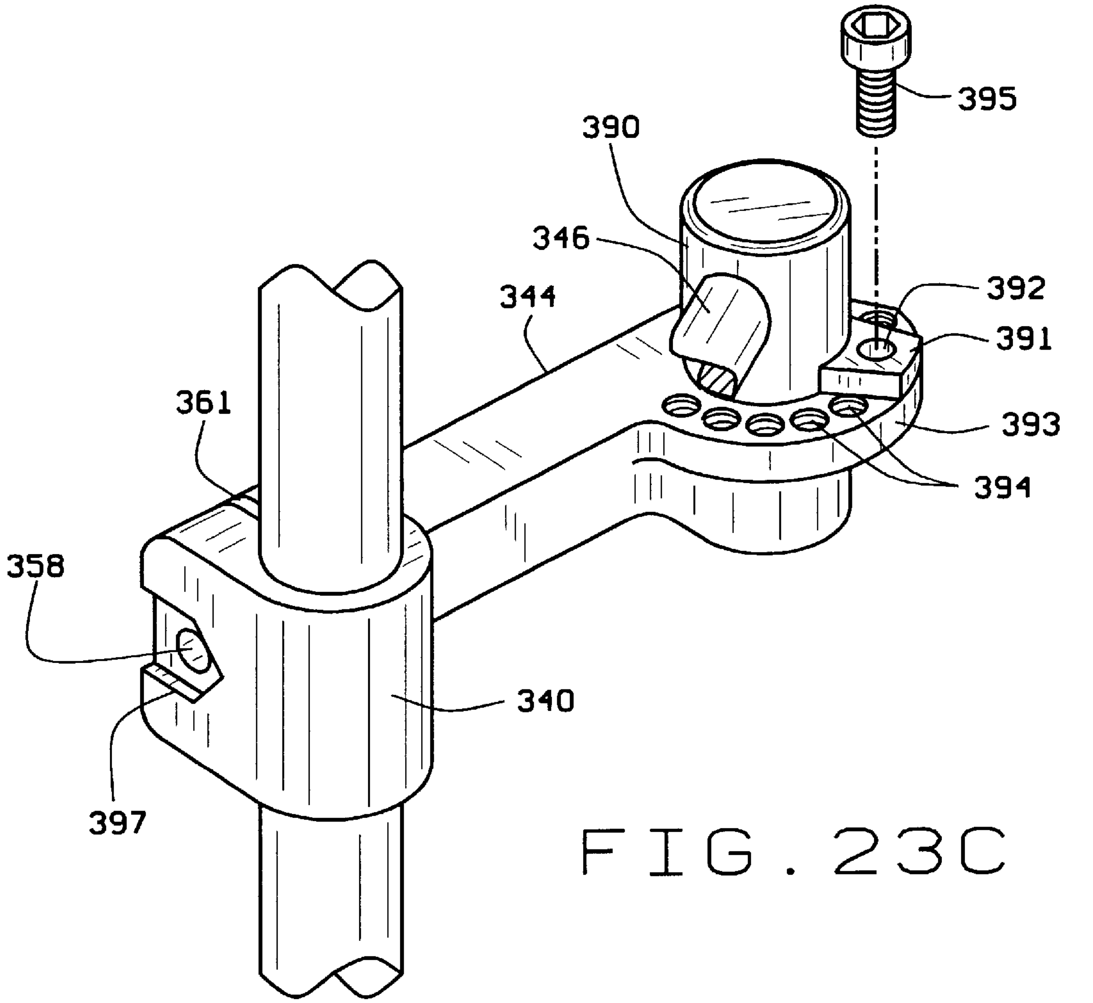
FIG. 23C is a perspective view of an alternative embodiment of the elbow joint.
Figure 23D:
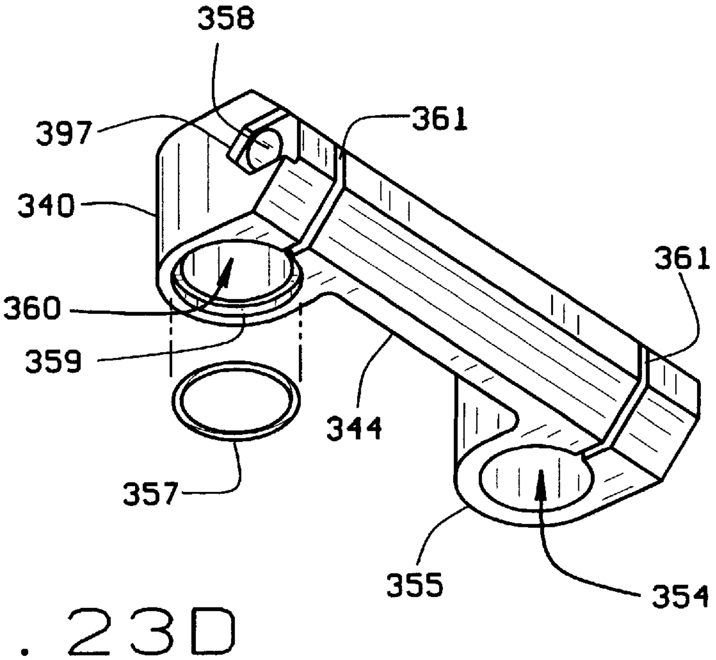
FIG. 23D is a bottom perspective view of the first member of the elbow joint, illustrating the O-ring disposed in the recess of the first member of the elbow joint.

If the tubes 148 have a smooth polished finish, an O-ring 357 preferably is disposed in a recess 359 formed in the bottom end of clamp 340 (FIG. 23D). The O-ring 357 is positioned around the tube 148 to retard downward movement of the elbow joint when the clamp 340 is unlocked. The O-ring 357 also is used in heavy duty applications such as those set forth below with respect to FIG. 23C for individuals weighing over 200 pounds, or individuals having a high degree of spacicity, or when the back support 34 is over 18 inches in width. In such applications, the first members 344 of elbow joints and the swivel attachment assembly 348 preferably are constructed from a metal material such as aluminum that is heavier than the plastic elbow joints, and the O-rings are used to retard downward movement the aluminum elbow joints 338.

To evaluate the requirements and fit of the backrest system for a particular individual, the technician preferably uses a backrest system assessment kit to determine how the backrest system should be tailored for the particular support needs of the individual by evaluating factors such as the number of pads needed, whether dual trunk, single trunk, lateral, hip and headrest pads are needed, the preferred arrangement of pads for that individual, and the desired width of the support chassis so that vertical tubes of a proper length can be ordered. The backrest systems 30 associated with such an assessment kit preferably includes hex head screws 362 and knobs 363 and/or handles 365, instead of socket head screws 362 and lock nuts 396 that preferably are used for long term patient use. The knobs 363 and handles 365 allow the elbow joints 338 and ball and socket joints 342 (discussed below) to be easily locked and unlocked, and for the pads to be easily manipulated into a desired position so that the prescriber can readily access the viability of the pad arrangement. FIG. 26 shows one arrangement of knobs 363 and handles 365 that allows for quick and easy manipulation and positioning of the pads 300.

As discussed above, the handles 365 and knobs 363 preferably are not used on the backrest system that is fitted by the technician for a particular patient for long term use so that the patient or caregiver cannot easily adjust the pads and tamper with the pad arrangement established by the technician. For backrest systems 30 fitted for a particular patient, bolts 362 preferably are socket head screws that are held in place by lock nuts 396. However, such knobs 363 and handles 365 can be used on the backrest system, if desired. For example, certain disabilities may require pad adjustment throughout the day so that use of the knobs 363 and/or handles 365 is preferred. Such disabilities include underlying neurological diseases that cause the individual's back to weaken as the day progresses such that the individual needs to recline more to rest against the back support 34 during the course of a day to alleviate weight borne by the individual's spine. Using knobs 363 and handles 365 on the pads 314, 315 of the fourth and fifth tiers 304, 305 allow for easy adjustment of the pads during the day. Children with mobile deformities also may need to have knobs 363 and handles 365 on the backrest system 30 to allow for the pads 300 to be progressively adjusted to counter deformities and try to straighten out curvatures of the spine.

When the clamp 340 is positioned at the desired location, and the first member 344 is properly positioned with respect to the second member 346, the threaded bolt 362 is tightly secured inside the opening 358 to force slots 361 into a closed position. As the slots 361 close, clamping force exerted by the clamp 340 on the support tube 148 increases to prevent movement of the first member 344 with respect to the support tube 148. Similarly, clamping force is exerted by the clamp 355 on the post 350 as the bolt 362 is tightened, preventing rotation of the first member 344 with respect to the second member 346. It will be appreciated that other locking mechanisms can be used instead of the bolt 362 to lock the elbow joint 338 to the support tubes 148 or to prevent movement of the first member 344 with respect to the second member 346.

In another embodiment of the present invention, the swivel attachment device 348 and locking mechanism are configured as shown in FIG. 23C. In this embodiment, the swivel attachment device 348 includes a post 390 that is integrally formed with and extends downwardly from one end 352 of the second member 346 that is opposite the ball and socket joint 342. The post 390 also includes a tab 391 extending outwardly therefrom that has a clearance hole or opening 392 extending therethrough. The second clamp 355 and slot 361 shown in FIG. 23B on the first member 344 are replaced by a locking mechanism that includes a substantially semi-circular flange 393 that extends outwardly from the first member 344 as shown in FIG. 23C. The flange 393 includes a plurality of tapped holes 394 extending therethrough. When the pad is positioned in the desired location, the opening 392 in the tab 391 is aligned with one of the openings 394 in the flange 393 that is in nearest proximity to the tab 391 opening 392. A fastening device such as a screw 395 is inserted through the clearance hole 392 in the tab 391 into the aligned tapped hole 394 in the flange 393 to lock the orientation of the pad 300 in the desired position and prevent movement of the first member 344 with respect to the second member 346. This locking assembly of FIG. 23C preferably is used in heavy duty applications such as, for example, for individuals weighing in excess of 200 pounds, or individuals who experience a high degree of spacicity, or when the back support 34 is over 18 inches in width. In this construction, the first member 344 and the swivel attachment assembly 348 of the elbow joints preferably are constructed from a lightweight, strong metal material such as aluminum to provide additional strength and durability. It will be appreciated that other swivel attachment devices and locking mechanisms can be used to prevent movement of the elbow joint 338 and pad 300 when the pad 300 is moved into a desired position by a technician.

b. Ball and Socket Joints

The other end of the second member 346 opposite the post 350 or 390 is attached to a ball 366 that is disposed in a socket 367 associated with the ball and socket joint 342. The ball and socket joint 342 permits rotary movement of a pad in every direction through movement of the socket 367 about the ball 366. Allowing for rotation of the socket 367 about the ball 366 enables the pad to be precisely positioned to provide optimum support for the wheelchair user.

The ball 366 preferably includes two sections, namely, a first section 371 and a second section 372. In the preferred embodiment (FIGS. 22 and 23A–B), the second section 372 of the ball 366 is permanently attached to the second member 346, and constructed as a single molded part. The first portion of the ball 366 is attached to the second portion 372 by a screw or threaded bolt 368 that extends through an opening or throughbore 370 formed in the second member 346 and an axially aligned threaded opening 374 extending through the second section 372 (FIG. 23B) into engagement with the first section 371. The bolt 368 moves the first portion 371 of the ball 366 horizontally with respect to the second ball section 372. In other words, as the bolt 368 is screwed into the throughbore 370 and opening in the second section 372, the first portion 371 moves outwardly away from the second section 372. As the bolt 368 is loosened or screwed outwardly from the throughbore 370 and second portion 372, the first portion 371 moves inwardly toward the second portion 372 until the first section 371 abuts the second portion 372. Thus, the split construction of the ball 366 allows for the ball 366 to be tightened in the socket 367. The ball and socket joint 342 of the present invention differs significantly from conventional ball and socket joints in which the socket is tightened around the ball. Additionally, in conventional ball and socket joints, the ball typically rotates in a stationary socket. It will be appreciated that the elbow joint and ball and socket joint of the present invention each can be used in other devices and applications.

Figure 25A:
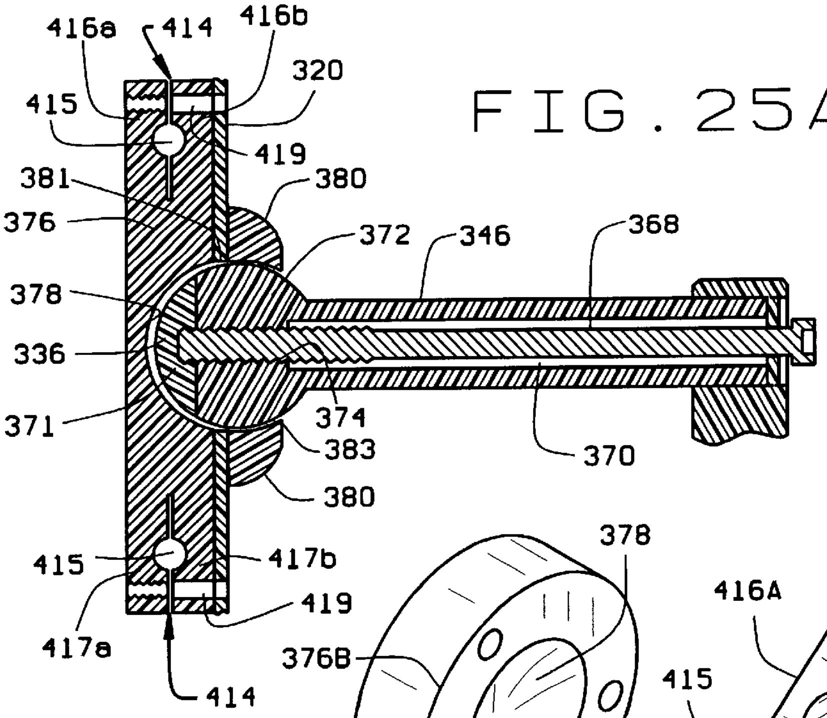
FIG. 25A is a cross sectional view of the ball and socket joint, showing the ball positioned inside the socket so that the socket can rotate freely about the ball.
Figure 25B:
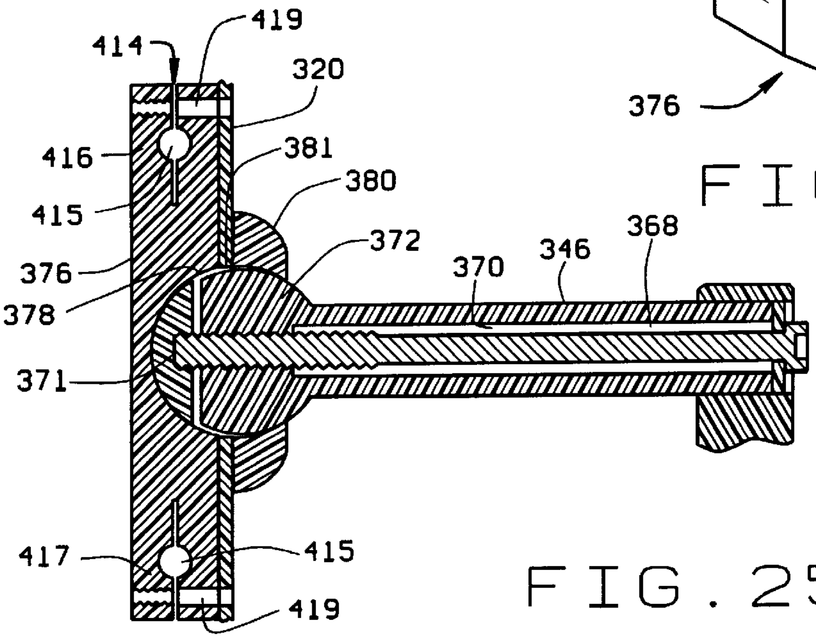
FIG. 25B is a cross sectional view of the ball and socket joint, showing the ball locked in position inside the socket.

More specifically, the threaded bolt 368 is disposed in either an extended or retracted position within the second member 346 by screwing or twisting the bolt 368 into or out of the opening 370 in the second member 346. Thus, when a portion of the threaded bolt 368 is tightened or screwed into the opening 370 into the extended position, the first section 371 of the ball 366 is moved outwardly from the second section 372 into a locked position as shown in FIG. 25B. When a portion of the threaded bolt 366 is loosened or screwed out of the opening 370 in the second member 346, the first section 371 of the ball 366 moves inwardly toward the second section 372 into an unlocked position to permit rotation of the socket 367 about the ball 366 (FIG. 25A). In other words, when the ball 366 is in the unlocked position (FIG. 25), the socket 367 rotates freely about the ball 366 to permit angular or rotational movement of the associated pad. When the pad is moved into a desired position and orientation, the threaded bolt 368 is screwed into the opening 370 into the extended position, and the first section 371 of the ball 366 is moved into the locked position against the socket 367 to prevent further angular movement of the pad via that ball and socket joint 342 (FIG. 25B). Therefore, the ball and socket joints 342 allow for precise positioning of the pads 300 against the user's back by providing for rotational and angular adjustment of the pads 300 to fit the curvature of the user's spinal column which often has compounded curves owing to deformities that can exist with certain disabilities, especially when other neurological complications are present.

The socket 367 in which the ball 366 is positioned includes a base 376 having a cavity 378 formed therein that is sized to receive a portion of the ball 366, and a C-shaped bracket 380 that is secured to the rearwardly presented face of the backing plate 320 of the pad as shown in FIGS. 24A, 24B, 25A and 25B. As previously discussed, the base 376 is positioned inside each housing 327, 328 and 336 associated with the backing plate 320 of the pads 300 between the backing plate 320 and the cushion 322. The backing plate 320 of each pad has an opening 381 (FIGS. 25A, 25B) formed in each housing 327, 328, 336 that is adapted to be aligned with the cavity 378 formed in the base 376 when the base is positioned inside the housing 327, 328, 336 (FIG. 26). When the opening 381 and cavity 378 are aligned, a portion of the ball 366 is positioned inside the opening 381 and cavity 378. The bracket 380 then is positioned on the rearwardly presented face of the housing 327, 328, 336 associated with the backing plate 320 around a portion of the ball as shown in FIGS. 19 and 20. The base is secured to the C-shaped bracket 380 and backing plate 320 by fastening devices such as screws 382 that are inserted through aligned openings bracket 380, backing plate 320 and base 376A or B.

To adjust each pad of the back support assembly 298 from the rear of the wheelchair 10, the threaded bolts 362 of the elbow joints 338 and the threaded bolts 368 associated with the ball and socket joints 342 are loosened or unlocked or moved into a retracted position. As previously discussed with respect to bolts 362, knobs 363 or handles 365 can be attached to bolts 368 to assist the prescriber in tightening or loosening the bolts 368 to manipulate the pads 300. When the bolts 368 and 362 are loosened, the ball 366 rotates freely inside the socket 367 and the first member 344 rotates freely with respect to the second member 346. When each pad is properly positioned against the user's back, the bolts 368 and 362 are tightened by the prescriber. This adjustment process is repeated for each pad employed in the backrest system 30.

As discussed above, the second member 346 of the elbow joint 338 and the second section 372 of the ball 366 are molded together as a single unitary structure. In the preferred embodiment, the first member 344 and swivel attachment assembly 348 are constructed from a lightweight strong metal such as aluminum for heavy duty applications (e.g., patients over 200 pounds, having a high degree of spacicity). In all other applications, the first member 344 and swivel attachment assemblies 348 preferably are constructed from a strong engineering plastic material such as RYTON®, sold by Phillips Petroleum Co., Bartlesville, Okla., or a polycarbonate material such as LEXAN®, sold by General Electric Company, Pittsfield, Mass.

In all applications, the second member 346 and second section 372 of the ball 366 preferably are constructed from a strong engineering plastic material such as RYTON®, sold by Phillips Petroleum Co., Bartlesville, Okla., or a polycarbonate material such as LEXAN®, sold by General Electric Company, Pittsfield, Mass. In this configuration, the base 376 of the socket 367 also is constructed preferably from a strong plastic material such as RYTON®. However, the first portion 371 of the ball 366 preferably is constructed from a more ductile, resilient, durable and high-strength material such as nylon or other similar synthetic polymer. The nylon material is capable of withstanding forces exerted on the first portion 371 without cracking when the ball 366 is in the locked position. The nylon material also is preferred since the nylon first portion 371 deforms in the base 376 of the socket 367 when the first portion 371 is subjected to loading forces in the locked position. Since the first portion 371 is constructed from a softer material than the base 376 in the preferred embodiment, the cavity 378 of the base 376 does not deform or degrade, and the locking feature of the ball and socket joint 342 remains operational over time.

In the preferred embodiment, the C-ring bracket 380 of the socket 367 is constructed from a lightweight, strong metal such as aluminum. Since the second section 372 of the ball 366 and second member 346 are constructed from an engineering plastic material such as RYTON or a polycarbonate material such as LEXAN, the plastic or polycarbonate material of the second section 372 of the ball 366 is softer than the aluminum C-ring bracket 380 so that the inner edge 383 of the bracket 380 cuts into the plastic or polycarbonate second portion 372 of the ball 366 when the first section 371 of the ball 366 is in the locked position. Thus, in these configurations, the C-ring bracket 380 prevents rotation of the ball 366 in the socket 367 when the ball 366 is in the locked position.

Alternatively, the C-ring bracket 380 can be constructed from a strong engineering plastic material such as RYTON® or a polycarbonate material such as LEXAN®. When the engineering plastic material or polycarbonate material is used to construct the C-ring bracket 380 and the second section 372 of the ball 366, the inner edge 383 of the bracket 380 can be machined to provide a sharp edge and/or molded to form a rough surface that frictionally engages or grips the second portion 372 of the ball 366 to prevent movement of the ball 366 when the first section 371 is in the locked position.

C. Wing Pads

Figure 30:
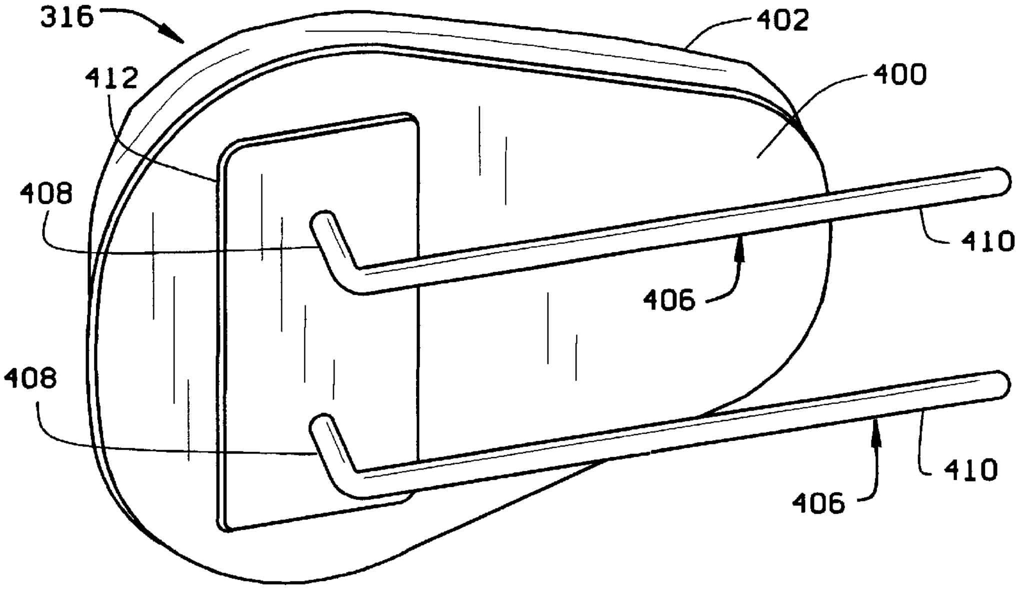
FIG. 30 is a rear perspective view of a wing pad.
Figure 31:
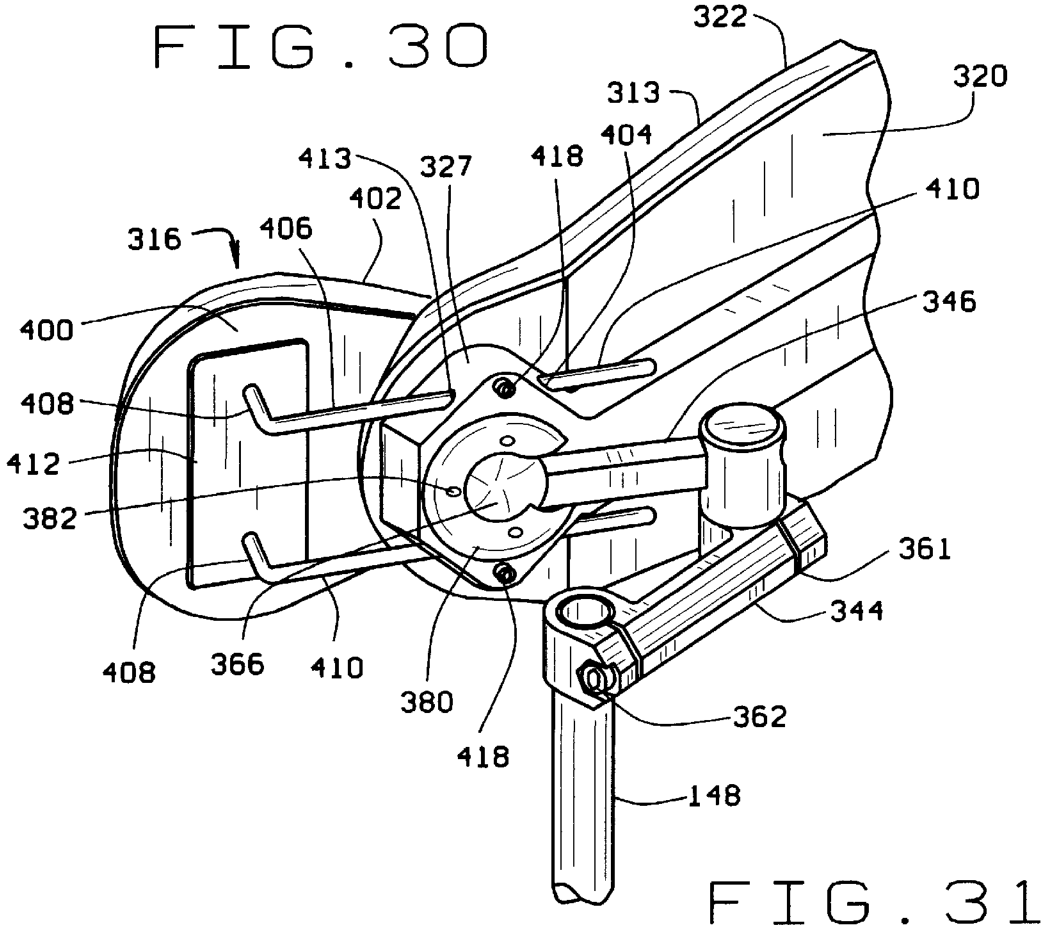
FIG. 31 is a rear perspective view the wing pad attached to the pad associated with the third tier of support.

It will be appreciated that the number and size of pads 300 attached to the support tubes 148 by the elbow joints 338 and ball and socket joints 342 can be varied depending upon the support needs and anthropometric dimensions of the user. Furthermore, one or two wing pads 316 can be added to any of the pads 311, 313, 314, 315 associated with the first, third, fourth or fifth tiers 301, 303, 304, 305 of support. As shown in FIGS. 30 and 31, each wing pad 316 includes a backing plate 400 and a cushion or insert 402 attached to the forwardly presented face of the backing plate 400. The user rests against the cushion 402. The backing plate 400 preferably is constructed from a substantially rigid polymer such as ABS plastic, and the cushion 402 preferably is constructed from a foam material. Each wing pad 316 includes a pair of L-shaped support posts 406 with each support post 406 having a first member 408 and a second member 410 extending perpendicularly from the first member 408 as shown in FIG. 30. The first members 408 are attached or welded to a retaining plate 412 that is attached or riveted to the rearwardly presented face of the backing plate 400 of the wing pad 316. As discussed below, the second members 410 of the support posts 406 extend perpendicularly from the first members 408 in a substantially parallel fashion through openings in the backing plate 320 and the hexagon-shaped socket base 376A of the socket assembly 367 as shown in FIG. 31.

As shown in FIGS. 19, 20, 27, 28, 31 and 33, each housing 327 of the single trunk pads 311, 313, 314 and housing 336 of headrest pad 315 has four openings 413 formed therein through which the second members 410 extend when the wing pads 316 are used. These openings 413 are aligned with two passages 415 formed in the hexagon-shaped socket base 376A (see FIGS. 24A–B). The second member 410 of each support 406 is inserted through one opening 413 in the backing plate 320, through the aligned passage 415, and then through the second opening 413 in the backing plate 320 to attach the wing pad to the pad. The passage 415 is sized to slidably receive the second members therein to attach the wing pads to the pads. Each socket 376A also includes two slots 414 that extend upwardly and downwardly from the passage 415 as shown in FIGS. 24A, and 25A–B. Thus, each slot 414 effectively splits portions 416 and 417 of the base 376A into two sections 416*a* and 416*b*, and 417*a* and 417*b*, respectively.

When the second members 410 are positioned in the passages 415, a screw 418 is inserted into an opening 419 formed in portions 416 and 417, which, in turn, clamps together sections 416*a* and 416*b* and sections 417*a* and 417*b* to securely retain the second members 410 in the passages 415. This configuration allows the wing pads 416 to be easily attached to and removed from the pads, if desired. The wing pads 416 extend the width of the back support 298, and provide additional support for the user.

D. Fourth Tier Mounting Assembly

The height of the backrest system can be extended to include support for the upper trunk by adding the pad 314 associated with the fourth tier 304. For individuals who can sit in an upright position and have weak or absent muscle control, the upper trunk pad 314 may be required. Often the backrest system 30 is reclined rearwardly with respect to the backrest posts 26 when the fourth tier pad 314 is used. If poor head control exists, then a headrest assembly 434 and headrest pad 315 (discussed below) also can be included in the backrest system 30 to stabilize the head which sits on top of the cervical spine.

In the preferred embodiment, only the pads 311, 312*a*, 312*b*, and 313 of the first, second and third tiers 301, 302 and 303, respectively are mounted directly onto the support tubes 148 via the clamps 340 of the elbow joints 338. The pad 314 of the fourth tier 304 preferably is mounted (via the elbow joints 338 and ball and socket joints 342) to a fourth tier mounting assembly 422, which, in turn, is removably secured to the support tubes 148. Alternatively, the support tubes 148 can be cut to a sufficient length to allow for the fourth tier pad 314 to be mounted thereto via the elbow joints 338. The fourth tier mounting assembly 422 is a split tube assembly as shown in FIG. 27, and includes a pair of vertical, spaced-apart tubes 424 having an upper end 426 and a lower end 428, and a horizontal mounting tube 425 extending inwardly from each vertical tube. The horizontal mounting tubes 425 are adapted for engagement with a substantially cylindrical, hollow support tube 427 that extends horizontally between the vertical tubes 424. More specifically, each mounting post 425 preferably is substantially cylindrical hollow tube having an outer diameter that slightly less than an inner diameter of the support tube so that the support tube can be slid over the mounting tubes upon assembly of the fourth tier mounting assembly 422. The mounting tubes 425 and support tube 427 allow for width adjustment of the fourth tier mounting assembly 422 so that the mounting assembly 422 can be adapted for mounting on back support systems 34 of varying widths. The mounting tubes 425 allow for the width of the mounting assembly 422 to be increased by approximately two inches beyond the length of the horizontal support tube 427 in the preferred embodiment.

Figure 17:
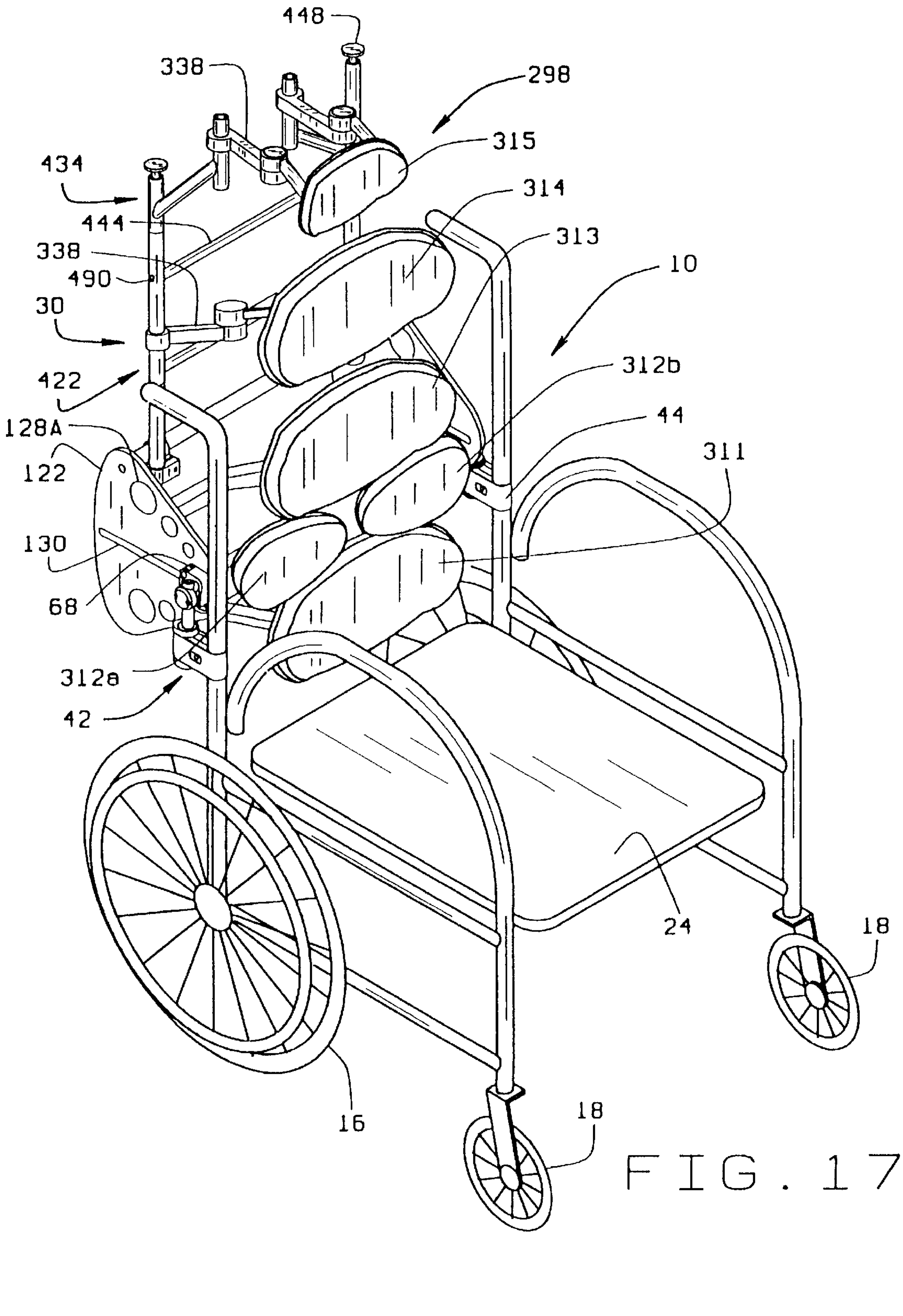
FIG. 17 is a front perspective view of a second embodiment of the back support, including a plurality of pads mounted to the support tubes of the backrest system via elbow joints and mounting assemblies.

As shown in FIGS. 17 and 18, the clamps 340 of the elbow joints 338 associated with the fourth tier pad 314 are attached in the vicinity of the upper ends 426 of the vertical tubes 424. As shown in FIG. 27, the lower ends 428 of the tubes 424 are sized to be matingly received by the upper ends 170 of the support tubes 148, and attached to the support tubes 148 via mounting posts 453. In the preferred embodiment, the mounting posts 453 operate in a similar fashion as set forth above with respect to mounting posts 70. More specifically, an opening 452 extends axially through the vertical tubes 424, and the lower end 428 of each vertical tube 424 has a body portion 454 integrally formed with and extending downwardly therefrom. The body portion 454 has a lower tapered or angled end 455 substantially tapered or angled surface. A small tapered barrel 431 is attached to the lower tapered end 455 of the body portion 454 by a stud 432 that extends from inside the opening 452 in the tube 424 through an opening 433 formed in the body portion 454 into engagement with the barrel 431. The body portion 454 and barrel 431 are sized to be slidably received inside the support tubes 148. A radially outwardly extending seat 456 is formed at the intersection of the vertical tube 424 and the body portion 454 that prevents downward movement or insertion of the tube 424 into the tube 148. The barrel 431 is moved axially upwardly and downwardly by the stud 432 when the stud 432 is tightened or loosened by the prescriber. When the stud 432 is loosened, the barrel 431 and body portion 454 move freely inside the support tube 148. When the stud 432 is tightened, the barrel 431 is moved upwardly by the stud 432 and slides radially outwardly against the tapered surface 455 of the body portion 454 so that the tapered ends of the body portion 454 and the barrel 431 are wedged into engagement with the inner surface of the support tube 148. In this locked position, the body portion 454 and barrels 431 are securely retained inside the support tubes 148 so as to prevent axial movement of the mounting assembly 422. As discussed hereinafter, the headrest pad 315 can be attached to the upper end 426 of the fourth tier vertical tubes 424 via a headrest mounting assembly 434, if desired. If no headrest pad 315 is used, plugs (not shown) can be inserted into the upper ends 426 of the vertical tubes 424. Likewise, if no fourth tier pad 314 or head rest pad 315 is employed, plugs (not shown) can be inserted into the upper ends of the support tubes 148.

E. Extension Tubes

Figure 34:
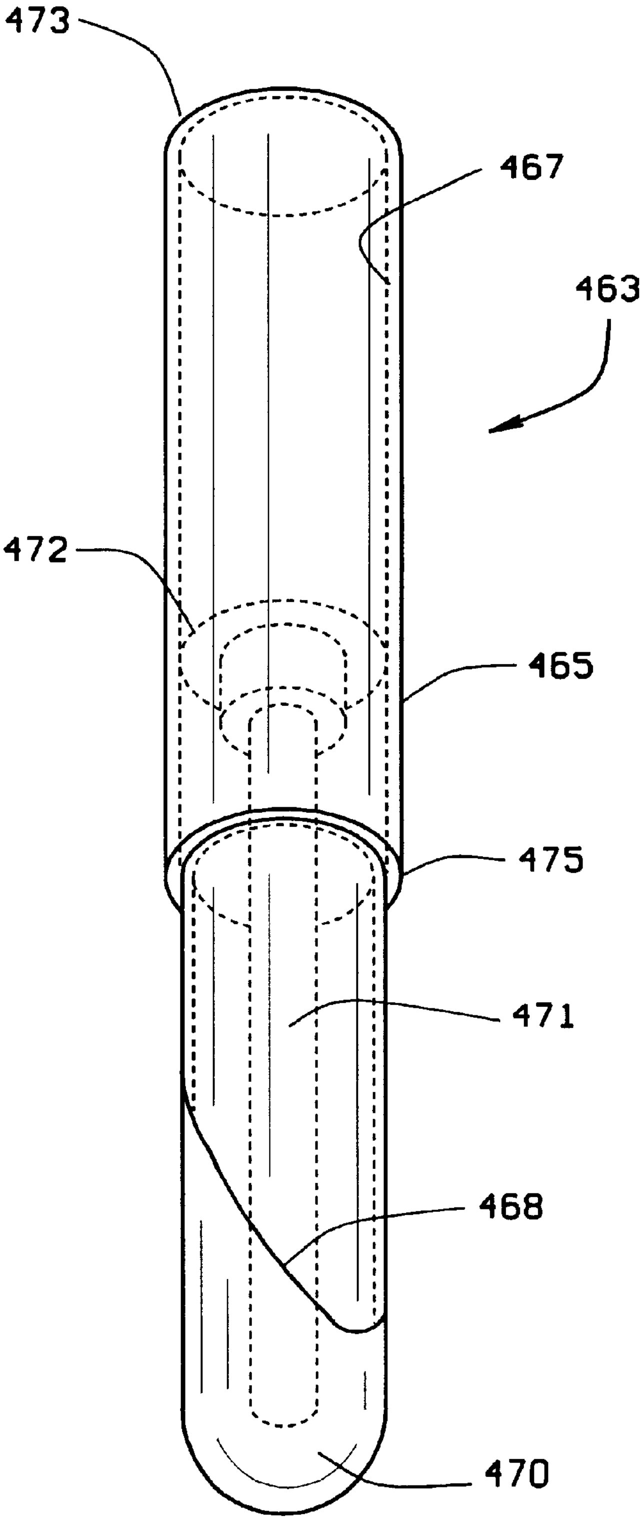
FIG. 34 is a perspective view an extension tube.

The height of the back support 34 can be increased by adding one or more extension tubes 463 to each vertical support tube 148 and the vertical tubes 424 of the fourth tier mounting assembly 442, as needed. As shown in FIG. 34, each extension tube includes a body portion 465 having an axially extending opening 467 formed therein and a tapered or angled end 468, and a tapered barrel 470 attached to the tapered end 468 of the body portion 465 by a screw or threaded bolt 471. A counterbore seat 472 is formed inside the opening 467 of the body portion 465 against which a head of the bolt 471 rests when the barrel 470 is in the unlocked position (discussed below). The seat extends radially inwardly from an inner surface of the body portion 465, and includes an opening extending axially therethrough that is sized to accommodate the bolt 471 therein so that the head of the bolt rest in the counterbore. This arrangement of the bolt 471 in the seat 472 provides resistance when tightening the bolt, and allows the prescriber to easily locate and access the bolt 471. The seat 472 has a configuration similar to the seat discussed above for mounting posts 133 associated with side plates 122. The screw 471 extends through the opening in the seat 472 downwardly into the opening 467 of the body portion 465, and then into the barrel 470, to attach the barrel 470 to the body portion 465.

The extension tube 463 preferably is approximately three to four inches long. The tapered barrel 470 and angled end 468 of the body portion 465 are adapted to be inserted into the upper end 170, 426 of one or more of the vertical tubes 148, 424 associated with the support tubes 148 or fourth tier mounting assembly 422, respectively, or the lower end 172 of the vertical support tubes 148. The extension tube 463 is secured to the vertical tubes 148 and/or 424 by tightening the screw 471 in a similar manner as set forth above for the mounting posts 70 or 453. More specifically, as the screw 471 is tightened by a hex ball driver, the barrel 470 is moved inwardly toward the tapered end 468 of the body portion 465 such that an edge of the tapered end 468 and an edge of the tapered barrel 470 engage an inner surface of the tube in which the extension tube 463 is inserted, thereby locking the extension tube 463 in a fixed location with respect to the vertical tube and preventing rotation of the vertical and extension tubes.

An upper end 473 of the extension tube 463 also is adapted to accommodate one of the tapered barrels 431 associated with the fourth tier mounting assembly 422. As shown in FIG. 34, a circumferentially extending seat 475 is formed in the body portion 465 that prevents further inward movement of the body portion 465 into the vertical tube on which the extension tube 463 is mounted. When a pair of extension tubes 463 are mounted on corresponding ends of the vertical tubes 148 and/or 424, the height of the back support 31 is increased by approximately two to three inches in the preferred embodiment. The extension tubes 463 permit the length or height of the back support system 34 to be increased as needed, e.g., as the user's height, dimensions or support needs change over time.

F. Headrest Mounting Assembly

If poor head control exists, then the headrest pad 315 (discussed below) can be included in the backrest system 30 to stabilize the head. As will be appreciated in view of the following disclosure, the headrest pad 315 and headrest mounting assembly 434 allow for a wide range of movement so that the headrest pad can be positioned to accommodate individuals having spinal deformities.

Figure 28:
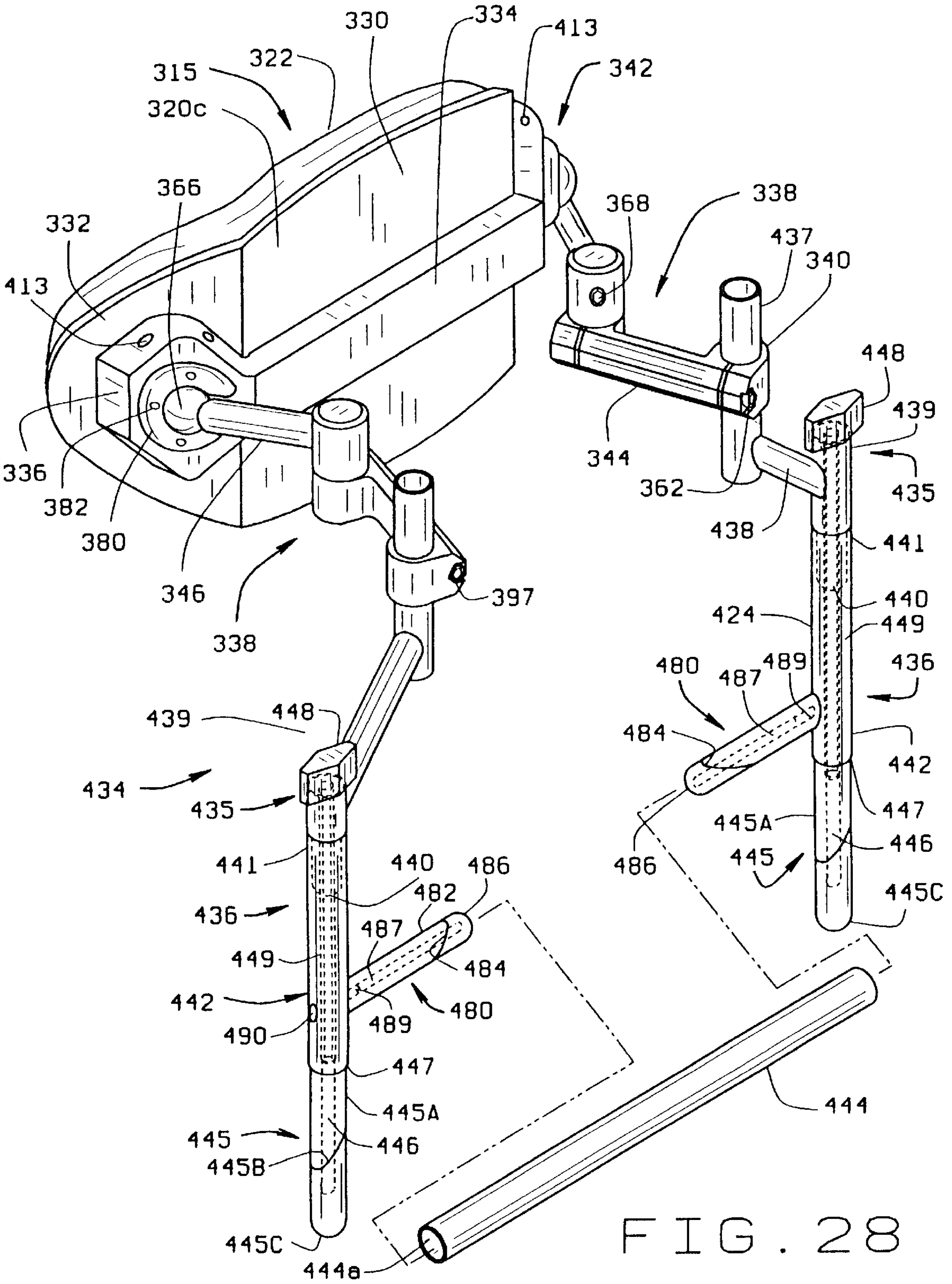
FIG. 28 is a rear perspective view of the headrest pad associated with the fifth tier of support, showing one embodiment of the mounting assembly that can be used to attach the headrest pad to the support tubes or to the fourth tier mounting assembly.
Figure 33:
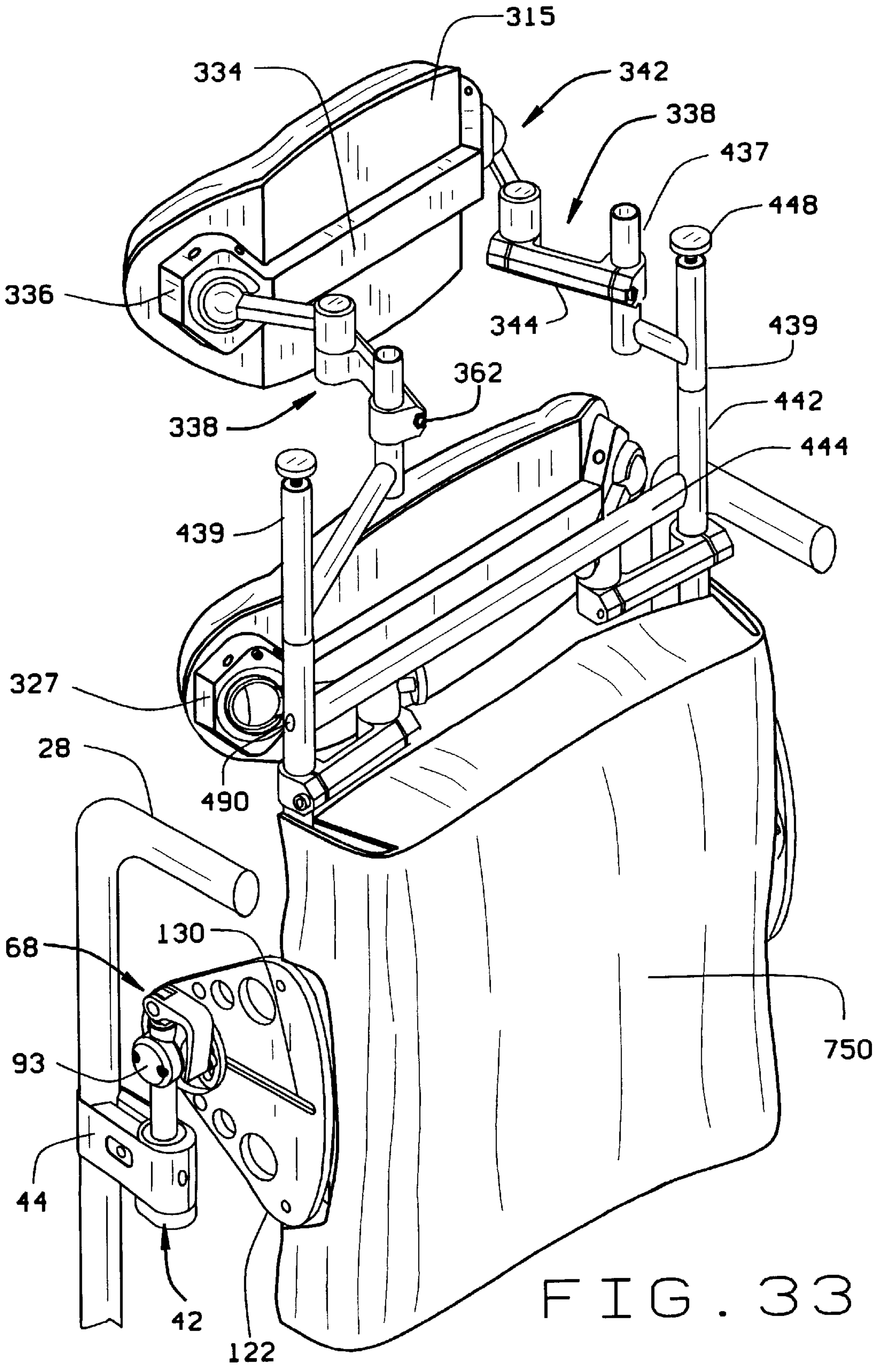
FIG. 33 is a rear perspective view of the backrest system, showing a back cover that can be removably attached to the back support assembly.

In the preferred embodiment shown in FIGS. 17, 28 and 33, the fifth tier pad 315 is attached to either the support tubes 148, fourth tier mounting assembly 422, or extension tubes 463 via a headrest mounting assembly 434 (FIG. 28) and elbow joints 338 and ball and socket joints 342. When the headrest pad 315 is used, determinations as to whether the fourth tier pad 314 and mounting assembly 422, the extension tubes, and/or the headrest mounting assembly 434 are employed, are based upon the height and support requirements of the specific wheelchair user. In the preferred embodiment, a pair of elbow joints 338 and a pair of ball and socket joints 342 are employed to attach the headrest pad 315 to the mounting assembly 434. The headrest assembly 434 and pad 322 also can be attached directly to the support tubes 148 when the first embodiment of the back support 180 is used.

The headrest mounting assembly 434 is shown in FIG. 28, and includes an upper section 435 and a lower section 436 with the upper section 435 being rotatably attached to the lower section 436 to allow for proper positioning of the headrest pad 315. The upper section 435 includes three integrally formed mounting posts, namely, a first post 437, a second post 438 and a third post 439. The clamps 340 of the elbow joints 338 that are associated with the headrest pad 315 are secured to first posts 437 at a desired height or location. The second post 438 extends between the first post 437 and the third post 439, as shown. Lower ends 440 of the third posts 439 are adapted to be matingly received by upper ends 441 of vertical tubes 442 associated with the lower section 436 such that the third post 439 can rotate freely about a common longitudinal axis associated with the third post 439 and vertical tubes 442. As discussed below, the third posts 439 are locked in place at a desired position when the headrest mounting assembly is attached to the vertical tubes 148, extension tubes 463 or fourth tier mounting assembly 422 and when the elbow joints 338 are locked in place.

The lower section 436 preferably is a split tube assembly that includes a pair of spaced apart, vertical tubes 442 and a horizontal tube 444 extending between the vertical tubes 442. The horizontal tube 444 preferably is a hollow, cylindrical tube having an opening 444*a* extending axially therethrough. The lower ends 440 of the third posts 439 associated with each upper section 435 are positioned inside the upper ends 441 of the vertical tubes 442. Each vertical tube 442 includes a horizontally extending mounting post 480 projecting outwardly therefrom as shown in FIG. 28. The mounting posts 480 operate in a similar fashion as mounting posts 453 and those shown in FIG. 27. The mounting posts 480 are adapted for engagement with the horizontal tube 444 to support the horizontal tube 444 between the vertical tubes 442. More specifically, the mounting posts 453 are sized to disposed inside the opening 444*a* of the tube 444. The horizontal tube 444 provides torsional stiffness and rigidity for the headrest assembly 434 when it is not attached to the back support 298. Each mounting post 453 includes a body portion 484 with a tapered or angled end 484, and a tapered barrel 486 that is secured to the tapered end 487 of the body portion 484 by a screw or threaded bolt 487. The screw extends through an axially extending opening 489 formed in the body portion 482 into engagement with the barrel 486. In the preferred embodiment, a seat (not shown) is formed inside the opening 467 of the body portion 465 against which a head of the bolt 471 rests when the barrel 470 is in the unlocked position (discussed below). The seat extends radially inwardly from an inner surface of the body portion 484, and includes an opening extending axially therethrough that is sized to accommodate the bolt 487 therein. The seat has a configuration similar to the seat 472 discussed above for extension tube 463 and shown in FIG. 34. The screw 487 extends through the opening in the seat downwardly into the opening 489 of the body portion 484, and then into the barrel 486, to attach the barrel 486 to the body portion 484.

The screw 487 is tightened or loosened to move the barrel 486 axially inwardly or outwardly by a hex ball driver that is inserted through an opening 490 formed in the vertical tube 442 into the opening 489 in the body portion 482 to access the screw head. As the screw 487 is tightened, the barrel 486 is moved into abutment with the tapered end 484 of the body portion 482 and along the tapered surface 484 of the body portion 482 so that an edge of the barrel 486 and an edge of the tapered end 484 of the body portion 482 engage an inner surface of the horizontal tube 444, thereby preventing movement of the horizontal and vertical tubes 442, 444. As discussed above with respect to the fourth tier mounting assembly 422, the mounting posts 480 and horizontal tube 444 allow for width adjustment of the headrest mounting assembly 434 in the preferred embodiment up to approximately two inches beyond the length of the horizontal tube 444, if desired.

As shown in FIG. 28, each vertical tube 442 also has a vertically oriented mounting post 445 at its lower end that is adapted to be matingly received by the upper ends of either the support tubes 148, the upper ends 426 of the vertical tubes 424 of the fourth tier mounting assembly 422, or the upper ends of extension tubes 463. Each mounting post 445 includes a body portion 445A having a tapered or angled lower end 445B and a tapered barrel 445C that is attached to the lower end 445B of the body portion 445A by a stud 446. A shoulder or seat 447 is formed at the intersection of the vertical tube 442 and an upper end of the body portion 445A of the mounting post 445 that prevents downward movement of the vertical tube 442 into tubes 148, 424 or 463. An opening 449 extends axially through the body portion 445A of the mounting post 445, the vertical tube 442 and third posts 439 of the headrest assembly. After the horizontal tube 444 is secured to mounting posts 480, the stud 446 is inserted through the opening 449 in the third post 439, the vertical tube 442 and body portion 445A, and into engagement with the barrel 445C.

Operation of barrel 445C, stud 446 and tapered end 445B in this mounting assembly 434 is similar to that discussed above with respect to mounting posts 453 and 480. The mounting posts 445 are sized to be slidably received inside tubes 148, 424 or 463. The barrel 445C is moved axially upwardly and downwardly by the stud 446 when the stud 446 is tightened or loosened by the prescriber. When the stud 446 is loosened, the barrel 445C and body portion 445A move freely inside the tube 148, 424 or 463. When the stud 446 is tightened, the barrel 445C is moved upwardly by the stud 446 against the tapered surface of the lower end 445B of the mounting post 445 so that the tapered ends of the body portion 445A and the barrel 445C are wedged into engagement with the inner surface of the tube 148, 424 or 463. In this locked position, the mounting posts 445 are securely retained inside the tubes 148, 424 or 463 so as to prevent axial movement of the mounting assembly 434. Moreover, compressive forces exerted on the vertical tube 442 and third posts 439 when the stud 446 is tightened provide rotational resistance for the third posts 439 with respect to the vertical tubes 442. The third post 439 is further locked in place when the elbow joints and ball and socket joints (discussed below) are locked in a desired position.

In one embodiment of the present invention, a knob 448 is attached to the end of the stud 446 opposite barrel 445C to assist the prescriber in tightening and loosening the stud 446. The knob 448 extends outwardly from the upper end of the third post 439. The stud 446 is tightened or loosened when the prescriber turns the knob 448. In another embodiment of the present invention, a quick release assembly 476 (see, e.g., FIG. 29), that is similar to the quick release assembly 68 (see FIGS. 8 and 9), is employed to move the barrel 445C axially upwardly and downwardly so that the headrest assembly 434 can be easily removed from or attached to the back support assembly. In this configuration, a lever 477 is secured to the upper end of the third post 439 via a cam mechanism (not shown) and the stud 446. The barrel 445C is moved axially upwardly and downwardly by the stud 446 and cam mechanism based upon the position of the lever 477. That is, when the lever 477 is raised into a unlocked position (see, e.g., FIG. 8 ), the body portion 445A and barrel 445C move freely inside the opening of the tube 148, 424 or 463. When the lever is pressed downwardly into a locked position (see, e.g., FIG. 9), the barrel 445C is moved upwardly by the stud 446 against the tapered surface 445B of the body portion 445A so that the tapered ends of the body portion 445A and barrel 445C are wedged inside the opening into engagement with the inner surface of the tube 148, 424 or 463. Thus, the knob 448 or quick release devices allow for the headrest mounting assembly 434 to be easily removed from and assembled to the wheelchair 10.

Figure 28A:
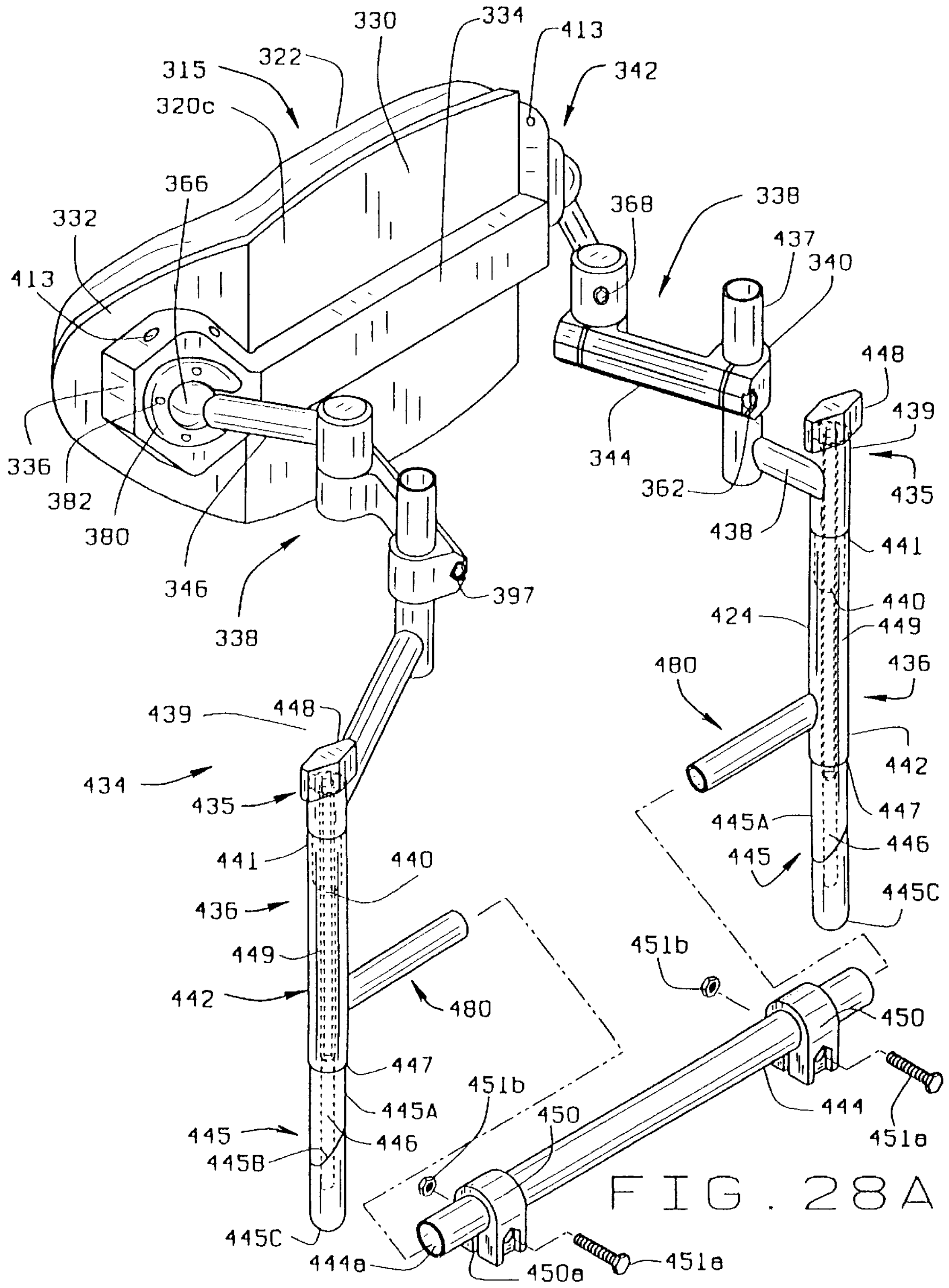
FIG. 28A is a rear perspective view of an alternative embodiment of the mounting assembly for the headrest pad, showing a horizontal support tube that mounted on two horizontal mounting tubes by a pair of tube clamps.

An alternative embodiment of a lower section 436' is shown in FIG. 28A. This lower section 436' is a split tube assembly similar to that associated with the fourth tier mounting assembly. More specifically, the lower section 436 includes two hollow cylindrical mounting tubes 480' that extend horizontally and inwardly from the vertical posts 442, instead of mounting posts 480 as shown in FIG. 28. The mounting tubes 480' are adapted to be received inside the opening 444*a* associated with the hollow horizontal tube 444. A pair of tube clamps 450 preferably are mounted on the horizontal tube 450. Each clamp 450 includes an opening through which the horizontal tube 444 is inserted, and a slot 450*a* extending radially outwardly from the opening through the clamp 450. When the horizontal tube 444 is positioned on the mounting tubes 480', the tube clamps 450 are tightened by a bolt 451A and nut 451B so that the slot is forced into a closed position and clamping forces are exerted on the horizontal tube 444 and mounting tubes 480' to prevent dislocation of the horizontal tube 444.

Figure 29:
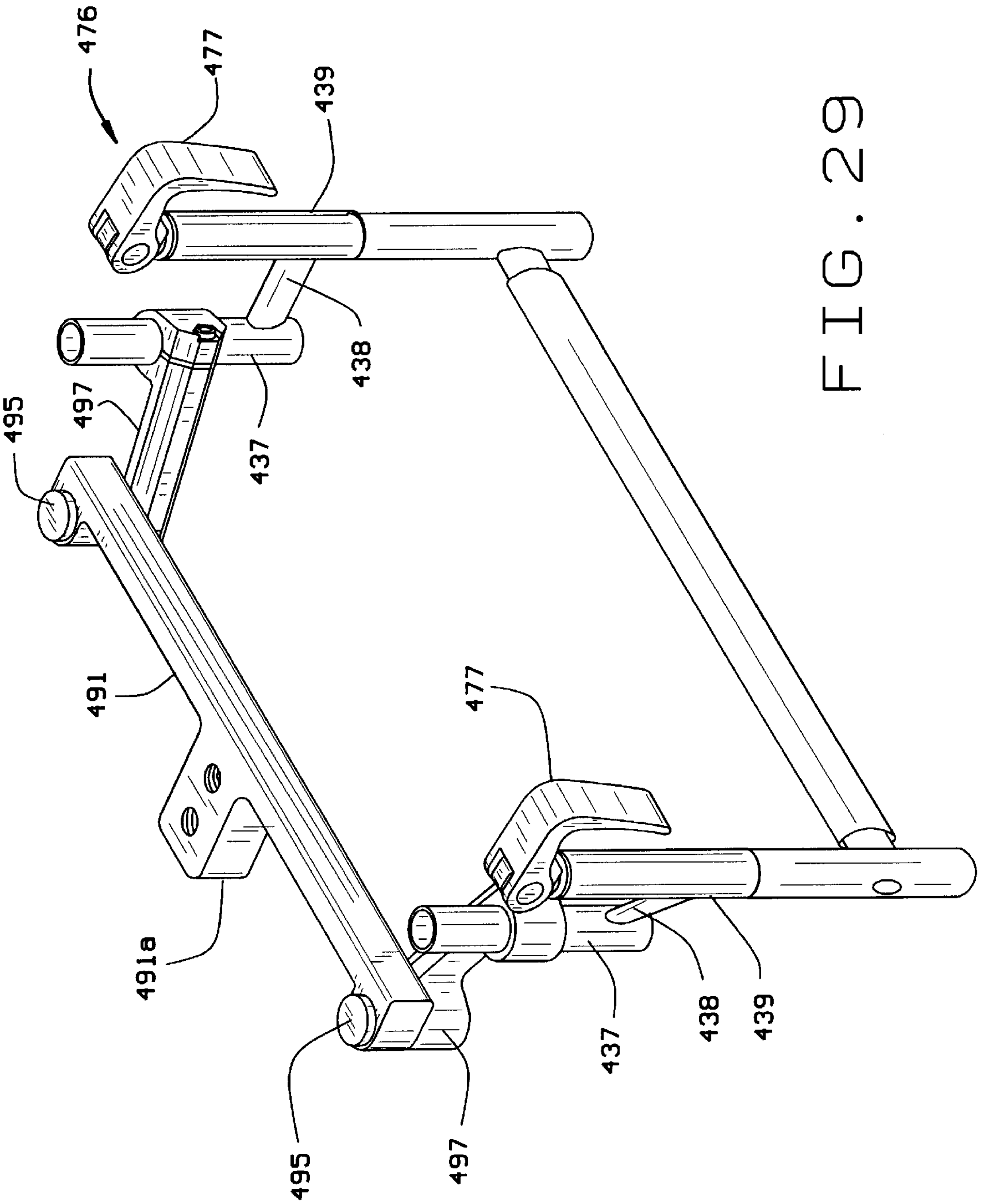
FIG. 29 is a perspective view of an adapter and modified headrest mounting assembly that can be used to support other conventional headrest pads by attaching the conventional pads to the adapter.
Figure 29A:
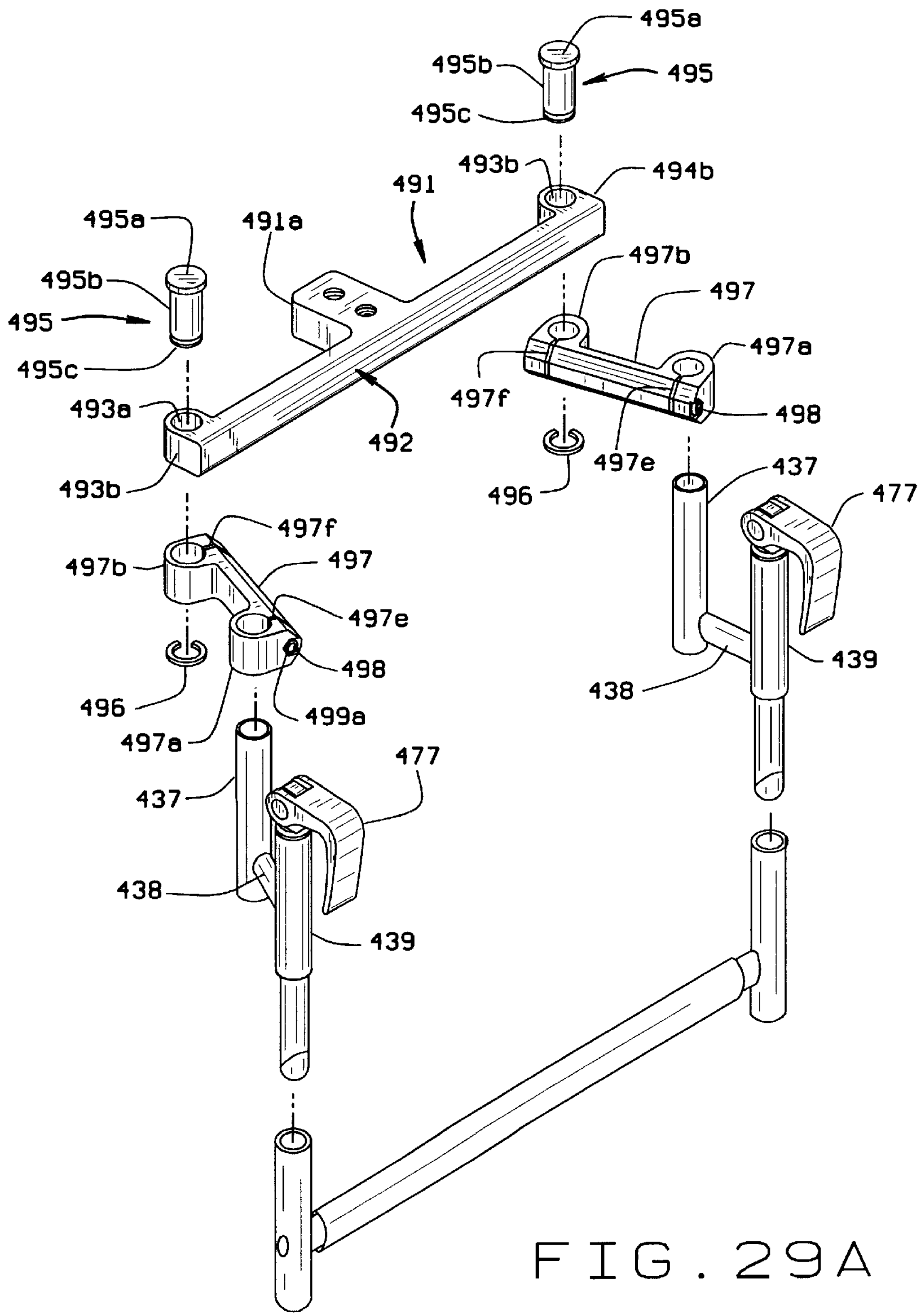
FIG. 29A is an exploded view of the adapter and modified headrest mounting assembly shown in FIG. 29.

The fifth tier mounting assembly 434 also can be adapted to accommodate a wide variety of conventional headrest assemblies, if desired, instead of employing the elbow joints 338, ball and socket joints 342 and fifth tier headrest pad 315 associated with the present invention. In this configuration, an adapter 491 (see FIGS. 29 and 29A) is mounted onto the first posts 437 of the upper section 435 associated with the mounting assembly 434 via a swivel attachment assembly 495. The adapter 491 includes a support member 492 that extends between two end portions 493*a* and 493*b*, with each end portion 493*a*, 493*b* having an opening 494*a*, 494*b*, respectively, extending therethrough that is adapted to accommodate a swivel 495 therein. Each swivel 495 includes a head portion 495*a* that extends outwardly from the openings 494*a*, 494*b*, a body portion 495*b* that is positioned inside the openings 494*a*, 494*b*, and a radially inwardly extending notch 495*c* formed at a lower end opposite the head portion 495*a* that is adapted to accommodate a retaining ring 496 therein. The retaining ring 496 is used to attached the swivel 495 to a swivel arm 497 that extends between the first post 437 of the upper section 435 and the adapter 491. The swivels 495 and retaining rings 496 allow the swivel arm 497 to rotate about the body portions 495*b* to properly position the adapter 491 at a desired location.

The swivel arm 497 includes a clamp 497*a*, 497*b* at each end, with each clamp 497*a*, 497*b* having a vertically extending opening 497*c*, 497*d*, respectively formed therethrough. Each of the clamps 497*a*, 497*b* further includes a slot 497*e*, 497*f*, respectively that extends radially outwardly through the clamps from the openings 497*c*, 497*d*. A cylindrical opening (not shown) extends through the swivel arm 497 and passes through the slots 497*e*, 497*f*. The cylindrical opening is sized to receive a threaded bolt 498 that is used as a locking mechanism to prevent movement of the swivel arm 497 with respect to the swivel 495 and adapter 491 and with respect to the first post 437. The bolt 498 preferably is held in place by a lock nut (not shown). Two recesses 499*a* are formed in the clamps 497*a*, 497*b* at ends of opening that are adapted to accommodate the lock nut, and to prevent rotation of the lock nut as the bolt 498 is tightened. Alternatively, knobs 363 or handles 365 can be used instead of the lock nut to allow for easy manipulation and positioning of the adapter.

When the adapter 491 is positioned at the desired location, and the swivel arm 497 is properly positioned with respect to the first post 437, the bolt 498 is tightened inside the opening to force slots 497*e*, 497*f* into a closed position. As the slots 497*e*, 497*f* close, clamping forces exerted by the clamps 497*a*, 497*b* on the first post 437 and swivel body 495*b* increase to prevent movement of the swivel arm 497.

The conventional headrest then is mounted to the adapter in the vicinity of flange 491*a*. It will be appreciated that flange 491*a* is shown for illustrative purposes only, and can be modified to accommodate numerous attachment or mounting assemblies associated with various conventional headrests. For example, the flange 491*a* shown in FIGS. 29 and 29A allows for mounting of head support systems such as the Spectrum Series head support systems sold by Whitmyer Biomechanix, Inc., Tallahassee, Fla.

VI. Lateral Pads

Figure 32:
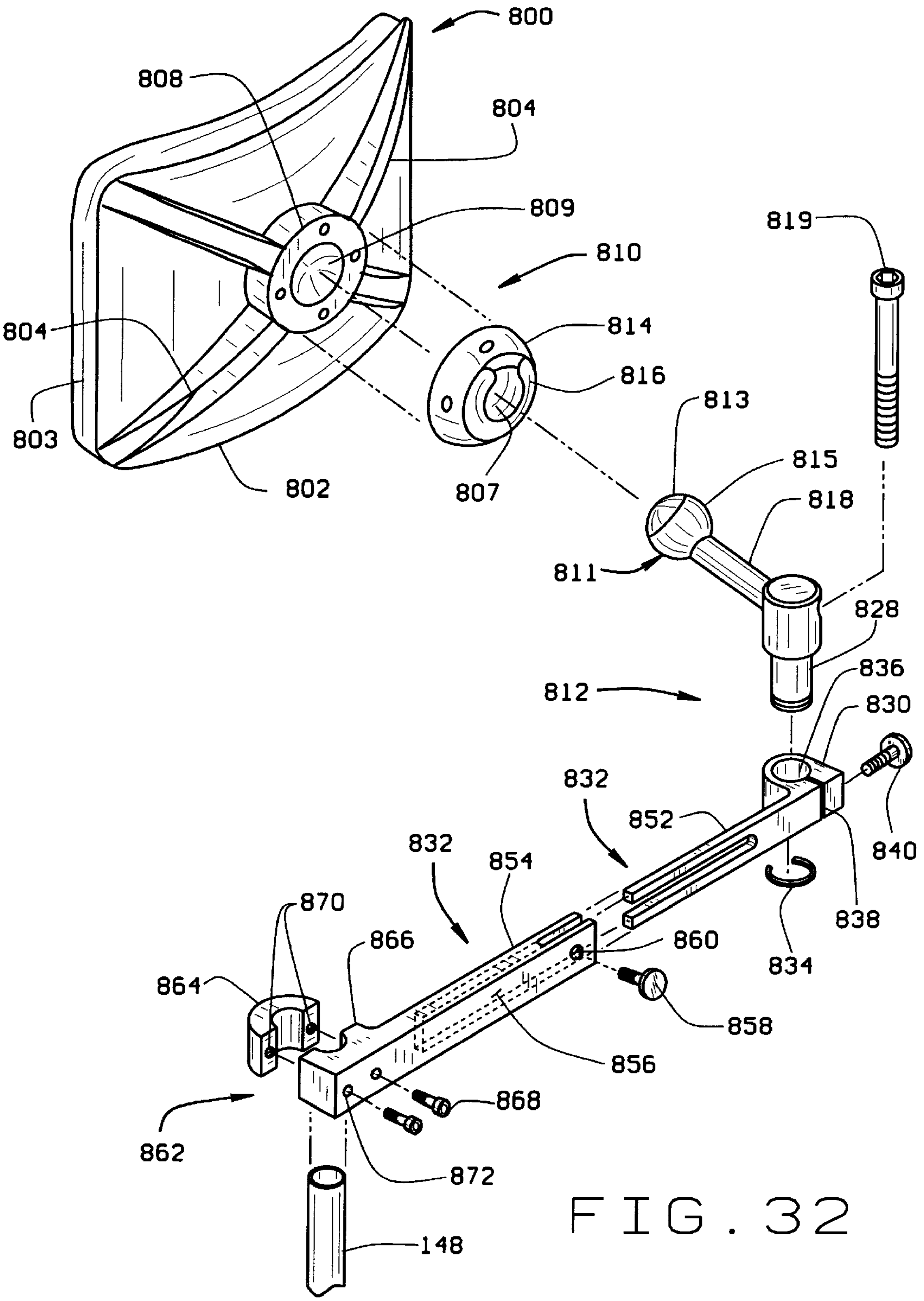
FIG. 32 is an exploded view of one embodiment of a lateral pad attached to a vertical tube, and associated ball and socket joint and elbow joint for the lateral pad.

The backrest system also can be expanded to include lateral pads 500 and/or 800 to provide additional support, regardless of the type of back support 34 employed. As set forth below, lateral pads 500 can be mounted to the side plates 400 (FIGS. 35 and 36), and lateral pads 800 can be mounted to the vertical support tubes 148 (FIG. 32).

A. Lateral Pads 500

One lateral pad 500 can be mounted to each side plate 122 via a lateral pad mounting assembly 502 as shown in FIGS.

35 and 36. The lateral pads 500 have a backing plate 504 and a cushion or insert 506 attached to the forwardly presented face of the backing plate 504. The backing plate 504 can be substantially flat or curved, depending upon the region of the body to be supported. FIG. 35 shows a rear perspective view of the lateral pad 500 having a curved construction. The backing plate 304 includes a rearwardly extending housing 505 that is adapted to accommodate the socket 367 associated with a ball and socket joint 342. The housing 505 and opening (not shown) formed in the housing that is aligned with the cavity 378 in the base 376B of the socket 367 are oriented to allow for rotation of the lateral pad 500 and socket 367 about the ball 366 to obtain proper positioning of the lateral pad 500 against the wheelchair user and ensure proper operation of the ball and socket joint.

Figure 36:
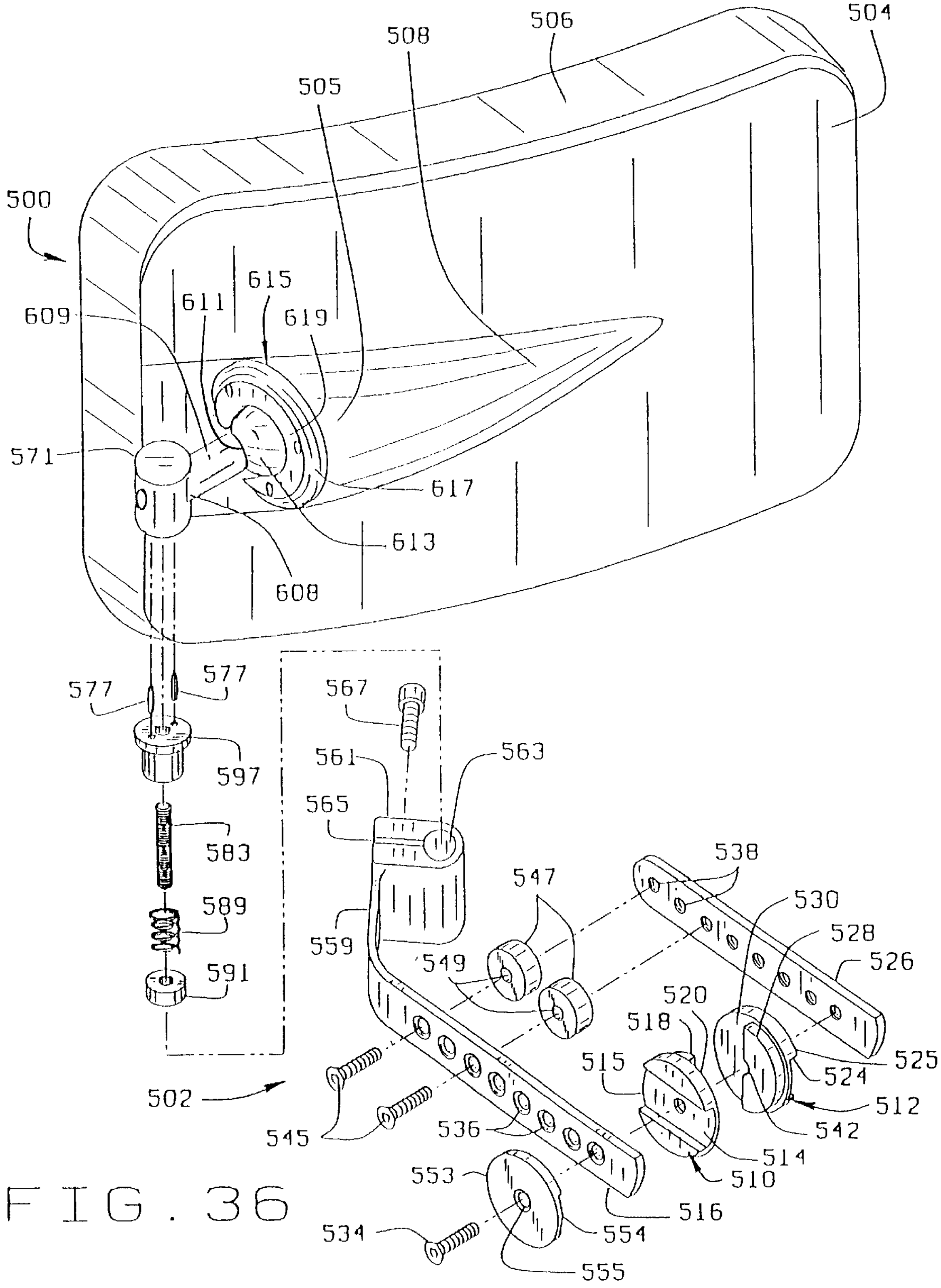
FIG. 36 is a partially exploded view of the lateral pad assembly shown in FIG. 35.

The backing plate 504 preferably is constructed from a substantially rigid polymer material such as ABS plastic, and the insert 506 can be constructed from a foam material. The housing 505 preferably includes support members 508 that are formed in the backing plate 504, and extend laterally across the backing plate 504 from the ball and socket joint to provide improved structural integrity for the lateral pads 500 (FIG. 36). A washable fabric cover 507 preferably is disposed around the pad 500 and held in place by a fastening mechanism such as Velcro hook and loop fasteners 509.

Each lateral pad mounting assembly 502 includes a first disc 510 and a second disc 512 that are positioned inside the opening 128A on the side plate 122. More specifically, the first disc 510 includes a recess 514 extending inwardly from its outwardly presented face 515 that is adapted to accommodate a support arm 516, a substantially semi-circular protrusion 518 extending outwardly from an inwardly presented surface 520 of the disc 510, and an opening 522 extending through a center axis of the disc 510. The second disc 512 has a similar construction as the first disc 510, with a recess 524 extending inwardly from its outwardly presented face 525 that is adapted to accommodate a reinforcement brace 526, a substantially semi-circular protrusion 528 extending outwardly from an inwardly presented surface 530 of the disc 512, and an opening (not shown) extending through a center axis of the disc 512. Upon assembly of the mounting assembly, the protrusions 518, 528 are disposed inside the opening 128A in the side plate 122 so as to define a substantially circular member that rotates freely inside the opening 128A. When the recesses 514, 524 for the support arm 516 and reinforcement brace 526, respectively, are positioned at a desired orientation, a threaded screw 534 is inserted through one of a plurality of threaded openings 536 formed in the support arm 516, through the openings formed in the discs 510, 512, and then through one of a plurality of tapped openings 538 formed in the reinforcement brace 526. The protrusion 528 of the second disc 512 has a notch 542 formed therein that is aligned with a corresponding notch (not shown) in protrusion 518 of the first disc 510 when properly positioned inside the opening 128A of the side plate 122 to allow for passage of the screw 534 therethrough.

The openings 538 in the reinforcement brace 526 are formed at locations corresponding to the openings 536 in the support arm 516. The openings 438 and 536 are aligned upon assembly of the mounting assembly 502. Two or more screws or threaded studs 545 preferably are inserted through the aligned openings 536, 538 to further strengthen the support arm 516. Spacers 547 having openings 549 extending therethrough preferably are positioned between the support arm 516 and the reinforcement brace 526 before the threaded studs 545 are inserted, so that each stud 545 passes through the opening 536 in the support arm 516, through the opening 549 in the spacer 547 and then through the opening 538 in the reinforcement brace 526.

The mounting assembly 502 preferably also includes a circular cap 553 (FIG. 36) having a substantially similar diameter as the discs 510, 512 and an opening 555 extending through the cap 553 at its center axis. The cap 553 is attached to the outwardly presented surface of the support arm 516 by the screw 534 to provide an aesthetically appealing finish to the mounting assembly 502. In the preferred embodiment, the support arm 516 has a greater thickness than the reinforcement brace 526. In this embodiment, the support arm 516 extends outwardly from the recess 514 of first disc 510, while the reinforcement brace 526 is flush with the outer surface 525 of the second disc 510 when the brace 526 is in recess 524. Thus, the cap 553 preferably includes a recess 554 adapted to accommodate the portion of the support arm 516 that extends outwardly from the recess 514 of the first disc 510.

The extent to which the pad 500 projects forwardly from the side plate 122 can be varied by sliding the support arm 516 in the recess 524 to a desired position, aligning the opening 522 in the disc 510 with the nearest opening 536 in the support arm 516, and then positioning the reinforcement arm 526 in the recess 524 of the second disc 512 so that the corresponding opening 538 in the reinforcement brace 526 is aligned with the opening 536 in the support arm 516 and the openings in the discs 510, 512. The angular orientation of the support arm 516 also can be varied by rotating the support arm 516 while disposed in the recess 514 so as to also rotate the discs 510, 512 within the opening 128A of the side plate 122. When the desired orientation of the pad 500 is obtained by the prescriber, the screw 534 is inserted into these aligned openings.

A forwardly extending end 559 of the support arm 516 has a clamp 561 disposed at its end. The forwardly extending end can be angled slightly inwardly as shown in FIG. 36, or the support arm 516 can be substantially straight, depending upon the support needs of the wheelchair user. The clamp 561 has an opening 563 extending therethrough, with a slot 565 extending radially outwardly from the opening 563. The clamp 561 also has a second opening (not shown) that extends through the slot 565, and is adapted to accommodate a screw or threaded stud 567 therein. A swivel assembly 569 extends through the opening 563 in the clamp 561, and is secured at a desired orientation by tightening the screw 567 in the second opening so as to force the slot 565 into a closed position.

Figure 37:
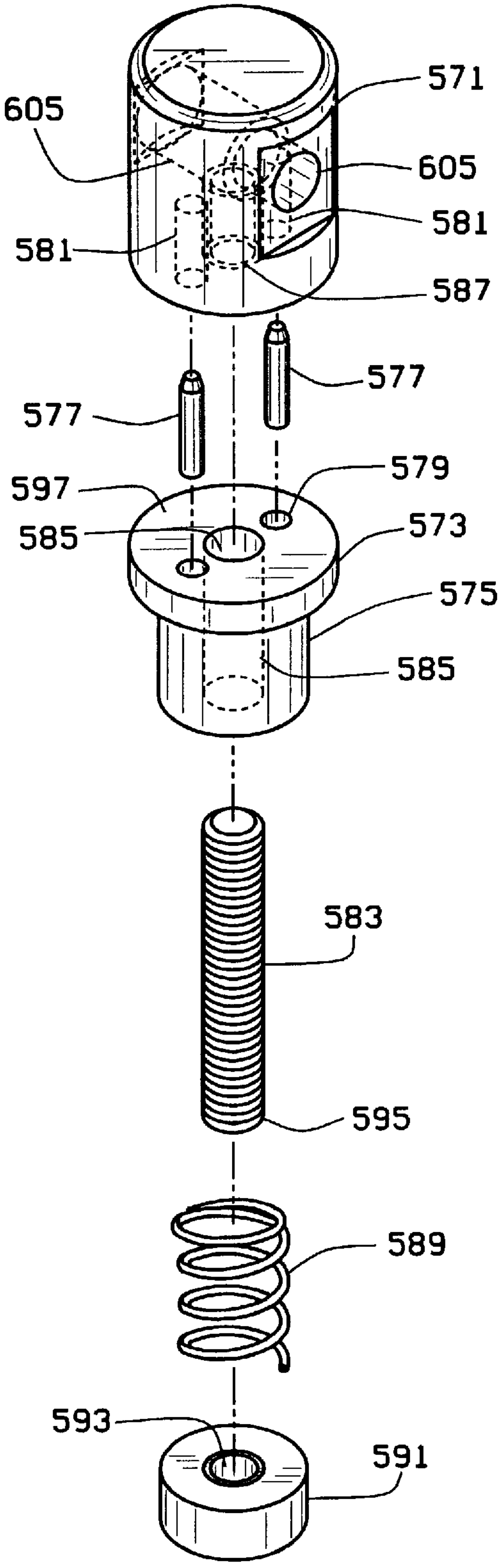
FIG. 37 is an exploded view of a swivel assembly associated with the lateral pad assembly of FIG. 35.

The preferred embodiment of the swivel assembly 569 is shown in FIG. 37. This construction of the swivel 569 allows for the lateral pad 500 to be pivoted outwardly away from the individual seated in the wheelchair 10 without loosening the clamp 561 or removing or readjusting the support arm 516. Thus, the lateral pads 500 can be easily moved way from the individual when necessary (e.g., for physical therapy or to remove the individual from the wheelchair 10) without disassembling the mounting assembly 502. In the preferred embodiment shown in FIG. 37, the swivel 569 includes a swivel pivot 571, a swivel base 573 having a post 575 integrally formed with and extending downwardly therefrom, a pair of dowel pins 577 that are inserted through openings 579 in the base 573 and securely retained in openings 581 formed in the swivel pivot 571, a thread rod 583 that is inserted through an opening 585 formed in the swivel base 573 and post 575 into an opening 587 formed in the swivel pivot 571, a tension spring 589 disposed around the thread rod 583, and a swivel retainer 591 having an opening 593 extending therethrough that is adapted to be securely positioned around a lower end 595 of the thread rod 583.

Figure 37A:
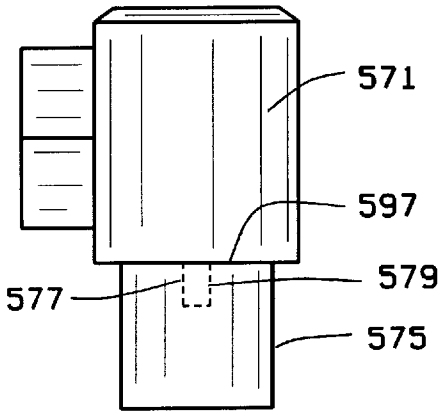
FIG. 37A is a side elevational view of the swivel assembly in the locked position.
Figure 37B:
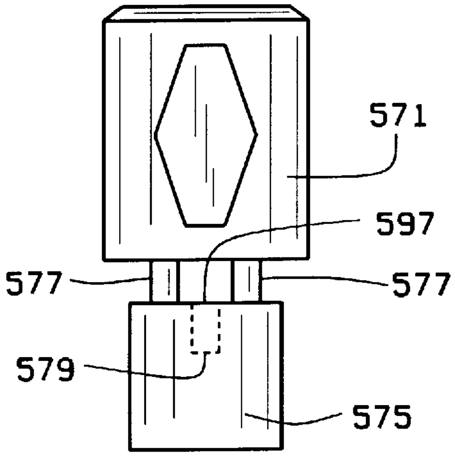
FIG. 37B is a side elevational view of the swivel assembly in the unlocked position.

Upon assembly of the mounting assembly 502 , the swivel pivot 571 and swivel base 573 extend upwardly from the clamp 561, and the swivel post 575, spring and swivel retainer 591 are disposed inside the opening 563 of the clamp 561. The spring 589 normally biases the swivel 569 into a locked position such that the dowel pins 577 are disposed inside the openings 579 in the swivel base 573 and the pad 500 cannot rotate about the swivel 569 (see FIG. 37A). To pivot the lateral pad 500 away from the wheelchair occupant, the swivel pivot 571 is manually pulled upwardly so that the dowel pins 577 are removed from the openings 579 in the swivel base 573. While the swivel pivot 571 is being pulled upwardly so that the dowel pins 577 are removed from the base 573, the swivel pivot 571 is rotated so that the dowel pins 577 are no longer aligned with the openings 579 in the swivel base 573. When the pads 500 are pivoted away from the wheelchair user and the pivot 571 is rotated sufficiently to prevent the dowel pins 577 from entering the base 573 openings 579, the pivot 571 can be released by the person rotating the pads 500 so that the swivel 569 is in an unlocked position with the dowel pins 577 resting on an upper surface 579 of the base (see FIG. 37B). To return the pad 500 to its desired location in the locked position when the occupant is returned to the wheelchair 10, the swivel pivot 571 can be pulled upwardly and rotated back to the locked position with the dowel pins 577 in the openings 579 of the base 573, or the pad 500 simply can be pushed inwardly toward the occupant until the dowel pins 577 slide back into the openings 579 in the swivel base 573.

The swivel pivot 571 also has an opening 605 extending radially therethrough that is adapted to accommodate a threaded stud or screw 607. In the preferred embodiment, a socket head screw is employed as screw 607. The threaded stud 607 secures one end 608 of an attachment arm 609 to the swivel pivot 571. The opposite end 611 of the attachment arm 609 is attached to a ball 613 associated with a ball and socket joint 615. The ball 613 is disposed inside a socket 617 formed in the backing plate 504 of the lateral pad. More specifically, the backing plate 504 has a socket base (not shown) formed therein that includes a cavity (not shown) adapted to receive at least a portion of the ball 613. The socket base of the lateral pad assembly preferably has a round configuration similar to that of socket base 376B since no wing pads preferably are attached to the lateral pads 500. The ball and socket joint 615 and swivel assembly 569 permit adjustment of each lateral pad 500 within six degrees of freedom. The ball 613 has a similar construction to that set forth above for ball 366. That is, the ball 613 includes a second section that is attached to or integrally formed with the attachment arm 609, and a first section that is attached to the second section by the threaded stud or screw 607 that extends through an opening (not shown) formed in the attachment arm 609 and through a threaded opening (not shown) formed in the second section.

As discussed above with respect to second member 346 and the second section 372 of ball 366, the attachment arm 609 and the second section of the ball 613 preferably are molded together as a single unitary structure, and preferably are constructed from a strong engineering plastic material such as RYTON®, sold by Phillips Petroleum Co., Bartlesville, Okla., or a polycarbonate material such as LEXAN®, sold by General Electric Company, Pittsfield, Mass. In this configuration, the base of the socket 617 also is constructed preferably from a strong plastic material such as RYTON®. However, the first portion of the ball 613 preferably is constructed from a more ductile, resilient, durable and high-strength material such as nylon or other similar synthetic polymer. The nylon material is capable of withstanding forces exerted on the first section without cracking when the ball 613 is in the locked position. The nylon material also is preferred since the nylon first section deforms in the base of the socket 617 when the first section is subjected to loading forces in the locked position. Since the first section is constructed from a softer material than the base in the preferred embodiment, the cavity of the base does not deform or degrade, and the locking feature of the ball and socket joint 615 remains operational over time. The socket 617 also includes a C-ring bracket 619 that is mounted to the socket base. The bracket 619 preferably is constructed from a lightweight, strong metal such as aluminum. Alternatively, the C-ring bracket 380 can be constructed from a strong engineering plastic material such as RYTON® or a polycarbonate material such as LEXAN® with an inner edge that is molded to have a rough surface. As discussed above with respect to ball and socket joints 342, the inner edge of the C-ring bracket 619 grips or frictionally engages the ball 613 when the screw is in the extended or locked position to assist in preventing rotation of the ball 613.

The threaded stud 607 is disposed in an extended position or retracted position within the attachment arm 609 and second section 619 by screwing or twisting the screw 607 into or out of the opening in the attachment arm 609. Thus, when a portion of the threaded screw 607 is tightened or screwed into the opening of the attachment arm 609 into the extended position, the first section (not shown) of the ball 613 is moved radially outwardly from the second section 619 into a locked position (compare to FIG. 25B for ball 366). When a portion of the threaded screw 607 is loosened or screwed out of the opening in the attachment arm 609, the first section of the ball 613 moves radially inwardly toward the first section into an unlocked position such that the ball rotates freely inside the socket to permit angular or rotational movement of the lateral pad (compare to FIG. 25A for ball 366). When the lateral pad 500 is moved into a desired position and orientation, the threaded screw 607 is screwed into the extended position, and the first section of the ball 613 is moved into the locked position against the socket 617 to prevent further angular movement of the pad 500 via that ball and socket joint 615.

Therefore, the ball and socket joint 615 and swivel assembly 569 allow for precise positioning of the lateral pads 500 against the user by providing for rotational and angular adjustment of the lateral pads 500. To adjust the lateral pads 500 from the rear or side of the wheelchair 10, the threaded bolts 567 of the clamps 561 and the threaded screw 607 associated with the ball and socket joints 615 are loosened or unlocked or moved into a retracted position to allow for unrestricted movement of the pads 500 to a desired location and orientation. As previously discussed with respect to bolts 362 and 368, knobs 363 or handles 365 can be attached to studs 567 and/or 607 to assist the prescriber in tightening or loosening the studs 567, 607 and manipulating the lateral pads 500. When the studs 567 and 607 are loosened, the ball 613 rotates freely inside the socket 617 and the attachment arm 609 rotates freely with respect to the support arm 516. When each pad is properly positioned against the user's back, the studs 567 and 607 are tightened by the prescriber.

B. Lateral Pads 800

The backrest system 30 also can be expanded to include one or more lateral pads 800 that are mounted at any location along the support tubes 148, vertical tubes 424 of the fourth tier mounting assembly and/or vertical tubes 442 of the headrest mounting assembly 434. Lateral pads 800 can be used in addition to lateral pads 500, or instead of lateral pads 500, depending upon the support needs of the wheelchair user. FIG. 32 illustrates a partially exploded view of the preferred embodiment of one lateral pad 800. The lateral pads 800 have a backing plate 802 and a cushion or insert 803 attached to the forwardly presented face of the backing plate 802. The backing plate 802 preferably is constructed from a substantially rigid polymer material such as ABS plastic, and the cushion can be constructed from a foam material. Support members 804 are formed in the backing plate 802, and extend diagonally across the backing plate 802 to provide improved structural integrity for the pads 800.

The lateral pads 800 are attached to the support tubes 148 at a desired location via an elbow joint 812 and the ball and socket joint 810 in a similar manner as discussed before with respect to elbow joint 338 and ball and socket joint 342. A ball 811 of the ball and socket joint 810 preferably is identical to ball 366 of ball and socket joint 342. However, for the lateral pad 800 assembly, the ball and socket joint 810 includes a socket 807 having a socket base 808 with a cavity 809 formed therein, an upper socket portion 814 that is mounted to the base 808 and has an opening formed therein to accommodate a portion of the ball 811 therein, and a C-shaped bracket 816 that is mounted to the upper bracket section 814 as shown in FIG. 32. As discussed above with respect to ball 366, the ball 811 includes two sections, namely a first section 813 and a second section 815, and is attached to a second member 818 of the elbow joint 812 by a stud 819, in an identical manner as discussed above with respect to the second member 346 and bolt 368 of elbow joint 338. The operation of the ball 811 is identical to that of ball 366, and is not repeated herein for ball 811.

The second member 818 also has a post 828 that extends outwardly therefrom in a similar manner as discussed above with respect to post 350. The post 828 is inserted through an opening 836 of a clamp 830 associated with a first member 832 of the elbow joint 812 by a retaining ring 834, in a similar manner as discussed above with respect to post 350, retaining ring 356 and clamp 355 of elbow joint 338. Thus, the first member 832 can rotate freely about the post 828. The clamp 830 further includes a slot 838 which extends from the opening 836 through the clamp 830, and an opening (not shown) that extends through the clamp and perpendicularly intersects the slot 838. The opening is adapted to receive a screw 840 therein (see FIG. 32). When the first member 832 is positioned in a desired orientation with respect to the second member 818, the screw 840 is inserted into the opening and tightened to close the slot 838. When this occurs, the clamp 830 exerts clamping forces on the post 828 to prevent rotation of the first member 832 with respect to the second member 818.

The first member 832 of the elbow joint 812 also includes a U-shaped attachment mechanism 852 that extends outwardly from the clamp 830 as shown in FIG. 32, and a sleeve 854 having an opening 856 formed therein that is adapted to slidably receive the attachment mechanism 852. The attachment mechanism 852 can be moved inwardly and outwardly within the opening 856 to adjust the length of the first member 832. This allows the lateral pad to be precisely located at various points along the user's torso to provide additional support. When the desired length of the first member 832 is obtained, a screw 858 is inserted through an opening 860 formed in the sleeve 854, and tightened by the prescriber to prevent further movement of the attachment mechanism 852 in the opening 856.

The first member 832 is attached to the support tube 148 or tubes 424 or 442 by a locking mechanism such as clamp 862 shown in FIG. 32. The clamp 862 includes two U-shaped sections 864 and 866 that are secured together to define an opening therebetween through which is inserted the support tube 148. When the sections 864, 866 are positioned at a desired height along the support tube 148, the two sections 864, 866 are secured together around the tube 148 by a pair of screws 868 that are inserted through openings 870, 872 formed in the sections 864, 866, respectively. Thus, the lateral pad can be easily removed from or attached to the support tube 148 via the clamp 862.

In view of the foregoing, it will be apparent that either lateral pads 800 or lateral pads 500, or both, can be used to apply pressure to the exoskeletal structure (ribs) of the user to provide improved lateral support of the spine. Furthermore, the lateral pads 800 can be positioned along the support tubes 148 such that the pads 800 are displaced with respect to each other (i.e., asymmetric positioning). Similarly, the mounting assembly 502 for lateral pads 500 can be rotated in the openings 128A of the side plates 122 so that the pads 500 are displaced with respect to each other to provide asymmetric positioning. This allows curvatures of the spine that are mild to moderate in nature to be supported properly by the backrest system 30. By attaching a pair of hip pads 672 (discussed below) to the support tubes 148 of the backrest system 30 in conjunction with the lateral pads 800 and/or 500, a three point force system is applied to the user's spine to provide corrective forces for "C" curves.

VII. Hip Pad Assembly

A hip pad assembly 670 (FIGS. 38 and 39) also can be used to provide additional support for the user, regardless of the type of back support employed (e.g., the insert 184 and shell 182 configuration, or the pad assembly 300). As discussed above, the pad 311 associated with the first tier helps stabilize and support the sacrum by controlling pelvic tilt in an anterior-posterior direction (see FIGS. 22A–D). Hip pads 672 can be added in this region to provide lateral stability as well. The hip pad assembly 670 includes one or two hip pads 672 that provide additional support by positioning the hip pads 672 over the greater trochanter so that the hip pads 672 apply a small amount of pressure to the user's hip region to encourage mid-line positioning of the pelvis (FIGS. 40A and 40B). As discussed herein, the hip pads 672 and lateral pads 500 can be used to provide the three point force system to control or correct mild to moderate scoliotic spinal curves.

Each hip pad 672 generally has a backing plate 673 and a cushion or insert 674 attached to the upwardly or inwardly presented face of the backing plate 672. The backing plate 672 preferably is constructed from a substantially rigid polymer such as ABS plastic, and includes a housing 675 extending rearwardly therefrom that is adapted to accommodate a round socket 376B for a ball and socket joint 740 (discussed below). The insert 674 can be constructed from a single piece of foam, a plurality of air cells, or can be a composite of a cellular cushion including a plurality of air cells disposed in a center portion of the cushion with foam provided on either side of the air cells. A suitable air cell cushion is the type manufactured and sold by ROHO, Inc. of Belleville, Ill., and set forth in U.S. Pat. Nos. 4,541,136 issued Sep. 17, 1985, and 5,369,828 issued Dec. 6, 1994.

The hip pad assembly 670 is attached to the lower end 172 of the support tubes 148 by a pair of extension tubes 463. As discussed above, each extension tube 463 has a body portion 465 with a tapered or angled end 468 and a tapered barrel 470 that is attached to the body portion 465 at the tapered end 468 by a screw 471 (not shown in FIGS. 38, 39). The tapered barrel 470 is inserted in the opening 149 of the support tube 148, and then the screw is tightened to force the barrel 470 into abutment with the tapered end 468 of the body portion 465 until edges of the tapered barrel 470 and the tapered end 468 engage an inner surface of the support tube 148, thereby locking the assembly 670 in place.

Figure 38:
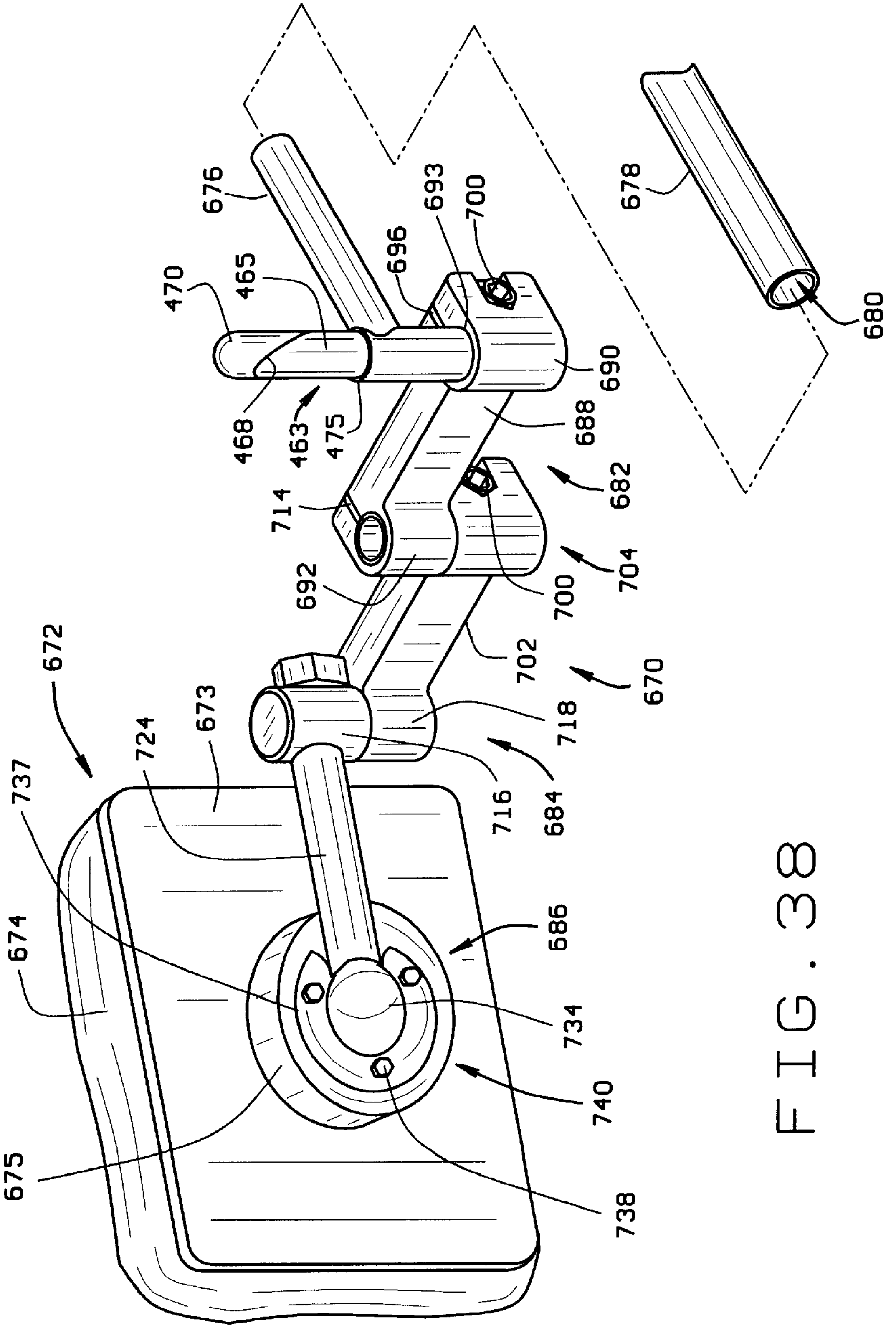
FIG. 38 is a perspective view of the hip pad assembly.

In the preferred embodiment, the extension tubes 463 that support the hip pad assembly 670 are modified to also include a tubular arm 676 extending outwardly from the body portion 465 in a substantially perpendicular fashion as shown in FIG. 38. When the extension tubes 463 are attached to the support tubes 148, the arms 676 are oriented to extend inwardly to allow for a cylindrical tube 678 having an opening 680 extending axially therethrough to be inserted around the arms 676. The arms 676 support the tube 678 in a generally horizontal fashion across the rear of the back support assembly 34. The arms 676 and tube 678 improve the structural integrity of the hip pad assembly 670.

Each hip pad 672 is attached to the body portion 465 of the extension tube 463 via a pair of elbow joints, namely a first elbow joint 682 and a second elbow joint 684, and a ball and socket joint 686. The elbow joints 682, 684 and ball and socket joints 686 operate in a similar manner to those set forth above for dual trunk pads 312*a* and 312*b*, allowing for the hip pads 672 to be adjusted within six degrees of freedom. The socket base (not shown) of the ball and socket joint 686 preferably has a round configuration that is similar to base 376B since no wing pads are attached to the hip pads 672. Using two elbow joints 682, 684 to attach the hip pads 672 to the extension tubes 463 allows for a greater range of forward, rearward and lateral pad movement than if only one elbow joint was used. The first elbow joint 682 includes a first member 688 (similar to the first member 344 of elbow joint 338) that has a first clamp 690 at one end and a second clamp 692 at the opposite end. The body portion 465 of the extension tube 463 is inserted through an opening 693) formed in the first clamp 690, and then the clamp 690 is tightened to secure the first member 688 to the extension tube 463. The clamp 690 preferably has a slot 696 extending radially outwardly from the opening in the first clamp 690 that is at least partially closed when the clamp 690 is tightened around the extension tube 463. The clamp 690 is tightened by a locking mechanism such as threaded bolt 700 that is inserted through an opening 694 formed in the first member 688 that extends through the slot 696 and held in place by a lock nut 701 in a similar fashion as discussed above with respect to the first member 344 of elbow joint 338.

The first member 688 is operably attached to a second member 702 by a swivel attachment assembly 704 that allows the first member 688 to rotate freely with respect to the second member 702 about the attachment device 704. In the embodiment shown in FIG. 39, the swivel attachment device 704 includes a post 706 that is integrally formed with and extends upwardly from one end of the second member 702 through an opening 708 formed in a second clamp 692 associated with the first member 688. The second clamp 692 includes a slot 714 extending radially outwardly from the opening 708. The opening 694 extending the length of the first member 688 in which the bolt 700 is disposed also extends through the slot 714 so that as the bolt 700 is tightened, slot 714 closes and clamp 692 exerts clamping force on the post 706. As discussed above with respect to attachment device 348, the post 706 is held in the opening 708 by a retaining ring 712 that is received in an inwardly extending notch 707 formed around the periphery of the upper end of the post 706 so that the first member 688 rotates freely around the post 706. When the pad 672 is arranged at a desired position, the threaded bolt 700 is tightened to force slots 696 and 714 to close, thereby preventing movement of the first clamp 690 with respect to the extension tube 463, and the second clamp 692 with respect to post 706.

Figure 39:
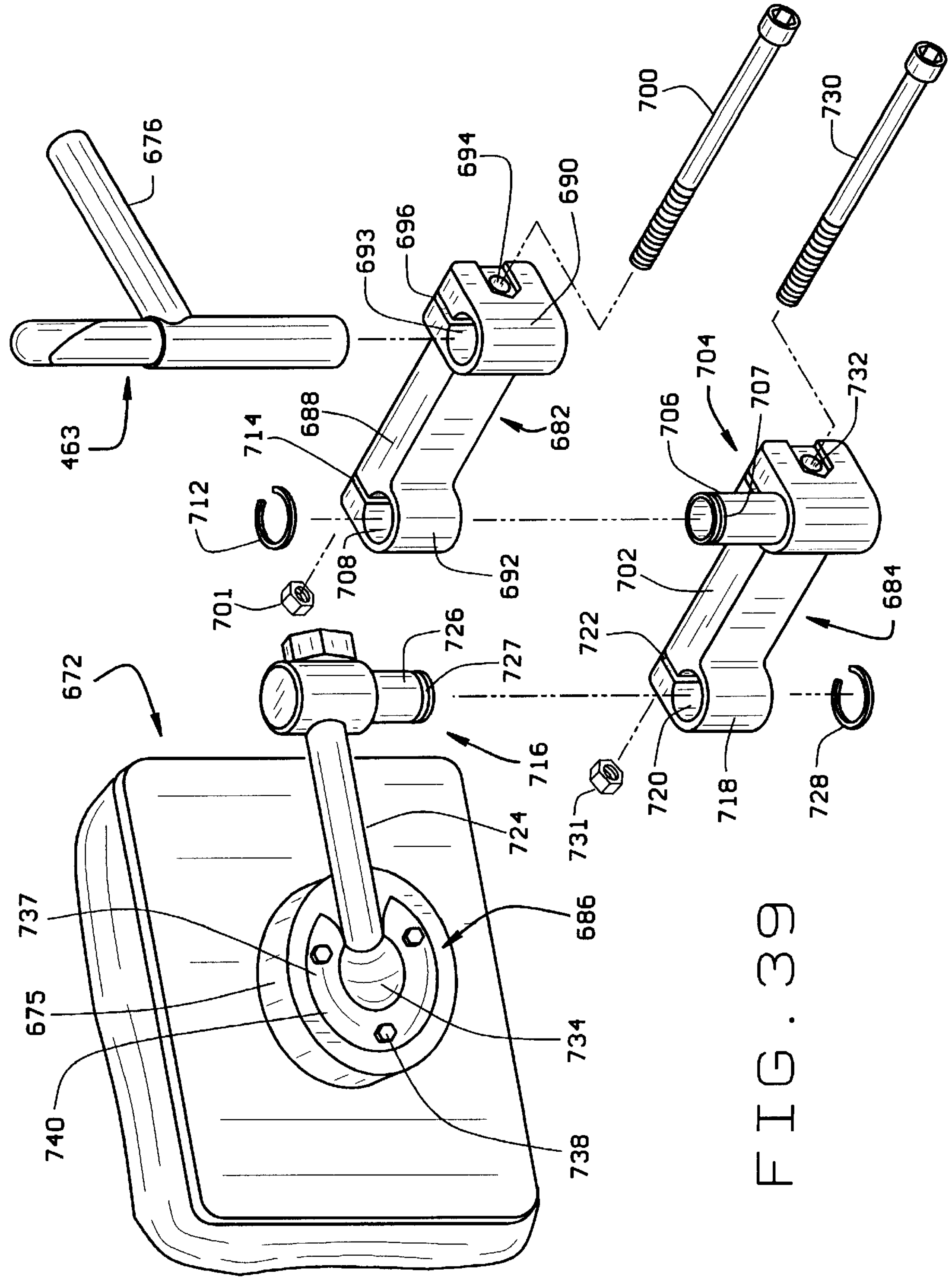
FIG. 39 is an exploded view of the hip pad assembly.

The second member 702 also is connected to a swivel attachment assembly 716 associated with the second elbow joint 684. With respect to the second elbow joint 684, more specifically, the second member 702 includes a clamp 718 having an opening 720 extending therethrough and a slot 722 extending radially outwardly from the opening 720 that is formed at an end of the second member 702 that is opposite the post 706. The second member 702 is operably attached to a third member 724 associated with the second elbow joint 684 by an attachment assembly 716 that allows second member 702 to rotate freely with respect to the third member 724. The swivel attachment assembly 716 is similar to the attachment assembly 704 of the first elbow joint 682 in the embodiment shown in FIG. 39. More specifically, the attachment assembly 716 includes a post 726 that is integrally formed with and extends downwardly from one end of the second member 702 through the opening 720 formed in the clamp 718 associated with the second member 702. The post 726 is held in the opening 720 by a retaining ring 728 that is received in an inwardly extending notch 727 formed around the periphery of the lower end of the post 726 so that the second member 702 rotates freely around the post 726. The clamp 718 is tightened by a locking mechanism such as threaded bolt 730 that inserted through an opening 732 formed in the second member 702 that extends through the slot 722 and held in place by a lock nut 731 in a similar fashion as discussed above with respect to the clamps 690, 692 of the first member 688 (FIG. 39).

It will be appreciated that the posts 706, 726, clamps 692, 718, and retaining rings 712, 728 of the swivel attachment assemblies 704, 716, respectively, and the associated locking mechanisms are set forth for illustrative purposes. Other swivel assemblies and locking mechanisms can be used to prevent rotational movement of members of the elbow joints (e.g., see FIG. 23C).

The end of the third member 724 that is opposite post 726 is attached to a ball 734 that is disposed inside a socket 376B (not shown) associated with the ball and socket joint 740. A c-ring bracket 737 is attached to the socket and housing of the backing plate by bolts 738 in a similar manner as discussed above for c-ring 380 and bolts 382. The ball and socket joint 740 permit rotary movement of the pads 672 in every direction through movement of the ball 734 in the socket. In one embodiment, the ball 734 is attached to the third member 724 by a screw or threaded bolt (not shown) that is inserted through an opening formed in the third member 724 in a similar manner as set forth above for ball and socket joint 342. In the preferred embodiment, the ball 734 includes two sections (not shown) that operate in an identical manner as sections 371 and 372 to allow for movement of the ball 734 in the socket 736 when the bolt is in a retracted position (i.e., the ball 734 is in an unlocked position), and prevent movement of the ball 734 in the socket 736 when the bolt is in an extended section (i.e., the ball 734 is in the locked position). As discussed above with respect to ball 366, the second section of the ball 734 preferably is integrally formed with the third member 724, and the first section is secured to the second section by the bolt.

VIII. Back Cover

The backrest system 30 also can include a back cover 750 that is removably secured to back support 34 as shown in FIG. 33 to provide an improved aesthetic view from the rear of the wheelchair 10 by covering the support chassis 32 and at least a portion of the back support 34. When the pad assembly 300 is employed, the back cover 750 preferably hides from view the support chassis 32, elbow joints 338 and ball and socket joints 342 associated with at least pads 311, 312*a*, 312*b*, 313 associated with the first, second and third tiers 301, 302, 303. In the preferred embodiment, the back cover 750 is constructed from a washable fabric material, and held in position by a fastening mechanism such as VELCRO® hook and loop fasteners 752 attached to an inner surface of the back cover 750 and the back support 34. Alternatively, the fastening mechanism can include an elastic band that is attached to an outer edge of the back cover material so that the cover can be slipped over the back support and held in place by the elastic band.

In view of the above, it will be seen that the several objects and advantages of the present invention have been achieved and other advantageous results have been obtained.

The foregoing description is set forth only for illustrative purposes only and is not meant to be limiting. As various changes could be made in the above constructions without departing from the scope of the invention, it is intended that all matter contained in the above description or shown in the accompanying drawings shall be interpreted as illustrative and not in a limiting sense. Numerous variations, within the scope of the appended claims will be apparent to those skilled in the art in light of the foregoing description and accompanying drawings.

What is claimed is:

1. A ball and socket joint comprising:

a substantially spherical ball including a first section and a second section having a threaded opening extending therethrough, said first and second sections having spherical outer surface areas terminating in juxtaposed planar base surfaces defined by a cutting plane, said planar base surfaces having diameters corresponding to a diameter of a small circle of the ball;

a socket having a cavity formed therein that is sized to receive a portion of said ball, said socket including a base having said cavity formed therein, and a bracket secured to said base when said ball is positioned inside said cavity, said bracket having an inner edge positioned around a portion of said ball;

a threaded stud secured to said first section of said ball and extending through said opening in said second section outwardly from said socket, said stud being movable within said opening inwardly to an extended position and outwardly to a retracted position, said stud moving said first section of said ball into abutment with said second section when said stud is in the retracted position to permit said ball to rotate freely in said socket, said stud moving the planar base surface of said first section of said ball outwardly away and spaced from the planar base surface of said second section and the outer surface area of the first segment into engagement with the cavity of said socket when said stud is in the extended position to prevent rotation of said ball in said socket, said inner edge of said bracket engaging said ball when said stud is in the extended position to prevent rotation of said ball in said cavity.

2. A backrest system for a chair for seating an individual, said chair having a seat and upright posts extending upwardly from the rear of the seat in a spaced apart, substantially parallel manner, said backrest system comprising:

a back support adapted to be positioned generally between the posts to provide a surface against which the back of an individual rests when the individual sits on the chair seat;

a support chassis mounted to said back support for supporting said back support at a desired incline with respect to the posts, and at a desired seat depth with respect to the seat; said support chassis including a pair of side plates with one side plate being adapted to be disposed between each post and said back support, and at least one horizontal tube attached to and extending transversely between said side plates across said back support; and an attachment assembly operably connected to said support chassis and connectable to the posts to allow said support chassis and back support to be readily removed from or attached to the chair.

3. The backrest system as set forth in claim 2, wherein each of said side plates has a substantially horizontal slot formed therein which permits forward and rearward movement of said back support with respect to said posts to allow for said back support to be positioned at the desired seat depth.

4. The backrest system as set forth in claim 3, wherein said support chassis further includes a pair of swivel clamps with each swivel clamp having a pair of slots formed therein that permit angular movement of said back support with respect to said posts to allow said back support to be positioned at the desired incline.

5. The backrest system as set forth in claim 4, wherein said support chassis further includes fastening mechanisms that are inserted into said slots of said swivel clamp and said slots of said side plates to prevent further movement of said back support when said back support is positioned at the desired seat depth and the desired incline.

6. The backrest system as set forth in claim 2, wherein said attachment assembly further includes a pair of bands with one band being adapted to be positioned around each of said posts at a desired height, a pair of adapters having axially extending openings formed therein with one adapter being adapted to be positioned opposite to said post inside each band, and at least one wedging mechanism adapted to be positioned inside each band between said post and said adapter to force said band to remain in place along said post.

7. The backrest system as set forth in claim 6, wherein said attachment assembly further includes a pair of mounting devices attached to said support chassis for releasably securing said support chassis to said chair via said adapters, each mounting device including a mounting post attached to and extending outwardly from said support chassis, a barrel disposed at an outermost end of each mounting post, and a lever disposed at an opposite end of each mounting post, said lever having a locked position and an unlocked position, and being operably connected to said barrel, said openings in said adapters being sized to slidably receive one of said mounting posts and barrels therein when said lever is in the unlocked position, said barrel being moved into secure engagement with said adapter when said mounting post and barrel are positioned inside said opening and said lever is actuated into the locked position, thereby preventing removal of said mounting post and barrel from said opening.

8. The backrest system as set forth in claim 2, wherein said back support includes a backing plate and an insert attached to a forwardly presented face of said backing plate against which the back of the individual rests when sitting on the seat.

9. The backrest system as set forth in claim 8, wherein said backing plate is mounted to said horizontal tube by inserting at least one threaded bolt through an opening formed in said horizontal tube and through an aligned opening formed in said backing plate, said bolt being secured by a nut that is attached thereto.

10. The backrest system as set forth in claim 2, wherein said horizontal tube includes an opening extending axially therethrough, and is attached to each side plate by a mounting post that extends transversely and inwardly therefrom, said mounting post being adapted to be received in said opening of said horizontal tube.

11. The backrest system as set forth in claim 10 wherein each of said mounting posts includes a locking assembly for selectively securing said mounting posts to said horizontal tube.

12. The backrest system as set forth in claim 11 wherein said locking assembly includes a body portion with a tapered end and a tapered barrel that is secured to said body portion at said tapered end, said barrel being secured to said body portion by a threaded bolt that extends through an axially extending opening formed in said body portion into said barrel, said barrel being moved axially inwardly and outwardly with respect to said body portion by said bolt, said barrel being moved inwardly into abutment with said tapered end of said body portion and displaced radially outwardly so that edges of said tapered end of said body portion and said tapered barrel are wedged against an inner surface of said horizontal tube when said bolt is tightened to securely retain said mounting posts inside said horizontal tubes, said barrel being moved axially outwardly away from said tapered end of said body portion when said bolt is loosened so that edges of said tapered end of said body portion and barrel do not engage said inner surface of said tube and said mounting posts move freely inside said horizontal tubes.

13. The backrest system as set forth in claim 11, wherein each of said horizontal tubes is attached to vertical tubes by a pair of tube clamp assemblies that retain said horizontal tubes and said vertical tubes in a substantially perpendicular relationship and prevent rotational and longitudinal movement of said tubes.

14. The backrest system as set forth in claim 2, wherein two horizontal tubes are attached to and extend between said side plates in a substantially parallel manner, and further including a pair of vertically extending support tubes that are attached to and extend perpendicularly from said horizontal tubes in a substantially parallel fashion.

15. The backrest system as set forth in claim 14, wherein said back support includes a plurality of pads adjustably attached to said support tubes at desired locations along the support tubes based upon support needs of the individual.

16. The backrest system as set forth in claim 15, wherein each pad is attached to at least one of the support tubes by an elbow joint that permits forward and rearward movement and side-to-side movement of the pad, said elbow joint including a first member having one end securely clamped to said support tube, and a second member attached at one end to said pad and at an opposite end to another end of said first member so that said first member rotates freely with respect to said second member.

17. The backrest system as set forth in claim 16, wherein each pad is attached to the second member of said elbow joint by a ball and socket joint that permits rotary movement of the pad with respect to the second member.

18. A backrest system for a chair for seating an individual, said chair having a seat and upright posts extending upwardly from the rear of the seat in a spaced apart, substantially parallel manner, said backrest system comprising:

a back support adapted to be removably positioned between said posts to support a back of an individual sitting on the chair seat;

a support chassis adapted to be disposed between said posts and mounted to said back support for supporting said back support at a desired incline with respect to said posts; and a two-point attachment assembly connectable to each of said posts at a desired location along each post for releasably securing said support chassis to said posts.

19. The backrest system as set forth in claim 18, wherein said attachment assembly is adjustably connectable to said posts at a desired location based upon the height of the individual.

20. The backrest system as set forth in claim 18, wherein said support chassis is movable forwardly and rearwardly with respect to said posts to allow for positioning of said back support at a desired seat depth with respect to said seat, said support chassis allowing for the seat depth and the incline of said back support to be adjusted independently.

21. The backrest system as set forth in claim 20, wherein said support chassis further includes a pair of side plates disposed on opposite sides of said back support, said side plates being adapted to be disposed between said back support and said posts, each side plate having a horizontally extending slot formed therein to permit forward and rearward movement of said back support to adjust the seat depth.

22. The backrest system as set forth in claim 18 wherein said back support includes a substantially rigid backing plate and an insert attached to a forwardly presented face of said backing plate against which the back of the individual rests when sitting in the chair; said backing plate being supported by said support chassis at the desired incline.

23. The backrest system as set forth in claim 18 further including a pair of support tubes attached to said support chassis and extending vertically therefrom in a substantially parallel, spaced apart manner.

24. The backrest system as set forth in claim 23 wherein said back support includes a plurality of pads mounted to said support tubes at desired locations based upon support needs and proportions of the individual.

25. The backrest system as set forth in claim 24 wherein each of said pads is adjustable inwardly, outwardly and laterally with respect to said support tubes and at forward and rearward inclines with respect to said support tubes to provide a support surface for the individual sitting on the seat based upon that individual's dimensions and support needs.

26. A backrest system for a chair for seating an individual, said chair having a seat and upright posts extending upwardly from the rear of the seat in a spaced apart, substantially parallel manner, said backrest system comprising:

a back support adapted to be removably positioned between said posts to support a back of an individual sitting on the chair seat;

a support chassis adapted to be disposed between said posts and mounted to said back support for supporting said back support at a desired incline with respect to said posts;

a pair of support tubes attached to said support chassis and extending vertically therefrom in a substantially parallel, spaced apart manner; and an attachment assembly connectable to each of said posts for releasably securing said support chassis to said posts;

said back support including a plurality of pads mounted to said support tubes at desired locations based upon support needs and proportions of the individual; each of said pads being movable inwardly, outwardly and laterally with respect to said support tubes and at forward and rearward inclines with respect to said support tubes to provide a support surface for the individual sitting on the seat based upon that individual's dimensions and support needs, each pad being attached to at least one of said support tubes by an elbow joint that permits inward, outward and lateral movement of said pad.

27. The backrest system as set forth in claim 26 wherein each pad is attached to said elbow joint by a ball and socket joint.

28. The backrest system as set forth in claim 27 wherein a first pad is attached to both support tubes via a pair of ball and socket joints and a pair of elbow joints to support the sacral region of the back of the individual seated in the chair.

29. The backrest system as set forth in claim 28 wherein two pads including a second pad and a third pad are provided to support the lumbar region of the individual's back, the second pad being attached to one support tube at a desired location via one ball and socket joint and one elbow joint, and the third pad being attached to the other support tube at a location corresponding to that of the second pad via one ball and socket joint and one elbow joint.

30. The backrest system as set forth in claim 29 wherein a fourth pad is attached to both support tubes via a pair of ball and socket joints and a pair of elbow joints to provide support in the mid-thoracic region of the individual's back.

31. The backrest system as set forth in claim 30 wherein a fifth pad assembly is attached to said support tubes to provide support for the upper-thoracic region of the individual's back.

32. The backrest system as set forth in claim 30 wherein a headrest assembly is attached to said support tubes to provide support for the head of the individual seated in the chair.

33. The backrest system as set forth in claim 32 wherein said headrest assembly includes a mounting assembly that is removably secured to said support tubes, and a headrest pad against which the head of the individual rests when the individual is seated in the chair.

34. The backrest system as set forth in claim 33 wherein said mounting assembly permits rotary, lateral, forward and rearward movement of said headrest pad with respect to said support tubes.

35. The backrest system as set forth in claim 34 wherein said headrest assembly further includes at least one elbow joint that is attached to said mounting assembly at a desired location based upon the height and support needs of the individual.

36. The backrest system as set forth in claim 35 wherein said headrest pad is attached to said elbow joint by a ball and socket joint.

37. The backrest system as set forth in claim 36 further including means for preventing movement of said headrest pad when said pad is disposed in a desired position.

38. A backrest system for a chair for seating an individual, said chair having a seat and upright posts extending upwardly from the rear of the seat in a spaced apart, substantially parallel manner, said backrest system comprising:

a back support adapted to be removably positioned between said posts to support a back of an individual sitting on the chair seat;

a support chassis adapted to be disposed between said posts and mounted to said back support for supporting said back support at a desired incline with respect to said posts, said support chassis being movable forwardly and rearwardly with respect to said posts to allow for positioning of said back support at a desired seat depth with respect to said seat, said support chassis further including a pair of side plates disposed on opposite sides of said back support, said side plates being adapted to be disposed between said back support and said posts, each side plate having a horizontally extending slot formed therein to permit forward and rearward movement of said back support to adjust the seat depth, said support chassis further including a pair of swivel clamps mounted to said side plates having circumferentially extending slots formed therein to permit angular rotation of said back support with respect to said posts to adjust the incline of the back support; and an attachment assembly connectable to each of said posts for releasably securing said support chassis to said posts.

39. A backrest system for releasable attachment to a chair, the chair having a seat and upright posts extending upwardly from the rear of the seat in a spaced apart, substantially parallel manner, said backrest system comprising:

a back support adapted to be positioned generally between the posts to provide a surface against which the back of an individual rests when the individual sits on the chair seat;

a support chassis mounted to said back support for supporting said back support at a desired incline with respect to the posts, and at a desired seat depth with respect to the seat; and a two-point attachment assembly adapted to removably secure said support chassis to the chair, said attachment assembly being connectable to said posts at one desired point of attachment along each post.

40. A backrest system for a chair for seating an individual, said chair having a seat and a pair of upright posts extending upwardly from the rear of the seat in a spaced apart manner, said backrest system comprising:

a support frame adapted to be releasably secured between said posts at one location along each post, said support frame being horizontally movable forwardly and rearwardly with respect to said posts to position said support frame at a desired seat depth with respect to said seat; and a back support mounted to said support frame to provide a surface against which the back of the individual rests when seated in the chair.

41. The backrest system as set forth in claim 40 wherein said support frame allows for rotation of said back support forwardly and rearwardly with respect to said posts to position said back support at a desired incline with respect to said posts, said support frame allowing for independent adjustment of seat depth and back support incline.

42. A backrest system for a chair for seating an individual, comprising: a pair of support tubes connectable to a rear of said chair and extendable vertically therefrom in a substantially parallel, spaced apart manner; at least one back support pad attached to at least one of said support tubes at a desired location based upon support needs and proportions of an individual sitting in the chair; and at least one elbow joint having one end connected to the support tube at one location along the support tube and at an opposite end to the support pad for adjustably securing the support pad to the support tube at the desired location, said elbow joint permitting inward, outward and lateral movement of said pad.

43. The backrest system as set forth in claim 42 wherein each pad is attached to said elbow joint by a ball and socket joint, said ball and socket joint having an unlocked position permitting rotational movement of said pad and a locked position for supporting said pad in the desired location.

44. A backrest system for a chair for seating an individual, comprising: a pair of support tubes connectable to a rear of said chair and extendable vertically therefrom in a substantially parallel, spaced apart manner; and at least one back support pad attached to at least one of said support tubes at a desired location based upon support needs and proportions of an individual sitting in the chair; said pad being coupled to said support tube by at least one elbow joint, said elbow joint permitting inward, outward and lateral movement of said pad, said elbow joint including a first member having a first end with a first opening extending therethrough and a second end attached to said support tube, said elbow joint further including a second member having a first end coupled to said first end of said first member via a swivel attachment assembly and a second end attached to said pad via a ball and socket joint, said swivel attachment assembly including a post extending outwardly through an opening formed in the first end of the second member and through the first opening of the first member, and a retaining device attached to said post for preventing said post from becoming dislodged from said first and second members and permitting said first member to rotate freely about said post, said elbow joint further including a locking mechanism for selectively preventing rotation of said first member with respect to said second member when said elbow joint is positioned at a desired orientation.

45. The backrest system as set forth in claim 44 wherein said locking mechanism includes a clamping device formed in said first end of said first member, said clamping device including a slot extending radially outwardly from said first opening through said first member, and a second opening formed in said first member and extending through said slot, said second opening being adapted to accommodate a threaded stud that is held inside the opening by a nut, said clamping device exerting clamping force on said post when said threaded stud is tightly secured inside said second opening by forcing said slot into a closed position and preventing rotation of said first member with respect to said second member.

46. A backrest system for a chair for seating an individual, comprising: a pair of support tubes connectable to a rear of said chair and extendable vertically therefrom in a substantially parallel, spaced apart manner; and at least one back support pad attached to at least one of said support tubes at a desired location based upon support needs and proportions of an individual sitting in the chair; said pad being coupled to said support tube by at least one elbow joint, said elbow joint permitting inward, outward and lateral movement of said pad, each pad being attached to said elbow joint by a ball and socket joint, said ball and socket joint including a ball having a first section and a second section, said second section being attached to said elbow joint, a socket having a cavity formed therein adapted to receive said ball, and means for radially moving said first section of said ball inwardly or outwardly with respect to said second section of said ball, said joint being in an unlocked position permitting rotation of said socket with respect to said ball when said first section is moved inwardly toward said second section, said joint being in a locked position preventing movement of said socket with respect to said ball when said first section is moved radially outwardly from said second section into engagement with said socket.

47. A backrest system for a chair for seating an individual, comprising: a pair of support tubes connectable to a rear of said chair and extendable vertically therefrom in a substantially parallel, spaced apart manner; and at least one back support pad attached to at least one of said support tubes at a desired location based upon support needs and proportions of an individual sitting in the chair; said pad being attached to said support tube by a ball and socket joint having an unlocked position that permits rotational movement of the pad and adjustment of forward and rearward incline of said pad with respect to said support tube to position the pad in the desired location and a locked position that supports the pad at the desired location.

48. The backrest system as set forth in claim 47 further including an elbow joint connecting said ball and socket joint to said support tube, said elbow joint permitting inward, outward and lateral movement of said pad with respect to said support tube.

49. A backrest system for a chair for seating an individual, comprising: a pair of support tubes connectable to a rear of said chair and extendable vertically therefrom in a substantially parallel, spaced apart manner; and at least one back support pad attached to at least one of said support tubes at a desired location based upon support needs and proportions of an individual sitting in the chair; said pad being attached to said support tube by a ball and socket joint that permits forward and rearward incline of said pad with respect to said support tube; said ball and socket joint including a spherical ball including a first section and a second section, a socket having a spherical cavity formed therein that is sized to receive at least a portion of said ball, and means for radially moving said first section of said ball inwardly or outwardly with respect to said second section of said ball, said ball being in an unlocked position permitting rotation of said ball in said socket when said first section is in abutment with said second section of said ball, said ball being in a locked position preventing movement of said ball in said socket when said first section is moved radially outwardly from said second section into engagement with said socket.

50. The backrest system as set forth in claim 49 wherein said ball includes an opening extending radially through said second section, and said means for radially moving said first section includes a threaded stud attached to said first section of said ball and extending through said opening in said second section outwardly from said socket, said stud being movable within said opening inwardly to a retracted position and outwardly to an extended position, said ball being in the unlocked position when said stud is in the retracted position, said ball being in the locked position when said stud is in the extended position.

51. The backrest system as set forth in claim 50 wherein said first section of said ball is constructed from a nylon material.

52. The backrest system as set forth in claim 51 wherein said second section of said ball is constructed from a strong engineering plastic material.

53. The backrest system as set forth in claim 51 wherein said cavity in said socket is constructed from a strong engineering plastic material.

54. The backrest system as set forth in claim 53 wherein said second section of said ball is constructed from a strong engineering plastic material.

55. The backrest system as set forth in claim 54 wherein said socket further includes a C-ring bracket that is positioned around said ball disposed in said cavity; said bracket exerting force of said ball when said ball is in the locked position to prevent rotation of said ball.

56. The backrest system as set forth in claim 55 wherein said bracket is constructed from a metal material.

57. The backrest system as set forth in claim 55 wherein said bracket is constructed from a strong plastic material, said bracket having an inner edge that is adapted to frictionally engage said ball when said ball is in said locked position to prevent rotation of said ball.

58. A backrest system for a chair for seating an individual, comprising:

a pair of support tubes connectable to a rear of said chair and extendable vertically therefrom in a substantially parallel, spaced apart manner;

a back support removably secured to said support tubes to support the back of an individual sitting on the chair seat;

a headrest assembly removably mounted to said support tubes at a desired position to support the head of the individual seated in the chair, including a mounting assembly that is removably secured to said support tubes, and a headrest pad attached to the mounting assembly against which the head of the individual rests when the individual is seated in the chair, said mounting assembly having an unlocked position allowing for adjustment of said headrest pad to obtain the desired position and a locked position for preventing movement of the headrest pad when the desired position is obtained.

59. The backrest system as set forth in claim 58 wherein said mounting assembly permits forward and rearward movement of said headrest pad with respect to said support tubes in the unlocked position.

60. The backrest system as set forth in claim 58 wherein said mounting assembly further includes a pair of elbow joints that attach said headrest pad to said support tubes with one elbow joint releasably secured to each support tube and extending between the support tube and the headrest pad, said elbow joints having an unlocked position permitting inward, outward and lateral movement of said headrest pad with respect to said support tubes and a locked position preventing inward, outward and lateral movement of the headrest pad, said elbow joints being attached to said mounting assembly at desired locations based upon the height and support needs of the individual.

61. The backrest system as set forth in claim 60 wherein said headrest pad is attached to each elbow joint by a ball and socket joint, said ball and socket joint having an unlocked position permitting rotary movement of said headrest pad and a locked position preventing the rotary movement of the headrest pad.

62. A backrest system for a chair for seating an individual, comprising:

a pair of support tubes removably connectable to a rear of said chair and extendable vertically therefrom in a substantially parallel, spaced apart manner; and a plurality of individual support pads with each pad being removably secured to at least one of said support tubes to support the back of an individual sitting on the chair seat, said back support pads including a first pad attached to both support tubes at a desired location along each support tube to provide a first tier of support for the sacral region of the back of the individual seated in the chair, a pair of pads including a second and a third pad to provide a second tier of support for the lumbar region of the individual's back, said second pad being attached to one support tube at a desired location and the third pad being attached to the other support tube at a location corresponding to that of the second pad, and a fourth pad attached to the support tubes at a desired location along each support tube to provide a third tier of support for the mid-thoracic region of the individual's back.

63. The backrest system as set forth in claim 62 wherein said support pads further include a fifth pad mounted on said support tubes at a desired location along each tube to provide a fourth tier of support for the upper thoracic region of the individual's back.

64. The backrest system as set forth in claim 63 further including a headrest pad removably mounted on said support tubes to provide a fifth tier of support for the head of the individual.

65. A backrest system for a chair for seating an individual comprising:

a pair of support tubes connectable to a rear of said chair and extendable vertically therefrom in a substantially parallel, spaced apart manner;

a plurality of support pads attached to said support tubes to support a back of an individual sitting on the chair seat, said back support pads including a first pad to provide a first tier of support for the sacral region of the back of the individual seated in the chair, a pair of pads including a second and a third pad to provide a second tier of support for the lumbar region of the individual's back, said second pad being attached to one support tube at a desired location and the third pad being attached to the other support tube at a location corresponding to that of the second pad, and a fourth pad attached to the support tubes to provide a third tier of support for the mid-thoracic region of the individual's back, and a fifth pad mounted on said support tubes to provide a fourth tier of support for the upper thoracic region of the individual's back;

a headrest pad mounted on said support tubes to provide a fifth tier of support for the head of the individual; and a plurality of pad covers with one pad cover removably positioned around each support pad.

66. The backrest system as set forth in claim 65 wherein said pad covers are constructed from a washable fabric material.

67. The backrest system as set forth in claim 65 wherein said pad covers wrap around each pad and are held in position by hook and loop fasteners.

68. The backrest system as set forth in claim 65 wherein said pad covers include an elastic band attached to an outer edge of said cover, said cover being slipped over the pad and held in place by said elastic band.

69. A backrest system for a chair for seating an individual, said chair having a seat and upright posts extending upwardly from the rear of the seat in a spaced apart, substantially parallel manner, said backrest system comprising:

a back support adapted to be removably positioned between said posts to support the back of an individual sitting on the chair seat, including a plurality of pads with each pad being positioned to support a particular region of the individual's back, each pad having a backing plate and an insert attached to a forwardly presented face of said backing plate against which the region of the back of the individual can rest;

a support chassis adapted to be disposed between said posts and mounted to said back support for supporting each pad of said back support at a desired location with respect to the individual's back; and a two-point attachment assembly connectable to said posts at one desired point of attachment along each post for releasably securing said support chassis to said posts.

70. The backrest system as set forth in claim 69 further including a plurality of back support covers with one cover being removably positioned around said insert and at least a portion of said backing plate for each pad associated with the back support.

71. The backrest system as set forth in claim 70 wherein said covers are constructed from a washable fabric material.

72. The backrest system as set forth in claim 70 wherein each of said covers wraps around one of the back support pads in its substantial entirety and is held in position by hook and loop fasteners attached to the cover.

73. The backrest system as set forth in claim 70 wherein each cover includes an elastic band attached to an outer edge of said cover, said cover being slipped over the insert and backing plate and held in place by said elastic band.

74. A ball and socket joint comprising:

a substantially spherical ball including a first section and a second section formed by passing a cutting plane through the ball, said first section having a maximum circumference corresponding to that of a small circle of the ball, said second section having a maximum circumference corresponding to that of a great circle of the ball, said first and second sections having spherical outer surface areas terminating in juxtaposed planar base surfaces defined by said cutting plane, said planar base surfaces having diameters corresponding to a diameter of the small circle of the ball;

a socket having a cavity formed therein that is sized to receive at least a portion of said ball; and said first section of said ball being movable inwardly towards and outwardly away from said second section of said ball, said ball being in an unlocked position permitting rotation of said socket with respect to said ball when the planar base surface of said first section is in abutment with the planar base surface of said second section of said ball; said ball being in a locked position preventing movement of said socket with respect to said ball when said first section is moved outwardly away and spaced from the planar base surface of said second section and the spherical outer surface of said first section is in engagement with the cavity of said socket.

75. The ball and socket joint as set forth in claim 74 wherein said first section of said ball is constructed from a nylon material, said nylon material allowing for flexure of the first section in the socket when in the locked position to prevent movement of the ball in the socket when an external load is applied to the socket.

76. A ball and socket joint comprising:

a ball including a first section and a second section, said ball having an opening extending radially through said second section;

a socket having a cavity formed therein that is sized to receive at least a portion of said ball; and means for moving said first section of said ball inwardly and outwardly with respect to said second section of said ball, said ball being in an unlocked position permitting rotation of said socket with respect to said ball when said first section is in abutment with said second section of said ball; said ball being in a locked position preventing movement of said socket with respect to said ball when said first section is moved radially outwardly from said second section into engagement with said socket, said means including a threaded stud attached to said first section of said ball and extending through said opening in said second section outwardly from said socket, said stud being movable within said opening inwardly to an extended position and outwardly to a retracted position, said ball being maintained in the unlocked position when said stud is in the retracted position, said ball being maintained in the locked position when said stud is in the extended position.

77. A ball and socket joint comprising:

a substantially spherical ball including a first segment and a second segment, said second segment having a threaded opening extending radially therethrough, said first and second segments being formed by passing a cutting plane through the ball, said first segment having a maximum circumference corresponding to that of a small circle of the ball, said second segment having a maximum circumference corresponding to that of a great circle of the ball, said first and second segments having outer surface zones terminating in juxtaposed planar base surfaces defined by said cutting plane, said planar base surfaces having diameters corresponding to a diameter of the small circle of the ball;

a socket having a cavity formed therein that is sized to receive a portion of said ball;

a threaded stud attached to said first segment of said ball and adapted to be engaged by and disposed in the threaded opening of the second segment, said stud extending outwardly from said socket, said stud being movable within said opening inwardly to an extended position and outwardly to a retracted position, said stud moving said first segment of said ball into abutment with said second segment when said stud is in the retracted position to permit said ball to rotate freely in said socket, said stud moving the planar base surface of said first segment of said ball outwardly away and spaced from the planar base surface of said second segment and the outer surface zone of the first segment into engagement with the cavity of said socket when said stud is in the extended position to prevent rotation of said ball in said socket.

78. A ball and socket joint comprising:

a ball including a first section and a second section, said first section of said ball being constructed from a nylon material, said second section of said ball being constructed from a strong engineering plastic material;

a socket having a cavity formed therein that is sized to receive the first section of said ball and at least a portion of the second section of said ball; and said first section of said ball being movable inwardly towards the second section of the ball and outwardly away from said second section of said ball into engagement with the socket, said ball being in an unlocked position permitting rotation of said socket about said ball when said first section is in abutment with said second section of said ball; said ball being in a locked position preventing movement of said socket with respect to said ball when said first section is moved outwardly away from said second section into engagement with said socket.

79. The ball and socket joint as set forth in claim 78 wherein said cavity in said socket is formed in a strong engineering plastic material.

80. The ball and socket joint as set forth in claim 79 wherein said socket further includes a C-ring bracket that is positioned around said ball disposed in said cavity, said bracket exerting force of said ball when said ball is in the locked position to prevent rotation of said ball.

81. The ball and socket joint as set forth in claim 80 wherein said bracket is constructed from a metal material.

82. The ball and socket joint as set forth in claim 81 wherein said bracket is constructed from a strong engineering plastic material, said bracket having an inner edge that is adapted to frictionally engage said ball when said ball is in said locked position to prevent rotation of said ball.

83. An elbow joint comprising:

a first member including a first end having a first opening extending therethrough;

a second member having a first end coupled to said first end of said first member;

a swivel attachment device coupling said first member to said second member, including a post extending outwardly through an opening formed in the first end of said second member and through said first opening in said first member, and a retaining device attached to said post for preventing said post from becoming dislodged from said first opening and permitting said first member to rotate freely around said post;

a locking mechanism for selectively preventing rotation of said first member with respect to said second member when said elbow joint is positioned at a desired orientation.

84. The elbow joint as set forth in claim 83 wherein said locking mechanism includes a clamping device formed in said first end of said first member, said clamping device including a slot formed in said first member and extending radially outwardly from said first opening, and a second opening formed in said first member and extending through said slot, said second opening being adapted to accommodate a threaded stud therein, said stud being held in place by a nut, said clamping device exerting clamping force on said post when said threaded stud is tightly secured inside said second opening by forcing said slot into a closed position and preventing rotation of said first member with respect to said second member.

85. A ball and socket joint comprising:

a substantially spherical ball including a first section, a second section, a threaded opening extending radially through said second section of said ball;

a socket having a cavity formed therein that is sized to receive a portion of said ball, said socket including a base having said cavity formed therein, and a C-shaped bracket secured to said base when said ball is positioned inside said cavity, said bracket having an inner edge positioned around a portion of said ball;

a threaded stud attached to said first section of said ball and extending through said opening in said second section outwardly from said socket, said stud being movable within said opening inwardly to an extended position and outwardly to a retracted position, said stud moving said first section of said ball into abutment with said second section when said stud is in the retracted position to permit said ball to rotate freely in said socket, said stud moving said first section of said ball outwardly away from said second section into engagement with said socket when said stud is in the extended position to prevent rotation of said ball in said socket, said stud extending outwardly through said bracket and permitting limited rotation of said ball in said socket when said stud is in the retracted position, said inner edge of said bracket engaging said ball when said stud is in the extended position to prevent rotation of said ball in said cavity.

86. The ball and socket joint as set forth in claim 85 wherein said first section of said ball is constructed from a nylon material.

87. The ball and socket joint as set forth in claim 86 wherein said second section of said ball is constructed from a strong engineering plastic material.

88. The ball and socket joint as set forth in claim 87 wherein said base of said socket is formed in a strong engineering plastic material.

89. The backrest system as set forth in claim 88 wherein said bracket is constructed from a strong plastic material, said inner edge of said bracket being adapted to frictionally engage said ball when said stud is in the extended position.

90. The backrest system as set forth in claim 88 wherein said bracket is constructed from a metal material.

91. A backrest system for a chair for seating an individual, comprising: a pair of support tubes connectable to a rear of said chair and extendable vertically therefrom in a substantially parallel, spaced apart manner; and at least one back support pad attached to at least one of said support tubes at a desired location based upon support needs and proportions of an individual sitting in the chair; said pad being coupled to said support tube by at least one elbow joint, said elbow joint permitting inward, outward and lateral movement of said pad, said elbow joint including a first member having a first end with a first opening extending therethrough and a second end attached to said support tube, said elbow joint further including a second member having a first end coupled to said first end of said first member via a swivel attachment assembly and a second end attached to said pad via a ball and socket joint.

92. The backrest system as set forth in claim 91 wherein said swivel attachment assembly includes a post extending outwardly through an opening formed in the first end of the second member and through the first opening of the first member, and a retaining device attached to said post for preventing said post from becoming dislodged from said first and second members and permitting said first member to rotate freely about said post.

93. The backrest system as set forth in claim 92 wherein said elbow joint further includes a locking mechanism for selectively preventing rotation of said first member with respect to said second member when said elbow joint is positioned at a desired orientation.

* * * * *

US006095611C1

(12) EX PARTE REEXAMINATION CERTIFICATE (5557th)

United States Patent

(10) Number: US 6,095,611 C1

(45) Certificate Issued: Oct. 10, 2006

Bar et al.

(54) MODULAR BACKREST SYSTEM FOR A WHEELCHAIR

(75) Inventors: Christopher A. Bar, Belleville, IL (US); Dennis L. Clapper, Swansea, IL (US)

(73) Assignee: Roho, Inc., Belleville, IL (US)

Reexamination Request:
No. 90/005,905, Jan. 5, 2001

Reexamination Certificate for:
Patent No.: 6,095,611
Issued: Aug. 1, 2000
Appl. No.: 09/118,675
Filed: Jul. 17, 1998

Related U.S. Application Data

(63) Continuation-in-part of application No. 08/946,208, filed on Oct. 7, 1997, now abandoned.

(51) Int. Cl.
*F16C 11/00* (2006.01)

(52) U.S. Cl. .............................. 297/440.21; 297/284.3; 297/284.4; 297/228.13; 297/383; 297/354.12; 297/405; 297/397; 403/90; 403/130; 403/131

(58) Field of Classification Search ....................... None
See application file for complete search history.

(56) References Cited

U.S. PATENT DOCUMENTS

| | | | | |
|---|---|---|---|---|
| 134,424 | A | 12/1872 | Evans | |
| 2,928,686 | A | 3/1960 | Newkirk | |
| 3,293,671 | A | 12/1966 | Griffin | |
| 3,348,880 | A | 10/1967 | Swann | |
| 3,880,463 | A | 4/1975 | Shephard et al. | |
| 4,313,637 | A | 2/1982 | Barley | |
| 4,565,345 | A | 1/1986 | Templeman | |
| 4,636,000 | A | 1/1987 | Nishino | |
| 4,647,066 | A | 3/1987 | Walton | |
| 4,655,471 | A | 4/1987 | Peek | |
| 4,732,423 | A | 3/1988 | Condon | |
| 4,753,482 | A | 6/1988 | Warren | |
| 4,898,425 | A * | 2/1990 | Mundy | 297/440.2 X |
| 4,981,325 | A | 1/1991 | Zacharkow | |
| 5,007,676 | A | 4/1991 | Lien | |
| 5,035,467 | A | 7/1991 | Axelson et al. | |
| 5,054,854 | A | 10/1991 | Pruit | |

(Continued)

FOREIGN PATENT DOCUMENTS

| | | |
|---|---|---|
| AT | 0226408 | 3/1963 |
| DE | 2222532 | 11/1973 |
| EP | 0026668 | 9/1980 |
| IT | 0560109 | 8/1954 |

*Primary Examiner*—Anthony D. Barfield

(57) ABSTRACT

A modular backrest system for a wheelchair is removably attached to backrest posts of the wheelchair. The backrest system includes a back support that provides a surface against which the back of a wheelchair user rests, and a support chassis mounted to the back support for supporting the back support at a desired incline with respect to the posts, and at a desired seat depth with respect to the seat. An attachment assembly is further included that is operably connected to the support chassis at two locations and to the posts to allow the support chassis and back support to be readily removed from or attached to the chair. The particular back support employed in conjunction with the support chassis is based upon the support needs of the wheelchair user. One embodiment of the back support includes a backing plate, and a cushion or insert attached to a forwardly presented face of the backing plate against which the back of the individual rests when sitting on the seat. Another embodiment of the back support includes a plurality of pads adjustably attached to support tubes extending upwardly from the support chassis. Each pad is attached to at least one of the support tubes at a desired location by an elbow joint that permits forward and rearward movement and side-to-side movement of the pad. Each pad is attached to the elbow joint by a ball and socket joint that permits rotational movement of the pad with respect to the second member.

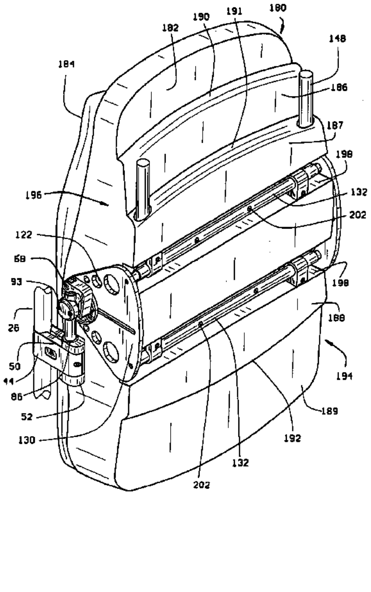

U.S. PATENT DOCUMENTS

| | | | | |
|---|---|---|---|---|
| 5,062,677 | A | 11/1991 | Jay et al. | |
| 5,102,195 | A | 4/1992 | Axelson et al. | |
| 5,127,709 | A | 7/1992 | Rubenstein et al. | |
| D329,771 | S | 9/1992 | Zacharkow | |
| 5,149,173 | A | 9/1992 | Jay et al. | |
| 5,176,706 | A | 1/1993 | Lee | |
| 5,211,446 | A | 5/1993 | Jay et al. | |
| 5,228,747 | A | 7/1993 | Greene | |
| 5,249,839 | A | 10/1993 | Faiks et al. | |
| 5,314,239 | A | 5/1994 | Edwards et al. | |
| 5,344,211 | A | 9/1994 | Adat et al. | |
| 5,352,023 | A | 10/1994 | Jay et al. | |
| 5,364,162 | A | 11/1994 | Bar et al. | |
| 5,366,277 | A | 11/1994 | Tremblay | |
| 5,385,388 | A | 1/1995 | Faiks et al. | |
| 5,407,248 | A | 4/1995 | Jay et al. | |
| 5,447,356 | A | 9/1995 | Snijders | |
| 5,468,051 | A | * 11/1995 | Huang | 297/344.18 X |
| 5,501,507 | A | 3/1996 | Hummitzsch | |
| D368,399 | S | 4/1996 | Buffon | |
| 5,503,459 | A | 4/1996 | White | |
| 5,518,294 | A | 5/1996 | Ligon, Sr. et al. | |
| 5,524,969 | A | 6/1996 | Harrison et al. | |
| 5,524,971 | A | 6/1996 | Jay et al. | |
| 5,544,378 | A | 8/1996 | Chow | |
| 5,547,251 | A | 8/1996 | Axelson | |
| 5,549,357 | A | 8/1996 | Counts et al. | |
| 5,553,917 | A | 9/1996 | Adat et al. | |
| 5,556,168 | A | 9/1996 | Dinsmoor, III et al. | |
| 5,564,788 | A | 10/1996 | Warhaftig | |
| 5,573,302 | A | 11/1996 | Harrison et al. | |
| 5,593,211 | A | 1/1997 | Jay et al. | |
| 5,624,158 | A | 4/1997 | Adat et al. | |
| 5,630,651 | A | 5/1997 | Fishbane | |
| 5,642,956 | A | 7/1997 | Hale | |
| 5,647,637 | A | 7/1997 | Jay et al. | |
| D383,929 | S | 9/1997 | Ring et al. | |
| 5,671,977 | A | 9/1997 | Jay et al. | |
| 5,678,891 | A | 10/1997 | O'Neill et al. | |
| 5,681,092 | A | 10/1997 | Hanson et al. | |
| 5,695,245 | A | 12/1997 | Carlson et al. | |
| 5,722,725 | A | 3/1998 | McNaughton | |
| 5,791,733 | A | 8/1998 | van Hekken et al. | |
| 5,791,735 | A | 8/1998 | Helman | |
| D401,801 | S | 12/1998 | Zacharkow | |
| 6,089,664 | A | 7/2000 | Yoshida | |
| 6,125,851 | A | 10/2000 | Walker et al. | |

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–17, 26–38, 42–57, 62–68 and 74–93 is confirmed.

Claims 39–41 are cancelled.

Claims 18, 58, 59 and 69 are determined to be patentable as amended.

Claims 19–25, 60, 61 and 70–73, dependent on an amended claim, are determined to be patentable.

18. A backrest system for a chair for seating an individual, said chair having a seat and upright posts extending upwardly from the rear of the seat in a spaced apart, substantially parallel manner, said backrest system comprising:

a back support adapted to be removably positioned between said *upright* posts to support a back of an individual sitting on the chair seat;

a support chassis adapted to be [disposed] *releasably attached* between said *upright* posts and mounted to said back support for supporting said back support at a desired incline with respect to said posts; and a two-point attachment assembly connectable to *a clamping assembly between said support chassis and* each of said posts [at a desired location along each post] for releasably securing said support chassis to said posts *at a desired location along each post, each said clamping assembly comprising a band extending at least partially around the post and at least one moveable wedge within the band for positioning and securing the band against the post*.

58. A backrest system for a chair for seating an individual, comprising:

a pair of support tubes [connectable] *attached* to a rear of said chair and extendable vertically therefrom in a substantially parallel, spaced apart manner;

a back support removably [secured] *mounted* to said support tubes *at a desired position* to support the back of an individual sitting on the chair seat;

a headrest assembly removably mounted to said support tubes at a desired position to support the head of the individual seated in the chair, including a mounting assembly that is removably secured to said support tubes, and a headrest pad attached to the mounting assembly against which the head of the individual rests when the individual is seated in the chair, said *headrest pad being attached to said* mounting assembly *by at least one elbow joint* having an unlocked position allowing for adjustment of said headrest pad to obtain the desired position and a locked position for preventing movement of the headrest pad when the desired position is obtained.

59. The backrest system as set forth in claim 58 wherein said [mounting assembly] *at least one elbow joint* permits forward and rearward movement of said headrest pad with respect to said support tubes in the unlocked position.

69. A backrest system for a chair for seating an individual, said chair having a seat and upright posts extending upwardly from the rear of the seat in a spaced apart, substantially parallel manner, said backrest system comprising:

a back support adapted to be removably positioned between said posts to support the back of an individual sitting on the chair seat, including a plurality of pads with each pad being positioned to support a particular region of the individuals's back, each pad having a backing plate and an insert attached to a forwardly presented face of said backing plate against which the region of the back of the individual can rest;

a support chassis adapted to be disposed between said posts and mounted to said back support for supporting each *said* pad of said back support at a desired location with respect to the individual's back; and a two-point attachment assembly *comprising a pair of band and wedge clamps* connectable to said posts at one desired point of attachment along each post for releasably securing said support chassis to said posts, *each said band and wedge clamp comprising a band extending partially around of the post and at least one adjustable wedge within each band to position and secure the band against the post.*

* * * * *